(12) United States Patent
Imai

(10) Patent No.: US 7,108,087 B2
(45) Date of Patent: Sep. 19, 2006

(54) POWER TRANSMITTING APPARATUS FOR HYBRID VEHICLE

(75) Inventor: Nobuyuki Imai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 10/863,276

(22) Filed: Jun. 9, 2004

(65) Prior Publication Data

US 2004/0251064 A1 Dec. 16, 2004

(30) Foreign Application Priority Data

Jun. 12, 2003 (JP) ............................. 2003-168346
Jun. 18, 2003 (JP) ............................. 2003-173378

(51) Int. Cl.
*B60K 6/04* (2006.01)

(52) U.S. Cl. .................. 180/65.2; 180/65.4; 477/3; 903/926

(58) Field of Classification Search ............... 180/65.1, 180/65.2, 65.3, 65.4; 903/902, 903, 926, 903/951; 477/3, 5; 318/8, 34, 87
See application file for complete search history.

(56) References Cited

U.S. PATENT DOCUMENTS

| 5,730,676 A | * | 3/1998 | Schmidt | 475/5 |
| 6,248,036 B1 | * | 6/2001 | Masaki | 475/2 |
| 6,520,879 B1 | * | 2/2003 | Kawabata et al. | 475/5 |
| 6,555,927 B1 | * | 4/2003 | Suzuki et al. | 290/34 |
| 6,691,809 B1 | * | 2/2004 | Hata et al. | 180/65.3 |
| 6,890,283 B1 | * | 5/2005 | Aoki | 477/5 |

FOREIGN PATENT DOCUMENTS

| JP | 11-301291 | 11/1999 |
| JP | 2002-052944 | 2/2002 |

* cited by examiner

*Primary Examiner*—Christopher P. Ellis
*Assistant Examiner*—Brian L. Swenson
(74) *Attorney, Agent, or Firm*—Arent Fox, PLLC.

(57) ABSTRACT

The present invention provides a power transmitting apparatus that uses a small configuration to efficiently carry out various forms of propulsions such as a speed change propulsion and even an EV propulsion (electric propulsion) including a series type EV propulsion. The power transmitting apparatus includes a clutch 8 that connects and disconnects rotation transmissions between an output shaft 1a of an engine 1 and an input shaft 4r of one 4 of two power distributors 4 and 5 to which a rotational drive force is transmitted by the engine 1, a clutch 9 that connects and disconnects rotation transmissions between one of two output shafts 5c, 5c of the power distributor 5 and a power output shaft 12, and rotation regulating means 10 and 11 that properly inhibit rotation of the input shaft 4r of the power distributor 4 and rotation of the output shaft 5c of the power distributor 5. Motors 6 and 7 apply torques to an output shaft 4s of the power distributor 4 and an output shaft 5s of the power distributor 5, respectively.

23 Claims, 17 Drawing Sheets

BASIC EV PROPULSION MODE

ENGINE START/IDLING EV PROPULSION MODE

SERIES TYPE EV PROPULSION MODE

ENGINE START

BACKWARD EV PROPULSION MODE

CVT PROPULSION MODE

PARALLEL TYPE PROPULSION MODE

FIRST SPEED CHANGE REGION ( R1 ~ R2 )

SECOND SPEED CHANGE REGION ( R2 ~ R3 )

THIRD SPEED CHANGE REGION ( R3 ~ R4 )

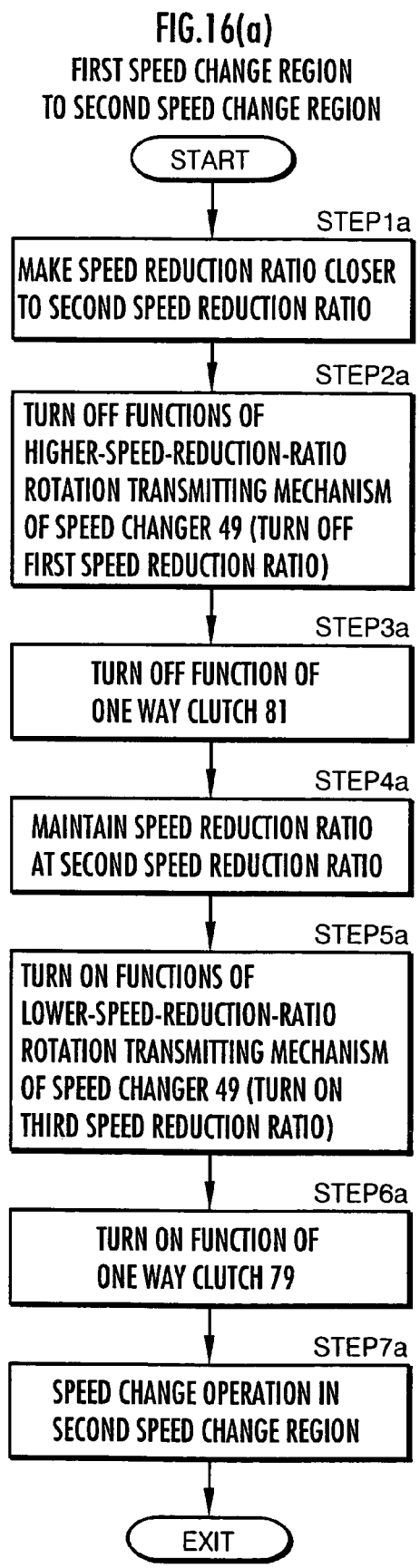
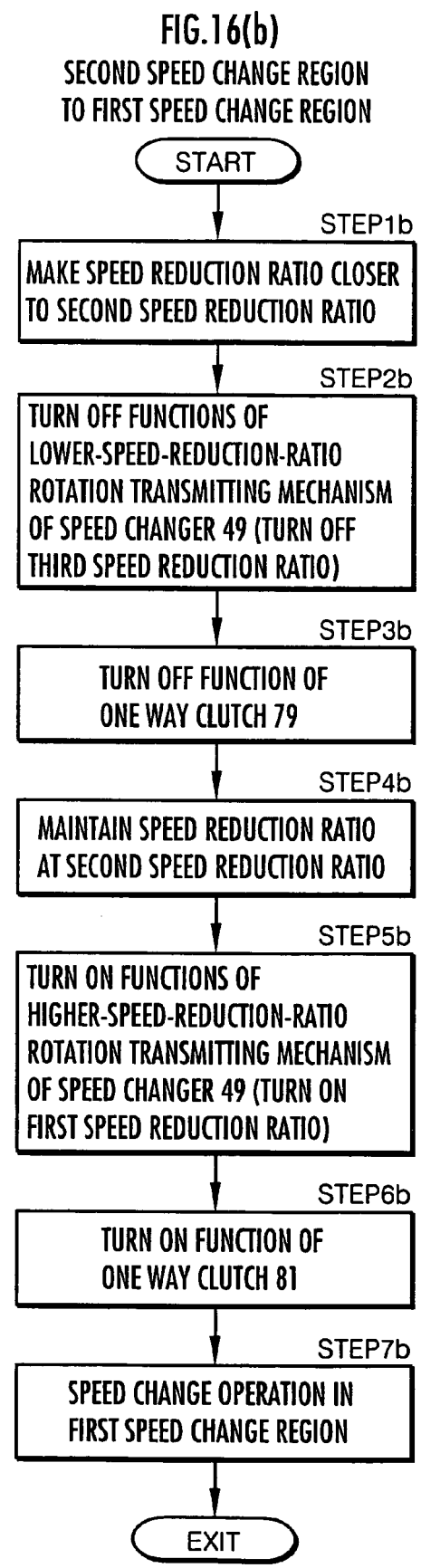

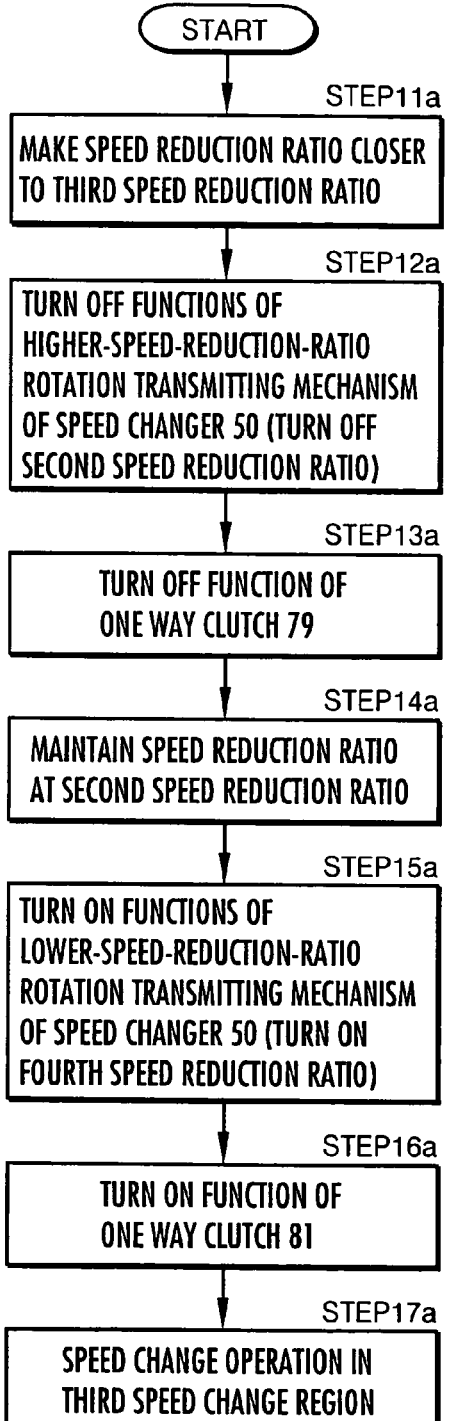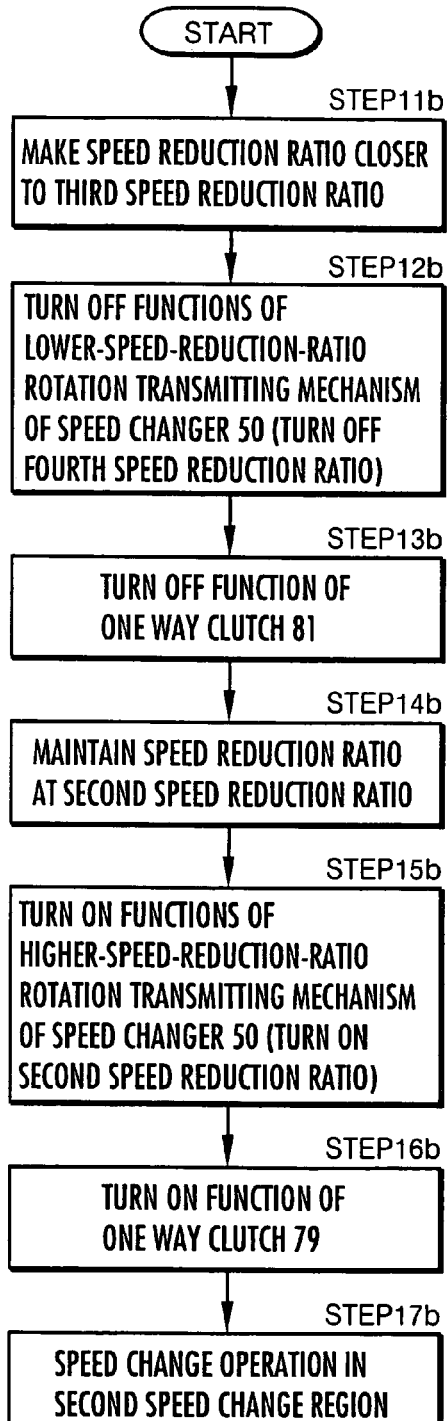

POWER TRANSMITTING APPARATUS FOR HYBRID VEHICLE

BACKGROUND OF THE INVENTION

1. Field of the Invention

The present invention relates to a power transmitting apparatus for a hybrid vehicle comprising an engine, motors, and power distributors.

2. Description of the Related Art

For example, Japanese Patent Laid-Open No. 11-301291 discloses a known power transmitting apparatus for a hybrid vehicle comprising an engine, motors (electric motors), and power distributors. This hybrid vehicle comprises an engine, two motors, and power distributors (differential gear devices) each composed of two pinion gear devices. The rotational drive power of the engine is distributively inputted to an input shaft of each power distributor via a gear. One of two output shafts of each power distributor is coupled to one of the two motors so that a drive (motoring) or regenerative torque from the motor is applied to the power distributor. Rotative drive powers from the other output shafts of the power distributors are transmitted in parallel to one power output shaft connected to drive wheels of the vehicle. The speed reduction ratio for a rotation transmitting system from the engine to the power output shaft via one of the power distributors is different from the speed reduction ratio for a rotation transmitting system from the engine to the power output shaft via the other power distributor. Specifically, the speed reduction ratio for each rotation transmitting system is determined when one of the two output shafts of the power distributor in the rotation transmitting system which shaft is connected to the motor has a rotation speed of 0.

In the power transmitting apparatus for a hybrid vehicle configured as described above, one of the motors is brought into a driving (motoring) state, the other motor is brought into a regenerative (generating) state, and the motors are set to consume and generate almost equal amount of power. Then, in a steady state (a car speed is almost constant), for the rotation speed $\omega e$ and torque Te of the engine and the rotation speed $\omega v$ and torque Tv of the power output shaft, the relation Tv=($\omega e/\omega v$)·Te is established. Further, in this case, a speed reduction ratio ($\omega e/\omega v$) for the transmission of rotations from the engine to the power output shaft can be changed to an arbitrary value between the two speed reduction ratios of the rotating transmitting system by controlling the torque generated by each motor.

Accordingly, if the vehicle is propelled using the engine as a propulsion source, the speed reduction ratio (speed change ratio) for the transmission of rotations from the engine to the power output shaft can be continuously changed by controlling the torques generated by both motors. This provides functions comparable to those provided if a continuous speed change device such as a CVT is provided between the engine and the power output shaft. That is, the vehicle can be propelled using an output from the engine while changing the speed between the engine and the power output shaft and without the need for a mechanical continuous speed change device such as a CVT.

Furthermore, by causing a deviation in the state in which the power consumption of the motor in the driving state is almost equal to the power generation of the motor in the regenerative state, it is possible to use the motor to generate an assist drive power or to charge a battery that is a power source for the motor. Moreover, by allowing both motors to transmit torques to the power output shaft while controlling the torques of both motors so that the load torque on the engine is zero, the vehicle can be propelled using only the output from the motors (what is called EV propulsion) and without using the output from the engine.

To improve the energy efficiency of a hybrid vehicle of this kind, it is preferable to carry out EV propulsion of using only the output from the motors and without using the output from the engine, during, for example, cruise propulsion in which the vehicle speed is relatively low. This is because when the vehicle is propelled using the output from the engine in a low vehicle speed region, it is generally difficult to operate the engine at an operation point with a high energy efficiency. For the EV propulsion, it is preferable to properly charge the battery using the output from the engine in order to supplement the power of the battery, which is the power source of the motors. Specifically, during, for example, the cruise propulsion at a low vehicle speed, to improve the energy efficiency of the hybrid vehicle, it is preferable to carry out what is called series type EV propulsion in which the vehicle is propelled using the outputs from the motors, while properly utilizing the output from the engine to charge the battery.

However, in the hybrid vehicle disclosed in Japanese Patent Laid-Open No. 11-301291, while the engine is being operated, the output from the engine is always inputted to the power distributors. It is thus impossible to allow one of the motors to generate power using the output from the engine while propelling the vehicle using the drive power of the other motor, regardless (independently) of the propulsive state (desired propulsive torque and speed of the vehicle and the like) of the vehicle. That is, the series type EV propulsion cannot be carried out.

Further, with the invention described in Japanese Patent Laid-Open No. 11-301291, when the EV propulsion is carried out to propel the vehicle using the drive power of the motors and without using the output from the engine, the torques of both motors are transmitted to the power output shaft while offsetting the torque transmitted by each motor to the engine so that the load torque on the engine is zero. Thus, when carrying out the EV propulsion, each motor must generate a large torque. Consequently, it is likely that the capacity of each motor must be increased, and the power loss of each motor is likely to increase.

On the other hand, the applicant has proposed, in Japanese Patent Laid-Open No. 2002-52944, a hybrid vehicle comprising two power distributors and two motors which vehicle is capable of not only the speed change propulsion as in the case of Japanese Patent Laid-Open No. 11-301291 but also the series type EV propulsion or the like. The technique disclosed in Japanese Patent Laid-Open No. 2002-52944 comprises a rotation transmission path through which rotations are transmitted between one of the motors and the engine without using any power distributors and a rotation transmission path through which rotations are transmitted between the other motor and the power output shaft without using any power distributors. A clutch is provided in each of these rotation transmission paths and rotation transmission paths from the respective motors to the corresponding power distributors. Then, the proper combination of connections and disconnections of the clutches enables the vehicle to travel in various propulsive modes including the series type EV propulsion. However, the technique disclosed in Japanese Patent Laid-Open No. 2002-52944 requires more rotation transmission paths and clutches than that disclosed in Japanese Patent Laid-Open No. 11-301291, previously described. Consequently, with the technique disclosed in Japanese Patent Laid-Open No. 2002-52944, it is difficult to reduce the size of the while power transmitting apparatus.

Moreover, with the technique disclosed in Japanese Patent Laid-Open No. 11-301291, if the engine becomes inoperative (the engine does not generate any output) for any reason while carrying out change speed propulsion, then in particular the rotation speed of one of the motors which is connected to the power distributor in a system from the engine to the power output shaft which system has a higher speed reduction ratio for the transmission of rotations becomes high compared to the service rotation speed region during the normal speed change propulsion. Thus, the higher-speed-reduction-ratio motor is desired to endure a rotation speed (which does not occur during the normal propulsion) that is high compared to the service rotation speed region during the speed change propulsion. Further, a drive circuit for this motor must have a sufficiently large conduction capacity compared to the service region during the speed change propulsion. As a result, the sizes of the motors and its drive circuit must be increased, thus preventing miniaturization of the power transmitting apparatus.

In view of this background, it is an object of the present invention to provide a power transmitting apparatus that enables a small configuration to accomplish not only the speed change propulsion but also various other forms of propulsions such as the EV propulsion including the series type EV propulsion. It is another object of the present invention to provide a power transmitting apparatus that can use a simple configuration to prevent motors from rotating at excessively high speed even if an engine becomes inoperative during the speed change propulsion.

SUMMARY OF THE INVENTION

A power transmitting apparatus for a hybrid vehicle according to the present invention is obtained by improving a power transmitting apparatus for a hybrid vehicle comprising a first and second power distributors each having an input end to which a rotational drive power from an engine is transmitted, a power output shaft to which a first output shaft of two output shafts of the first power distributor and a first output shaft of two output shafts of the second power distributor transmit rotational drive powers and which output the transmitted rotational drive powers to drive wheels of the vehicle, a first motor that applies a drive torque or regenerative torque to a second output shaft of the first power distributor, and a second motor that applies a drive torque or regenerative torque to a second output shaft of the second power distributor, a speed reduction ratio for a rotation transmitting system from the engine to the power output shaft via the first power distributor having a value different from a value of a speed reduction ratio for a rotation transmitting system from the engine to the power output shaft via the second power distributor.

To accomplish the above object, a first aspect of the power transmitting apparatus according to the present invention is characterized in that the apparatus comprises first clutch means for connecting and disconnecting the engine to and from the input shaft of the first power distributor for rotation transmission, second clutch means for connecting and disconnecting the first output shaft of the second power distributor to and from the power output shaft for rotation transmission, first rotation regulating means operating in an open state in which the input shaft of the first power distributor is rotatable and in a braking state in which the input shaft is inhibited from rotating, and second rotation regulating means operating in an open state in which the first output shaft of the second power distributor is rotatable and in a braking state in which the first output shaft is inhibited from rotating.

According to the first aspect of the present invention, the first clutch means can block the transmission of rotations between the engine and the first power distributor or the transmission of torque between the engine and the first motor. Moreover, the first rotation regulating means can inhibit the rotation of the input shaft of the first power distributor. Accordingly, when the first clutch means is brought into a disconnected state, rotations (torques) can be transmitted between the first motor and the power output shaft. Further, the second clutch means can properly block the transmission of rotations between the first output shaft of the second power distributor and the power output shaft or the transmission of torque between the second motor and the power output shaft. Moreover, the second rotation regulating means can inhibit the rotation of the first output shaft of the second power distributor. Accordingly, when the second clutch means is brought into the disconnected state, rotations (torques) can be transmitted between the second motor and the engine. Further, although a description will be made later in detail, if for example, both first and second clutch means are brought into a connected state and the first and second rotation regulating means are brought into an open state, torques can be transmitted between the engine and the first motor and between the second motor and the power output shaft as in the case of conventional power transmitting apparatuses for hybrid vehicles. As a result, the first aspect of the present invention makes it possible to use a small configuration to carry out not only speed change propulsion but also various other forms of propulsions such as electric propulsion (EV propulsion) including series type electric propulsion without the need for a special rotation transmission path through which the series type electric propulsion can be carried out.

In the first aspect of the present invention, each of the first and second power distributors generally comprises a differential gear device, for example, a pinion gear device (second aspect). In this case, the input shaft, first output shaft, and second output shaft of each of the power distributors are a ring gear, a carrier, and a sun gear of the pinion gear device respectively constituting the power distributor (third aspect).

In the first to third aspects of the present invention, the first rotation regulating means preferably comprises a one-way clutch for inhibiting only rotation of the input shaft of the first power distributor in a predetermined one of two rotating directions (fourth aspect). Thus, when the rotation of the input shaft of the first power distributor in the predetermined direction is to be inhibited (if for example, a torque that rotates the power output shaft in a predetermined direction is transmitted from the first motor to the power output shaft while the first clutch means is in the disconnected state), the one-way clutch of the first rotation regulating means can inhibit the rotation of the input shaft of the first power distributor without using the actuator or controlling its operations. Further, the one-way clutch does not require any energy sources for its operations. Consequently, consumed energy can be saved.

In the fourth aspect of the present invention, preferably, the first rotation regulating means further comprises forced braking means for inhibiting rotation of the input shaft of the first power distributor via an actuator (fifth aspect). Thus, the forced braking means can inhibit the rotation of the input shaft of the first power distributor in the opposite direction with respect to the rotation inhibited by the one-way clutch of the first rotation regulating means.

In the first to fifth aspects of the present invention, the second rotation regulating means preferably comprises a one-way clutch for inhibiting only rotation of the first output shaft of the second power distributor in a predetermined one of two rotating directions (sixth invention). Thus, when the rotation of the first output shaft of the second power distributor in the predetermined direction is to be inhibited (if for example, a torque that starts the engine is transmitted from the second motor to the engine while the second clutch means is in the disconnected state), the one-way clutch of the second rotation regulating means can inhibit the rotation of the first output shaft of the second power distributor without using the actuator or controlling its operations. Further, the one-way clutch does not require any energy sources for its operations. Consequently, the consumed energy can be saved.

In the sixth aspect of the present invention, preferably, the second rotation regulating means further comprises forced braking means for inhibiting rotation of the first output shaft of the second power distributor via an actuator (seventh aspect). It is thus possible to inhibit the rotation of the first output shaft of the second power distributor in the opposite direction with respect to the rotation inhibited by the one-way clutch of the second rotation regulating means.

In the first to third aspects of the present invention, more specifically, various forms of vehicle propulsions such as the speed change propulsion, electric propulsion (EV propulsion) can be carried out by operating the clutch means and the rotation regulating means as described below.

That is, the first and second clutch means are operated in a connected state and the first and second rotation regulating means are operated in an open state in a speed change propulsion mode, and the speed change propulsion mode is a mode in which the vehicle is propelled by transmitting the rotational drive power of the engine to the power output shaft via the first and second power distributors while generating a drive torque in one of the first and second motors and a regenerative torque in the other and in which the torques generated by the first and second motors are controlled to control a speed change ratio between the engine to the power output shaft (eighth aspect). By thus operating the first and second clutch means and the first and second rotation regulating means, it is possible to transmit torques between the engine, the first and second motor, and the power output shaft. Consequently, the vehicle can be propelled in the speed change propulsion mode.

Additionally, in the speed change propulsion mode, the speed reduction ratio between the engine and the power output shaft can be arbitrarily changed between a value for the speed reduction ratio of the rotation transmitting system (hereinafter sometimes referred to as an engine-to-power-output-shaft first rotation transmitting system) from the engine to the power output shaft via the first power distributor and a value for the speed reduction ratio of the rotation transmitting system (hereinafter sometimes referred to as an engine-to-power-output-shaft second rotation transmitting system) from the engine to the power output shaft via the second power distributor.

In the eighth aspect of the present invention, the first and second clutch means are operates in a disconnected state and the first rotation regulating means operates in a braking state in an speed change propulsion mode, and the electric propulsion mode is a mode in which the drive torque of the first motor is transmitted to the power output shaft to start and propel the vehicle (ninth aspect).

Specifically, when the first and second clutch means are operated in the disconnected state and the first rotation regulating means is operated in the braking state, the transmission of rotations between the engine and the power output shaft is disabled. On the other hand, rotations can be transmitted between the first motor and the power output shaft via the first power distributor. Consequently, the output from the first motor can be used to allow the vehicle to carry out the electric propulsion (EV propulsion) by transmitting the drive torque of the first motor to the power output shaft via the first power distributor regardless of the operational state of the engine. In this case, the drive torque of the first motor is mechanically transmitted to the power output shaft via the power distributor to propel the vehicle. Therefore, the vehicle can be propelled while efficiently transmitting the drive torque of the first motor to the power output shaft. Further, the propulsive drive power of the vehicle can be manipulated simply by controlling the drive torque of the first motor. It is thus possible to easily control the propulsion of the vehicle in the electric propulsion mode.

In the ninth aspect of the present invention, a rotation transmitting system from the first motor to the power output shaft via the first power distributor has a higher speed reduction ratio than a rotation transmitting system from the second motor to the power output shaft via the second power distributor (tenth aspect).

According to the ninth aspect of the present invention, the motor generating a drive torque that allows the vehicle to travel in the electric propulsion mode is the first motor for the higher speed reduction ratio for the transmission of rotations from the motor to the power output shaft. This makes it possible to reduce the drive torque required for the first motor.

In the ninth or tenth aspect of the present invention, preferably, the first rotation regulating means comprises a one-way clutch for inhibiting only rotation of the input shaft of the first power distributor in a predetermined one of the two rotating directions and forced braking means for inhibiting rotation of the input shaft of the first power distributor via the actuator, and when the vehicle is propelled forward in the electric propulsion mode, the first motor is caused to generate a drive torque that advances the vehicle, while the first rotation regulating means is operated in the braking state using its one-way clutch, and when the vehicle is propelled backward in the electric propulsion mode, the first motor is caused to generate a drive torque in a direction inverse to that of the drive torque generated when the vehicle is propelled forward, while the first rotation regulating means is operated in the braking state using its forced braking means (eleventh aspect).

Thus, when the vehicle is propelled in the electric propulsion mode, during forward propulsion, which is more frequent than backward propulsion, the one-way clutch not requiring any energy sources for operations inhibits the input shaft of the first power distributor from rotating. During the backward movement, which is more infrequent than the forward movement, the forced braking means having the actuator inhibits the input shaft of the first power distributor from rotating. Thus, the first rotation regulating means uses only the minimum amount of energy. Further, the vehicle can be moved forward and backward in the electric propulsion mode by reversing the drive torque generated by the first motor or providing a rotation transmission path exclusively used for backward movement.

In the eleventh aspect of the present invention, preferably, the drive torque of the second motor is transmitted to the engine to start the engine in a state that the first and second clutch means are operated in the disconnected state and the second rotation regulating means is operated in the braking state, before the vehicle starts traveling backward in the electric propulsion mode (twelfth aspect).

Specifically, by operating the first and second clutch means in the disconnected state and operating the second rotation regulating means in the braking state, it is possible to transmit rotations (torques) between the engine and the second motor via the second power distributor regardless of the propulsive state of the vehicle or the operational state of the first motor. Accordingly, the engine can be started by transmitting the drive torque of the second motor to the engine. When the engine is started to start traveling the vehicle backward, the first rotation regulating means can operate using, as a power source (energy source), a hydraulic pump and the like operated using the output from the engine. As a result, it is possible to reliably provide an energy source for the forced braking means of the first rotation regulating means for inhibiting the input shaft of the first power distributor from rotating during the backward propulsion in the electric propulsion mode.

If the conduction through the second motor is blocked after the start of the engine to zero the torque generated by the second motor, the engine becomes idle. In this idle state, the braking state of the second rotation regulating means may be released to bring the means into the open state.

In the twelfth aspect of the present invention, preferably, the second rotation regulating means comprises a one-way clutch for inhibiting only rotation of the first output shaft of the second power distributor in a predetermined one of the two rotating directions, when the engine is started before the vehicle starts traveling backward, the second rotation regulating means is operated in the braking state using its one-way clutch (thirteenth aspect). Thus, when the engine is started, the second rotation regulating means can reliably inhibit the rotation of the first output shaft of the second power distributor using the one-way clutch not requiring any energy sources for operations such as engine outputs.

In the ninth to eleventh embodiments, comprising the electric propulsion mode, the electric propulsion mode includes a series type electric propulsion mode in which the rotational drive power of the engine is transmitted to the second motor to allow the second motor to generate a regenerative power. In the series type electric propulsion mode, the second rotation regulating means is operated in the braking state (fourteenth aspect).

Specifically, by operating each clutch means and the first rotation regulating means as described above in the electric propulsion mode and operating the second rotation regulating means in the braking state, it is possible to transmit rotations (torques) between the engine and the second motor via the second power distributor regardless of the propulsive state of the vehicle or the operational state of the first motor as in the case of the start of the engine in the twelfth aspect of the present invention. Accordingly, regeneration for the second motor (charging of a battery that is a power source for the motors) can be executed using the rotational drive power of the engine (output torque from the engine) transmitted to the second motor via the second power distributor, while the vehicle is undergoing the electric propulsion using the output from the first motor. That is, the series type electric propulsion (EV propulsion) can be carried out. In this case, the second motor can execute the regeneration using the rotational drive power of the engine transmitted to the second motor, regardless of the propulsive state of the vehicle. Consequently, it is possible to efficiently regenerate power for the second motor while operating the engine at an operational point with the highest energy efficiency. As a result, the energy required for the vehicle can be effectively saved.

In the fourteenth aspect of the present invention, the drive torque of the second motor is transmitted to the engine to start the engine in a state that the first and second clutch means are operated in the disconnected state and the second rotation regulating means is operated in the braking state, before the series type electric propulsion mode is started (fifteenth aspect).

Thus, as in the case of the twelfth aspect of the present invention, the second motor transmits a torque to the engine to start it. In this case, the first and second clutch means are brought into the disconnected state as in the case of the electric propulsion mode. Furthermore, while the clutch means is in the disconnected state, the transmission of rotations between the first motor and the power output shaft is independent of the transmission of rotations between the engine and the second motor. Consequently, while the electric propulsion is being carried out using the first motor, the engine can be smoothly started by the second motor without affecting the propulsive state. Moreover, the operational state of the second rotation regulating means observed when the engine is started is the same as the operational state of the second rotation regulating means observed during the series type electric propulsion (braking state). Therefore, the series type electric propulsion, in which the regeneration for the second motor is executed, can be started smoothly and promptly after the engine has been started.

In the fifth aspect of the present invention, preferably, the second rotation regulating means comprises a one-way clutch for inhibiting only rotation of the first output shaft of the first power distributor in a predetermined one of the two rotating directions and forced braking means for inhibiting rotation of the first output shaft of the second power distributor via the actuator, and when the engine is started before the series type electric propulsion mode is started, the second rotation regulating means is operated in the braking state using its one-way clutch, and in the series type electric propulsion mode, the second rotation regulating means is operated in the braking state using its forced braking means (sixteenth aspect).

Specifically, the direction of the torque acting on the first output shaft of the second power distributor when the engine is started by transmitting a torque from the second motor to the engine via the second power distributor is opposite to the direction of the torque acting on the first output shaft of the second power distributor when the regeneration for the second motor is executed using a torque transmitted from the engine to the second motor via the second power distributor. In this case, when the engine is started, the one-way clutch of the second rotation regulating means inhibits the rotation of the first output shaft of the second power distributor. This makes it possible to reliably inhibit the rotation of the first output shaft of the second power distributor without the necessity of an energy source for operation such as engine output. Further, the energy consumed by the vehicle can be saved. Then, in the series type electric propulsion mode after the start of the engine, the forced braking means, which requires an energy source for operations, inhibits the rotation of the first output shaft of the second power distributor. However, in this case, the forced braking means can be reliably operated using, as a power source (energy source), for example, a hydraulic pump operated using the output from the engine.

In the fourteenth to sixteenth aspects of the present invention, wherein the series type electric propulsion mode and the speed change propulsion mode are shifted to each other via the transition mode, and the transition mode is a mode in which a rotation speed of the first motor and the torque generated by the second motor are set at almost zero, in which the first clutch means is operated in the connected state, with the first rotation regulating means operated in the open state, and in which an operational state of the second clutch means and second rotation regulating means is switched, and (seventeenth aspect).

In the series type electric propulsion mode, both first and second clutch means are in the disconnected state, and both first and second rotation regulating means are in the braking state. In contrast, in the speed change propulsion mode, both first and second clutch means are in the connected state, and both first and second rotation regulating means are in the open state. Accordingly, when the mode is switched between the series type electric propulsion and the speed change propulsion, each of the clutch means and rotation regulating means must be switched to a different operational state. Then, when the operational state of each of these means is switched simultaneously, the propulsive behavior of the vehicle temporarily becomes awkward.

Thus, in the seventeenth aspect of the present invention, when the mode is switched between the series type electric propulsion and the speed change propulsion, the transition mode is interposed between these modes. In the transition mode, the rotation speed of the first motor and the torque generated by the second motor are set at almost zero, the first clutch means is operated in the connected state, with the first rotation regulating means operated in the open state. Accordingly, the engine transmits almost all of the rotational drive power (output torque) to the power output shaft via the input shaft and first output shaft of the first power distributor. In this state, the engine transmits little rotational drive power to the second power distributor. Consequently, even if the operational state of the second rotation regulating means and second clutch means of the second power distributor is changed, the propulsive state of the vehicle is not affected. Therefore, the operational state of the second rotation regulating means and second clutch means can be switched in the transition mode without affecting the propulsive state of the vehicle. The transmission of the rotational drive power (torque) from the engine to the power output shaft in the transition mode is comparable to the state established by the speed change control in which the speed reduction ratio for the transmission of rotations from the engine to the power output shaft is equal to the speed reduction ratio for the engine-to-power-output-shaft first rotation transmitting system. It is possible to smoothly carry out the shifting between the speed change propulsion mode and the transition mode. Then, the operational state of the first clutch means and first rotation regulating means is switched between the transition mode and the series type electric propulsion mode. In this case, between the transition mode and the series type electric propulsion mode, the path through which a torque is transmitted to the power output shaft only shifts between a transmission path from the engine and the transmission path from the first motor. Accordingly, by gradually switching the operational state of the first clutch means and first rotation regulating means while performing the throttle control of the engine (opening control a throttle valve in an inlet system) and the torque control of each motor, it is possible to smoothly switch between the transition mode and the series type electric propulsion mode while maintaining the propulsive state of the vehicle. Therefore, by interposing the transition mode between the series type electric propulsion mode and the speed change propulsion mode, it is possible to smoothly shift between these modes.

Basically, it is sufficient to execute the speed change propulsion mode only when the vehicle is propelled forward. Then, if the first rotation regulating means comprises a one-way clutch inhibiting the input shaft of the first power distributor from rotating during the forward propulsion in the electric propulsion mode as in the case of the eleventh aspect of the present invention, the one-way clutch can be used to automatically switch the operational state of the first rotation regulating means between the transition mode and the series type electric propulsion mode without the need for the special control of the first rotation regulating means.

In the fourteenth to seventeenth aspects of the present invention, comprising the series type electric propulsion mode as previously described, when the engine has a plurality of cylinders, the series type electric propulsion mode preferably comprises a partial cylinder halt mode in which some of all the cylinders of the engine are halted (eighteenth aspect).

That is, the engine has what is called a pumping loss. However, by executing the partial cylinder halt mode to halt some of the cylinders of the engine when, for example, the desired output of the engine is relatively low, it is possible to reduce the pumping loss of the engine and thus its energy consumption. In this case, the partial cylinder halt mode is executed during the series type electric propulsion mode, in which the rotational drive power of the engine is not transmitted to the power output shaft. Accordingly, halting some cylinders of the engine does not affect the propulsive state of the vehicle. Consequently, the eighteenth aspect of the present invention makes it possible to improve the energy efficiency of the vehicle without affecting the propulsive state of the vehicle. More specifically, some cylinders can be halted by stopping the supply of a fuel to those cylinders, while keeping the intake and exhaust valves of the cylinders fully open or closed.

In the eighth to eighteenth aspects of the present invention, preferably, the first clutch means is operated in the disconnected state, the second clutch means is operated in the connected state, the first rotation regulating means is operated in the braking state, the second rotation regulating means is operated in the open state, and the second motor is caused to generate the regenerative torque in a parallel type propulsion mode, and the parallel type propulsion mode is a mode in which the vehicle is propelled by transmitting the rotational drive power of the engine and the rotational drive power of the first motor to the power output shaft in parallel, and in the parallel type propulsion mode, (nineteenth aspect).

Specifically, by operating the first clutch means in the disconnected state and the first rotation regulating means in the braking state, it is possible to transmit the drive torque of the first motor to the power output shaft via the first power distributor as in the case of the electric propulsion mode. Moreover, the rotational drive power of the engine (output torque of the engine) can be transmitted to the power output shaft via the second power distributor by operating the second clutch means in the connected state and the second rotation regulating means in the open state and allowing the second motor to generate a regenerative torque. Consequently, the drive torque of the first motor and the rotational drive power of the engine can be transmitted to the power output shaft in parallel. As a result, the propulsive drive power of the vehicle can be improved.

In the eighth to nineteenth aspects of the present invention, comprising the speed change propulsion mode, preferably, the apparatus comprises third rotation regulating means that can operate in a braking state in which rotation of a rotatable shaft of one of the first and second motors is inhibited which motor has the lower speed reduction ratio and which applies a torque to the second output shaft of the power distributor in the rotation transmitting system with the lower speed reduction ratio, and in an open state in which the rotatable shaft can be rotated, and if the engine becomes inoperative while the vehicle is being propelled in the speed change propulsion mode, the third rotation regulating means is operated in the braking state (twentieth aspect). When the engine is inoperative, the engine cannot generate any outputs owing to the inappropriate supply of a fuel to the engine or the like.

In the twentieth aspect of the present invention, if the engine becomes inoperative while the vehicle is being propelled in the speed change propulsion mode, the third rotation regulating means inhibits the rotation of a rotatable shaft of one of the first and second motors which motor has the lower speed reduction ratio and which motor applies a torque to the second output shaft of the power distributor in the rotation transmitting system (engine-to-power-output-shaft first rotation transmitting system or engine-to-power-output-shaft second rotation transmitting system). Thus, the rotation speed of (output shaft of) the engine does not decrease below a value dependent on the vehicle speed. This prevents the excessively high rotation of the rotatable shaft of the motor (different from the one with the lower speed reduction ratio (one with the higher speed reduction ratio)) which applies a torque to the second output shaft of the power distributor in the rotation transmitting system with the higher speed reduction ratio. Consequently, the twentieth aspect of the present invention can prevent the rotation speed of the motor from increasing excessively even if the engine becomes inoperative during the speed change propulsion. Further, the capacities of each motor and its drive circuits can be limited to the minimum required values. This enables the power transmitting apparatus to be miniaturized.

In the twentieth aspect of the present invention, the third rotation regulating means suitably comprises a one-way clutch from hindering the rotatable shaft of the motor with the lower speed reduction ratio from rotating in an inverse direction while the vehicle is being propelled in the speed change propulsion mode (twenty-first aspect).

Assuming that the third rotation regulating means is not supplied, when the engine becomes inoperative while the vehicle is being propelled in the speed change propulsion mode, the rotation speed of the engine decreases to zero. However, at this time, the rotating direction of the rotatable shaft of the motor with the lower speed reduction ratio is opposite to that during the propulsion in the speed change propulsion mode. In other words, the rotating direction of the rotatable shaft of the motor with the lower speed reduction ratio is reversed to reduce the rotation speed of the engine down to zero. Thus, in the twenty-first aspect of the present invention, the one-way clutch inhibits the reversal of the rotatable shaft of the motor with the lower speed reduction ratio. The simple configuration based on the one-way clutch makes it possible to inhibit the rotation (reversal) of the rotatable shaft of the motor with the lower speed reduction ratio when the engine is inoperative. Further, in this case, the one-way clutch need not be controlled. Accordingly, when the engine becomes inoperative to cause the rotatable shaft of the motor with the lower speed reduction ratio to start rotating in the direction opposite to the one during the propulsion in the speed change propulsive mode, the one-way clutch automatically inhibits the rotation (reversal) of the rotatable shaft of the motor with the lower speed reduction ratio without a delay. It is thus possible to reliably prevent the rotatable shaft of the motor with the higher speed reduction ratio-from rotating at high speed.

In the eighth aspect of the present invention, comprising the speed change propulsion mode, if the power transmitting apparatus is configured so that the speed reduction ratio for each of the rotation transmitting systems (engine-to-power-output-shaft first or second rotation transmitting system) has a constant (fixed) value, the vehicle can carry out the speed change propulsion only in the speed variable range (possible range of the speed reduction ratio between the engine and the power output shaft) between the two speed reduction ratios. On the other hand, the vehicle can be propelled in various types of speed change ranges by providing a speed change unit in at least one of the two rotation transmitting systems to change the speed reduction ratio for the rotation transmitting system. In this case, basically, it is preferable to avoid superimposing the speed reduction regions on one another in order to improve the energy efficiency of the power transmitting apparatus. In this case, in the power transmitting apparatus, the speed change unit changes the speed reduction ratio to establish a state in which the rotation transmitting system with the first power distributor (engine-to-power-output-shaft first rotation transmitting system) has a higher speed reduction ratio than the rotation transmitting system with the second power distributor (engine-to-power-output-shaft second rotation transmitting system) and a state in which the rotation transmitting system with the second power distributor (engine-to-power-output-shaft second rotation transmitting system) has a higher speed reduction ratio than the rotation transmitting system with the first power distributor (engine-to-power-output-shaft first rotation transmitting system). Preferably, the power transmitting apparatus thus having the speed change unit comprises third rotation regulating means that can operate in a braking state in which the rotatable shaft of the first motor is inhibited from rotating and in an open state in which the rotatable shaft is rotatable, and fourth rotation regulating means that can operate in a braking state in which the rotatable shaft of the second motor is inhibited from rotating and in an open state in which the rotatable shaft is rotatable, and wherein if the engine becomes inoperative while the vehicle is being propelled in the speed change propulsion mode in which the rotation transmitting system with the first power distributor has a higher speed reduction ratio than the rotation transmitting system with the second power distributor, the fourth rotation regulating means is operated in the braking state, and if the engine becomes inoperative while the vehicle is being propelled in the speed change propulsion mode in which the rotation transmitting system with the second power distributor has a higher speed reduction ratio than the rotation transmitting system with the first power distributor, the third rotation regulating means is operated in the braking state (twenty-second invention).

With the power transmitting apparatus according to the twenty-second aspect of the present invention, if the rotation transmitting system with the first power distributor has a higher speed reduction ratio than the rotation transmitting system with the second power distributor, the second motor corresponds to the motor with the lower speed reduction ratio according to the twentieth aspect of the present invention. Accordingly, when the engine becomes inoperative, the fourth rotation regulating means, corresponding to the second motor, inhibits the rotation of the rotatable shaft of the second motor. This makes it possible to prevent the rotatable shaft of the first motor with the high speed reduction ratio from rotating at excessively high speed. In contrast, if the rotation transmitting system with the second power distributor has a higher speed reduction ratio than the rotation transmitting system with the first power distributor, the first motor corresponds to the motor with the lower speed reduction ratio according to the twentieth aspect of the present invention. Accordingly, when the engine becomes inoperative, the third rotation regulating means, corresponding to the first motor, inhibits the rotation of the rotatable shaft of the first motor. This makes it possible to prevent the rotatable shaft of the second motor with the high speed reduction ratio from rotating at excessively high speed.

In the twenty-second aspect of the present invention, basically, the third and fourth rotation regulating means are preferably composed of one-way clutches as in the case of the twenty-first aspect of the present invention. However, if the engine becomes inoperative during the propulsion in the speed change propulsion mode in which the rotation transmitting system with the first power distributor has a lower speed reduction ratio than the rotation transmitting system with the second power distributor (the first motor corresponds to the motor with the lower speed reduction ratio), the rotatable shaft of the first motor should be inhibited from rotating in the same direction in which the rotatable shaft of the first motor should rotate during the propulsion in the speed change propulsion mode in which the rotation transmitting system with the second power distributor has a lower speed reduction ratio than the rotation transmitting system with the first power distributor. Likewise, if the engine becomes inoperative during the propulsion in the speed change propulsion mode in which the rotation transmitting system with the second power distributor has a lower speed reduction ratio than the rotation transmitting system with the first power distributor (the second motor corresponds to the motor with the lower speed reduction ratio), the rotatable shaft of the second motor should be inhibited from rotating in the same direction in which the rotatable shaft of the second motor should rotate during the propulsion in the speed change propulsion mode in which the rotation transmitting system with the first power distributor has a lower speed reduction ratio than the rotation transmitting system with the second power distributor.

Thus, in the twenty-second aspect of the present invention, preferably, the third rotation regulating means comprises a first one-way clutch for hindering the first motor from rotating in an inverse direction while the vehicle is being propelled in the speed change propulsion mode and the rotation transmitting system with the first power distributor has a lower speed reduction ratio than the rotation transmitting system with the second power distributor, and first one-way clutch OFF means for stopping the rotation inhibiting function of the first one-way clutch while the vehicle is being propelled in the speed change propulsion mode in which the rotation transmitting system with the first power distributor has a higher speed reduction ratio than the rotation transmitting system with the second power distributor, and the fourth rotation regulating means comprises a second one-way clutch for hindering the second motor from rotating in an opposite direction while the vehicle is being propelled in the speed change propulsion mode in which the rotation transmitting system with the second power distributor has a lower speed reduction ratio than the rotation transmitting system with the first power distributor, and second one-way clutch OFF means for stopping the rotation inhibiting function of the second one-way clutch while the vehicle is being propelled in the speed change propulsion mode in which the rotation transmitting system with the second power distributor has a higher speed reduction ratio than the rotation transmitting system with the first power distributor (twenty-third aspect).

According to the twenty-third aspect of the present invention, during the propulsion in the speed change propulsion mode in which the rotation transmitting system with the first power distributor has a lower speed reduction ratio than the rotation transmitting system with the second power distributor, the second one-way clutch, corresponding to the second motor, the motor with the higher speed reduction ratio, has its rotation inhibiting function stopped by the second one-way clutch OFF means. Consequently, the rotatable shaft of the second motor can rotate smoothly in the direction in which it should rotate. The rotatable shaft of the first motor rotates in a direction permitted by the first one-way clutch. Accordingly, the rotation inhibiting function of the first one-way clutch need not be stopped. Then, if the engine becomes inoperative during the propulsion, the first one-way clutch inhibits the reversal of the rotatable shaft of the first motor, corresponding to the motor with the lower speed reduction ratio. Consequently, as in the twenty-first aspect of the present invention, it is possible to automatically prevent the second motor, the motor with the higher speed reduction ratio, from rotating at excessively high speed without the need for special control.

Further, during the propulsion in the speed change propulsion mode in which the rotation transmitting system with the second power distributor has a lower speed reduction ratio than the rotation transmitting system with the first power distributor, the first one-way clutch, corresponding to the first motor, the motor with the higher speed reduction ratio, has its rotation inhibiting function stopped by the first one-way clutch OFF means. Consequently, the rotatable shaft of the first motor can rotate smoothly in the direction in which it should rotate. The rotatable shaft of the second motor rotates in a direction permitted by the second one-way clutch. Accordingly, the rotation inhibiting function of the second one-way clutch need not be stopped. Then, if the engine becomes inoperative during the propulsion, the second one-way clutch inhibits the reversal of the rotatable shaft of the second motor, corresponding to the motor with the lower speed reduction ratio. Consequently, it is possible to automatically prevent the first motor, the motor with the higher speed reduction ratio, from rotating at excessively high speed without the need for special control.

Therefore, according to the twenty-third aspect of the present invention, if the engine becomes inoperative in any of the plural types of speed variable ranges, the simple configuration with the one-way clutch can prevent the rotatable shaft of the motor with the higher speed reduction ratio from rotating at excessively high speed. Furthermore, the capacities of each motor and its drive circuit can be limited to the minimum required values to reduce the size of the power transmitting apparatus.

BRIEF DESCRIPTION OF THE DRAWINGS

FIGS. 16A and 16B are flowcharts illustrating operations required to switch the power transmitting apparatus according to the third embodiment between a first speed variable range and a second speed variable range; and FIGS. 17A and 17B are flow charts illustrating operations required to switch the power transmitting apparatus according to the third embodiment between the second speed variable range and a third speed variable range.

DETAILED DESCRIPTION OF THE PREFERRED EMBODIMENTS

Figure 1:
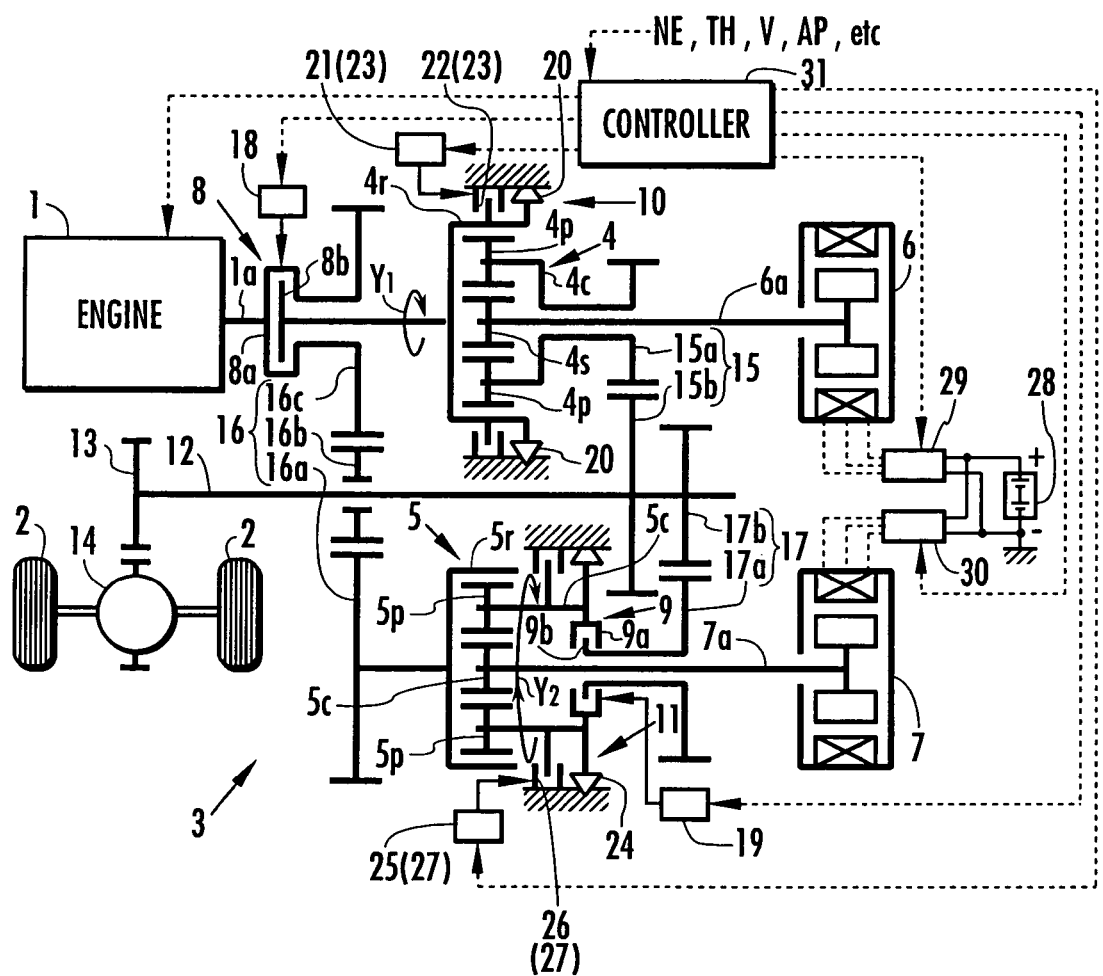
FIG. 1 is a diagram schematically showing the general system configuration of a hybrid vehicle comprising an embodiment of a power transmitting apparatus according to the present invention.

With reference to FIGS. 1 to 8, a detailed description will be given of a first embodiment of a power transmitting apparatus for a hybrid vehicle according to the present invention. FIG. 1 is a diagram schematically showing the general system configuration of the hybrid vehicle including the power transmitting apparatus according to the present embodiment. Reference numerals 1 denotes an engine, reference numerals 2, 2 denote drive wheels, and reference numeral 3 denotes a power transmitting apparatus. The engine 1 has, for example, four cylinders.

The power transmitting apparatus 3 comprises, as its main mechanical components, a first power distributor 4, a second power distributor 5, a first motor 6, a second motor 7, a first clutch 8 (first clutch means), a second clutch 9 (second clutch means), first rotation regulating means 10, second rotation regulating means 11, and a power output shaft 12. The power output shaft 12 is connected to the drive wheels 2, 2 via a gear 13 provided so as to be rotatable integrally with the power output shaft 12 and a differential gear device 14 (differential bevel gear device) meshing with the gear 13. The power output shaft 12 is rotatable in union with the drive wheels 2, 2.

In the present embodiment, each of the power distributors 4, 5 is composed of a pinion gear device (for example, a single pinion type) functioning as a differential gear device.

An output shaft 1a of the engine 1 is connected to an input port 8a of the first clutch 8 so as to be rotatable integrally with the input port 8a. A ring gear 4r as an input shaft of the first power distributor 4 is connected to an output port 8b of the first clutch 8 so as to be rotatable integrally with the output port 8b. Accordingly, when the first clutch 8 is in a connected state (the input port 8a and the output port 8b are engagingly connected together), rotations can be transmitted between the output shaft 1a of the engine 1 and the ring gear 4r of the first power distributor 4. When the first clutch 8 is in a disconnected state (the input port 8a and the output port 8b are separated from each other), the transmission of rotations between the output shaft 1a of the engine 1 and the ring gear 4r of the first power distributor 4 is blocked.

A carrier 4c and a sun gear 4s operate as two output shafts of the first power distributor 4. The carrier 4c as the first output shaft rotatably supports a pinion gear 4p (FIG. 1 shows two of this pinion gear) between the ring gear 4r and the sun gear 4s so that the pinion gear 4p meshes with the ring gear 4r and sun gear 4s. The carrier 4c is rotatable around the same axis as that of the sun gear 4s and ring gear 4r. The carrier 4c is connected to the power output shaft 12 via rotation transmitting means 15 composed of a gear 15a provided so as to be rotatable integrally with the carrier 4c and a gear 15b provided so as to mesh with the gear 15a and to be rotatable integrally with the power output shaft 12. Accordingly, the carrier 4c and the power output shaft 12 rotate in union. The sun gear 4s as the second output shaft of the first power distributor 4 is connected to a rotatable shaft 6a of the first motor 6 so as to be rotatable integrally with the rotatable shaft 6a.

A ring gear 5r as an input shaft of the second power distributor 5 is connected to the output shaft 1a of the engine 1 via rotation transmitting means 16 composed of a gear 16a provided so as to be rotatable integrally with the ring gear 5r, a gear 16c provided so as to be rotatable integrally with the input port 8a of the first clutch 8 (rotatable integrally with the output shaft 1a of the engine 1), and an idle gear 16b provided so as to mesh with the gears 16a and 16c and to be rotatable integrally with the gears 16a and 16c. Accordingly, the ring gear 5r rotates in union with the output shaft 1a of the engine 1. A carrier 5c and a sun gear 5s operate as two output shafts of the second power distributor 5. The carrier 5c as the first output shaft rotatably supports a pinion gear 5p (FIG. 1 shows two of this pinion gear) between the ring gear 5r and the sun gear 5s so that the pinion gear 5p meshes with the ring gear 5r and sun gear 5s. The carrier 5c is rotatable around the same axis as that of the sun gear 5s and ring gear 5r. The carrier 5c is connected to an input port 9a of the second clutch 9 so as to be rotatable integrally with the input port 9a. An output port 9b of the second clutch 9 is connected to the power output shaft 12 via rotation transmitting means 17 composed of a gear 17a provided so as to be rotatable integrally with the output shaft 9b and a gear 17b provided so as to mesh with the gear 17a and to be rotatable integrally with the power output shaft 12. Accordingly, when the second clutch 9 is in the connected state (the input port 9a and the output port 9b are engagingly connected together), rotations can be transmitted between the carrier 5c of the second power distributor 5 and the power output shaft 12. When the second clutch 9 is in the disconnected state (the input port 9a and the output port 9b are separated from each other), the transmission of rotations between the carrier 5c of the second power distributor 5 and the power output shaft 12 is blocked. Further, the sun gear 5s as a second output shaft of the second power distributor 5 is connected to a rotatable shaft 7a of the second motor 7 so as to be rotatable integrally with the rotatable shaft 7a.

Each of the first and second clutches 8 and 9 is of a friction disc type or the like. Their connecting and disconnecting operations are performed by actuators 18 and 19, respectively, controlled by a controller 31, described later. More specifically, the actuator 18 or 19 applies a drive power to the corresponding clutch 8 or 9 to perform a connecting operation on the clutch 8 or 9. The drive power of the actuator 18 or 19 is cleared to perform a disconnecting operation on the clutch 8 or 9 on the basis of the urging force of a spring or the like.

In the present embodiment, when the first clutch 8 is in the connected state, a rotation transmitting system from the output shaft 1a of the engine 1 to the power output shaft 12 via the first power distributor 4 and rotation transmitting means 15 (specifically, the speed reduction ratio obtained when the sun gear 4s of the first power distributor 4 has a rotation speed of zero) has a higher speed reduction ratio than a rotation transmitting system from the output shaft 1a of the engine 1 to the power output shaft 12 via the second power distributor 5 and rotation transmitting means 17 (specifically, the speed reduction ratio obtained when the sun gear 5s of the second power distributor 5 has a rotation speed of zero). More specifically, in the present embodiment, speed reduction ratios from the output shaft 1a of the engine 1 to the ring gears (input shafts) 4r and 5r of the power distributors 4 and 5 are the same and are set at, for example, "1". The gear ratio (ratio between the numbers of teeth) of the ring gears 4r or 5r to the sun gear 4s or 5s to the pinion gear 4p or 5p is the same for both power distributors 4 and 5. In this case, the ratio of the speed reduction ratio for the rotation transmitting system (hereinafter referred to as the "first distributor side rotation transmitting system") from the engine 1 to the power output shaft 12 via the first power distributor 4 and rotation transmitting means 15 to the speed reduction ratio for the rotation transmitting system (hereinafter referred to as the "second distributor side rotation transmitting system") from the engine 1 to the power output shaft 12 via the second power distributor 5 and rotation transmitting means 17 is the same as the ratio of the gear ratio (for the transmission of rotations from the gear 15a to the gear 15b) for the rotation transmitting means 15 to the gear ratio (for the transmission of rotations from the gear 17a to the gear 17b) for the rotation transmitting means 17. Accordingly, in the present embodiment, the speed reduction ratio for the rotation transmitting means 15 is higher than that for the rotation transmitting means 17. The speed reduction ratio is determined by dividing an input rotation speed by an output rotation speed. Thus, the gear ratio (ratio between the number of teeth) of the gear 15b to gear 15a of the rotation transmitting means 15 is set to be higher than that of the gear 17b to gear 17a of the rotation transmitting means 17.

In the present embodiment, the rotation transmitting means 15 and 17 have different speed reduction ratios so that the first and second distributor rotation transmitting systems have different speed reduction ratios as described above. However, the gear ratio of the ring gears 4r or 5r to the sun gear 4s or 5s to the pinion gear 4p or 5p may differ between the power distributors 4 and 5. Alternatively, the speed reduction ratio for the transmission of rotations from the engine 1 to the power distributor 4 may differ from the speed reduction ratio for the transmission of rotations from the engine 1 to the power distributor 5. In the description below, the speed reduction ratio for the first distributor rotation transmitting system will be referred to as a lower vehicle speed reduction ratio, while the speed reduction ratio for the second distributor rotation transmitting system will be referred to as a higher vehicle speed reduction ratio. The lower and higher vehicle speed reduction ratios are the maximum and minimum speed reduction ratios for speed changes between the output shaft 1a of the engine 1 and the power output shaft 12 in a CVT propulsion mode, described later. They are associated with low gear and high gear in a common transmission for a vehicle, respectively.

The first rotation regulating means 10 properly inhibits the rotation of the ring gear 4r, the input shaft of the first power distributor 4. The first rotation regulating means 10 is composed of a one-way clutch 20 that inhibits only the rotation of the ring gear 4r in a predetermined direction and forced braking means 23 that inhibits the rotation of the ring gear 4r via a locking mechanism 22 that is engaged with and disengaged from the ring gear 4r using the drive power of an actuator 21. In this case, the one-way clutch 20 permits the rotation of the ring gear 4r in the direction of an arrow Y1 in FIG. 1. However, the one-way clutch 20 uses a latch mechanism (not shown) to inhibit the rotation of the ring gear 4r in the opposite direction. Consequently, when the ring gear 4r is to rotate in the direction of the arrow Y1, the one-way clutch 20 is brought into an open operational state in which it permits the rotation. When the ring gear 4r is to rotate in the direction opposite to that of the arrow Y1, the one-way clutch 20 is brought into a braking operational state in which it inhibits the rotation. The one-way clutch 20 permits the same rotating direction (arrow Y1) (direction of a torque transmitted from the output shaft 1a of the engine 1 to the ring gear 4r) in which the ring gear 4r should be rotated by rotation transmissions from the engine 1 when the first clutch 8 is operated in the connected state during the operation of the engine 1. This rotating direction is the same as that of the output shaft 1a of the engine 1.

The locking mechanism 22 of the forced braking means 23 inhibits the rotation of the ring gear 4r by frictional engagement with or fitting into the ring gear 4r. The forced braking means 23 is brought into the braking operational state in which it inhibits the rotation of the ring gear 4r when the drive power of the actuator 21 is applied to engage the locking mechanism 22 with the ring gear 4r. The forced braking means 23 is brought into the open operational state in which it permits the rotation of the ring gear 4r when the drive power of the actuator 21 is cleared to disengage the locking mechanism 22 from the ring gear 4r. In this case, when the forced braking means 23 is in the braking state, the rotation of the ring gear 4r can be inhibited in both directions. However, the one-way clutch 20 always inhibits the rotation in the direction opposite to that of the arrow Y1 in FIG. 1. Thus, the forced braking means 23 is used to inhibit the rotation of the ring gear 4r in the direction of the arrow Y1.

The second rotation regulating means 11 properly inhibits the rotation of the carrier 5c, the first output shaft of the second power distributor 5. The second rotation regulating means 11 is composed of a one-way clutch 24 that inhibits only the rotation of the carrier 5c in a predetermined direction and forced braking means 27 that inhibits the rotation of the carrier 5c via a locking mechanism 26 that is engaged with and disengaged from the carrier 5c using the drive power of an actuator 25. The mechanical structures of the one-way clutch 24 and the locking mechanism 26 of the forced braking means 27 are similar to those of the one-way clutch 20 of the first rotation regulating means 10 and the locking mechanism 22 of the forced braking means 23. In this case, when the carrier 5c of the second power distributor 5 is to rotate in the direction of the arrow Y2 in FIG. 1, the one-way clutch 24 of the second rotation regulating means 11 is brought into the open operational state in which it permits the rotation. When the carrier 5c is to rotate in the direction opposite to that of the arrow Y2, the one-way clutch 24 is brought into the braking operational state in which it inhibits the rotation. The one-way clutch 24 permits the same rotating direction (arrow Y2) in which the carrier 5c should be rotated by the rotation transmission between the power output shaft 12, rotating in unison with the drive wheels 2, 2, and the carrier 5c when the second clutch 9 is operated in the connected state during the forward propulsion of the vehicle. The one-way clutch 24 inhibits the rotation of the carrier 5c in the opposite direction.

The forced braking means 27 of the second rotation regulating means 11 is brought into the braking operational state in which it inhibits the rotation of the carrier 5c when the drive power of the actuator 25 is applied to engage the locking mechanism 26 with the carrier 5c. The forced braking means 27 is brought into the open operational state in which it permits the rotation of the carrier 5c when the drive power of the actuator 25 is cleared to disengage the locking mechanism 26 from the carrier 5c. The forced braking means 27 is used to inhibit the rotation of the carrier 5c in the direction of the arrow Y2, which is permitted by the one-way clutch 24.

Each of the actuators 18, 19, 21, and 25 may be electric or hydraulic. The present embodiment employs the hydraulic type so as to utilize pressure oil from a hydraulic pump (not shown) driven by the engine 1 when it is operated. The hydraulic pump need not be exclusive to the actuators 18, 19, 21, and 25 but may be commonly mounted in vehicles as an oil pressure source for various hydraulic devices in the vehicles.

The apparatus according to the present embodiment comprises the electric arrangement described below in addition to the previously described mechanical arrangement. The apparatus comprises a battery 28 operating as a power source for the first and second motors 6 and 7, motor drive circuits 29 and 30 (power drive unit) that transmit power between each of the first and second motors 6 and 7 and the battery 28, and a controller 31 composed of an electronic circuit including a microcomputer or the like. Detected data from sensors (not shown) are inputted to the controller 31 and include the rotation speed NE of the engine 1, the opening TH (hereinafter referred to as the throttle opening TH) of a throttle valve in the engine 1, the speed V of the vehicle, and the amount of operations AP (hereinafter referred to as the an accelerator operation amount AP) performed on an accelerator pedal in the vehicle. The controller 31 controls the engine 1, the first and second motors 6 and 7, and the actuators 18, 19, 21, and 25 on the basis of the input data and already stored and held programs.

In this case, operations of the engine 1 are controlled via drive devices for a fuel injection device, the throttle valve, an ignition device, and an intake and exhaust valves in each cylinder, all of which are provided in the engine 1 (not shown). The first and second motors 6 and 7 are controlled by controlling currents conducting through the motors 6 and 7 via the motor drive circuits 29 and 30, respectively. The battery 28 is composed of a chargeable secondary battery or a mass capacitor such as an electric double layer capacitor.

Figure 2:
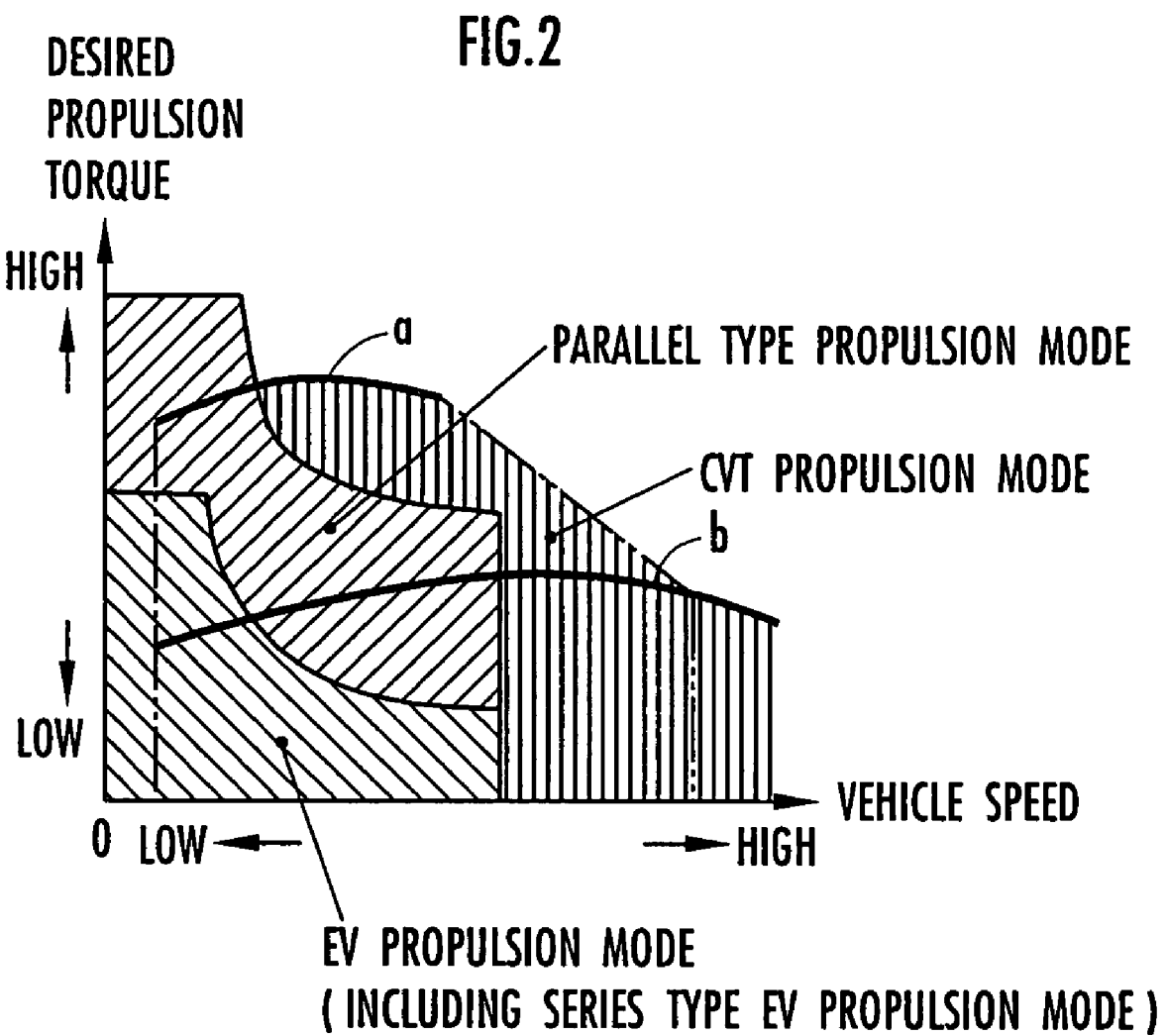
FIG. 2 is a graph showing propulsive modes of the hybrid vehicle according to the embodiment.
Figure 3:
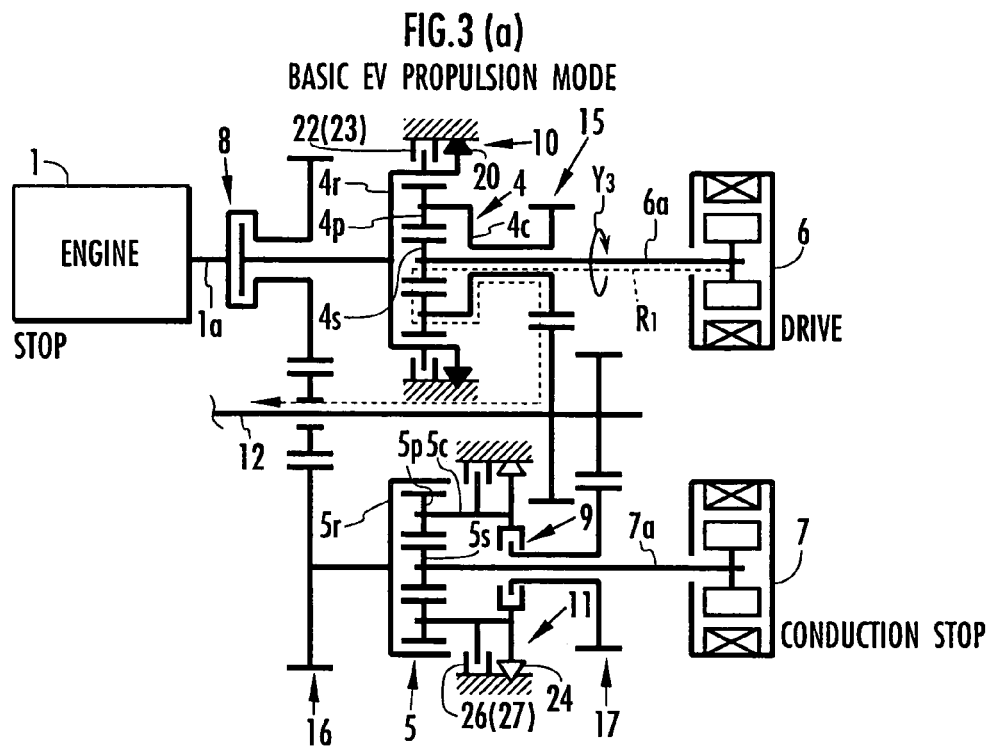
FIG. 3A is a diagram showing the operational state of the power transmitting apparatus observed when a vehicle is propelled forward in an EV propulsion mode (electric propulsion mode)
FIG. 3B is a diagram showing the operational state of the power transmitting apparatus observed when an engine is started in the EV propulsion mode.
Figure 3:
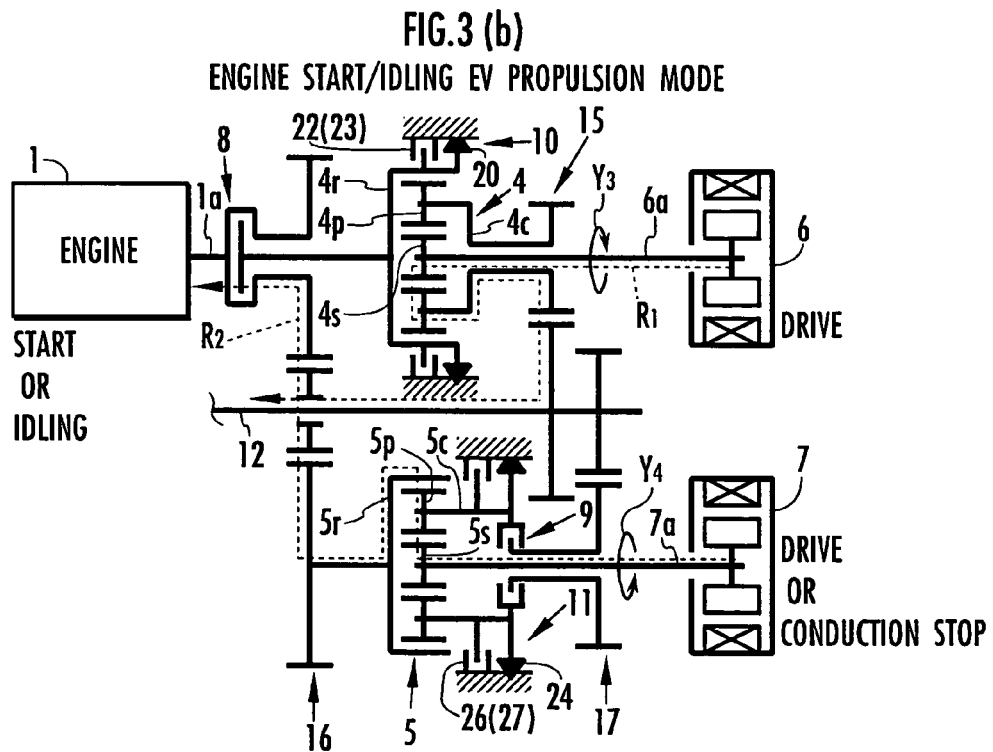

Now, with reference to FIGS. 2 to 8, description will be given of operations of the hybrid vehicle according to the present embodiment, including operations of the power transmitting apparatus 3. FIG. 2 is a graph illustrating propulsive modes of the vehicle. FIGS. 3 to 8 are diagrams illustrating the operation of the power transmitting apparatus 3 relating to each propulsive mode. First, with reference to FIG. 2, description will be given of the propulsive modes of the vehicle and a brief description will be given of the propulsive operation of the vehicle in each propulsive mode.

As main propulsion modes, the hybrid vehicle according to the present embodiment comprises a CVT propulsion mode (speed change propulsion mode) in which the vehicle is propelled using an output from the engine 1, while continuously changing the speed reduction ratio between the output shaft 1a of the engine 1 and the power output shaft 12 using the change gear ratio between the lower vehicle speed reduction ratio and the higher vehicle speed reduction ratio, an EV propulsion mode (electric propulsion mode) in which the vehicle is propelled using the drive torque of the first motor 6 without transmitting the output torque of the engine 1 to the power output shaft 12, and a parallel type propulsion mode in which the vehicle is propelled by transmitting the output torque of the engine 1 and the drive torque of the first motor 6 to the power output shaft 12 in parallel, as shown in FIG. 2. The vehicle is basically propelled in a propulsion mode dependent on the desired propulsive torque and the vehicle speed V. The desired propulsion torque of the vehicle is determined on the basis of the accelerator operation amount AP (detected value) and the vehicle speed V (detected value) using a map or the like.

In this case, the CVT mode is basically executed when the vehicle speed V is in a middle or high speed region. The EV propulsion mode is executed when the vehicle speed V and the desired propulsion torque are relatively low (also when the vehicle starts to move). The parallel type propulsion mode is executed when the vehicle speed V is in a low or the middle speed region and when the desired propulsive torque is in a high torque region. The EV propulsion mode includes a series type EV propulsion mode in which the vehicle is propelled using an output from the first motor 6, while using the output from the engine 1 allow the second motor 7 to regenerate power. The vehicle is propelled backward in the EV propulsion mode.

In FIG. 2, a curve a indicates the relationship between the maximum propulsive torque and vehicle speed V of the vehicle observed if the vehicle is propelled in the CVT propulsion mode with the speed reduction ratio between the output shaft 1a of the engine 1 and the power output shaft 12 fixed at the lower vehicle speed reduction ratio. A curve b indicates the relationship between the maximum propulsive torque and vehicle speed V of the vehicle observed if the vehicle is propelled in the CVT propulsion mode with the speed reduction ratio between the output shaft 1a of the engine 1 and the power output shaft 12 fixed at the higher vehicle speed reduction ratio. In the CVT propulsion mode, the vehicle can be propelled in the region enclosed by the curve a and the alternate long and two short dashes line.

The range for each propulsive mode shown in FIG. 2 is set so as to maximize the energy efficiency of the vehicle (energy efficiencies of the engine 1 and motors 6 and 7) while meeting the desired propulsion performance (acceleration performance and the like) of the vehicle. However, these propulsive modes are not strictly divided in accordance with the desired propulsive torque and the vehicle speed V. The propulsive mode is properly changed depending on the charged state of the battery 28 even with the same set of the desired propulsive torque and the vehicle speed V. In particular, in the vicinity of the boundary between propulsive modes (region in which one propulsive mode shifts to another), the propulsive mode is not immediately switched in accordance with the desired propulsive torque and the vehicle speed V. For example, to avoid frequently changing the propulsive mode, one propulsive mode shifts to another in a hysteretic mode or so as to minimize changes in the propulsive state (propulsive torque or the like) of the vehicle.

Description will be given of the operation of the power transmitting apparatus 3 in each propulsive mode and the operation of the power transmitting apparatus 3 performed when one propulsive mode shifts to another.

First, the EV propulsion mode will be described. The EV propulsion mode includes an EV propulsion mode (hereinafter referred to as a "forward EV propulsion mode") for the forward propulsion of the vehicle and an EV propulsion mode (hereinafter referred to as a "backward EV propulsion mode") for the backward propulsion of the vehicle. First, the forward EV propulsion mode will be described. The forward EV propulsion mode includes a basic EV propulsion mode in which the vehicle is propelled using the output from the first motor 6 while the operation of the engine 1 is stopped, a series type EV propulsion mode in which the vehicle is propelled using the output from the first motor 6 while operating the engine 1 to generate power for the second motor 7 (charge the battery 28) and an engine start/idling EV propulsion mode in which temporarily used when a shift occurs between the basic EV propulsion mode and the series type EV propulsion mode. In the region in which the vehicle is propelled in the frontward EV propulsion mode, the controller 31 basically selects the basic EV propulsion mode or the series type EV propulsion mode depending on the charged state (remaining capacity) of the battery 28. Then, the vehicle is propelled in the selected propulsion mode. For example, if the remaining capacity of the battery 28 is larger than a predetermined first threshold (a large amount of power is still available), the vehicle is propelled in the basic EV propulsion mode. If the remaining capacity of the battery 28 is smaller than a second threshold smaller than the first threshold (only a small amount of power is available), the vehicle is propelled in the series type EV propulsion mode. When the remaining capacity of the battery 28 decreases below the first threshold to reach the second threshold during the propulsion in the basic EV propulsion mode, the propulsion shifts to the series type EV propulsion mode. Moreover, when the remaining capacity increases above the second threshold to reach the first threshold during the propulsion in the series type EV propulsion mode, the propulsion shifts to the basic EV propulsion mode.

Figure 4:
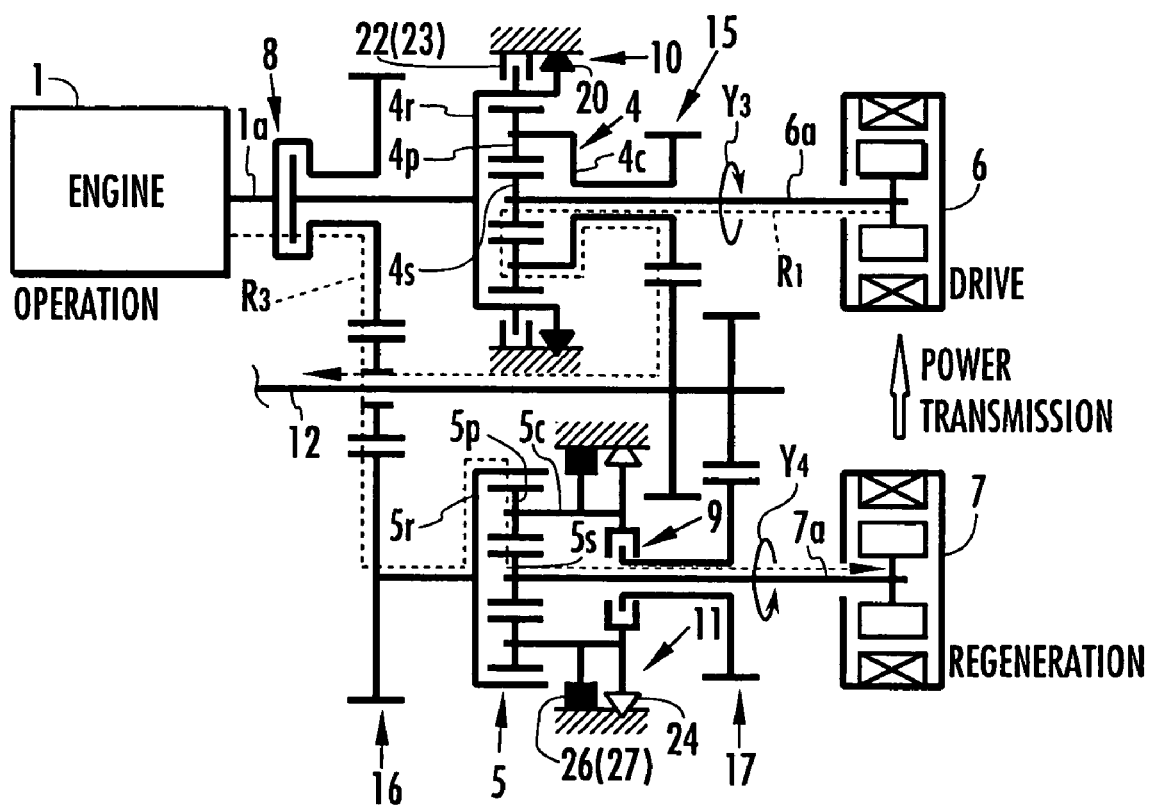
FIG. 4 is a diagram showing the operational state of the power transmitting apparatus observed when the vehicle is propelled forward in a series type EV propulsion mode.
Figure 5:
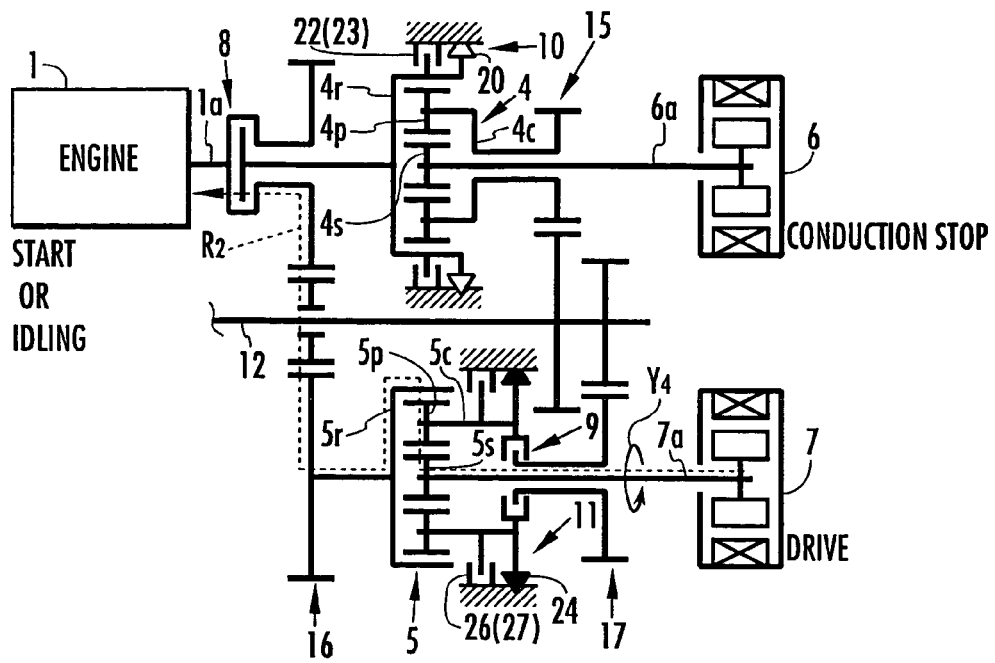
FIG. 5A is a diagram showing the operational state of the power transmitting apparatus observed when the engine is started before the vehicle starts traveling backward in the EV propulsion mode.
FIG. 5B is a diagram showing the operational state of the power transmitting apparatus observed when the vehicle is propelled backward in the EV propulsion mode.
Figure 5:
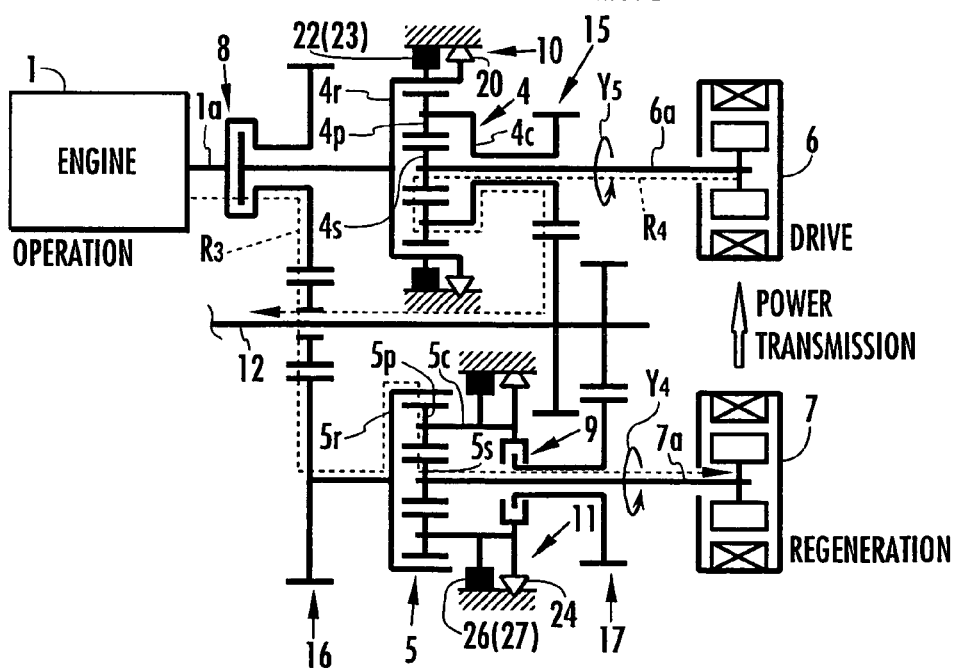

FIGS. 3A and 3B show the operations of the power transmitting apparatus 3 in the basic EV propulsion mode and in the engine start/idling EV propulsion mode, respectively. FIG. 4 shows the operation of the power transmitting apparatus 3 in the series type EV propulsion mode. In these figures, for the first and second clutches 8 and 9, a whitened representation indicates that the clutch is in the disconnected state, and a blackened representation indicates that the clutch is in the connected state. Likewise, for the one-way clutches 20 and 24 of the rotation regulating means 10 and 11, a blackened representation indicates that the rotation regulating means is in the braking operational state, and a whitened representation indicates that the rotation regulating means is in the open operational state. Moreover, for the forced regulating means 23 and 27 of the rotation regulating means 10 and 11, a blackened representation of the locking mechanism 22 or 26 indicates that the forced regulating means is in the braking state, and a whitened representation of the locking mechanism 22 or 26 indicates that the forced regulating means is in the open state. The meanings of the blackened and whitened representations also apply to FIGS. 5 to 8, described later.

In the basic EV propulsion mode, the first and second clutches 8 and 9 are in the disconnected state and the engine 1 is shut down as shown in FIG. 3A. The controller 31 controllably brings the first motor 6 into a drive state (motoring state) in which a drive torque is applied to the rotatable shaft 6a in the direction of an arrow Y3 in the figure. In this state, the ring gear 5r, carrier 5c, and sun gear 5s of the second power distributor 5 are not rotated. Accordingly, the one-way clutch 24 of the second rotation regulating means 11 is in the open operational state, while the conduction through the second motor 7 is stopped (no torque is generated). Since the engine 1 is shut down, the forced braking means 23 and 27 of the rotation regulating means 10 and 11 are in the open operational state.

When a drive torque is applied to the rotatable shaft 6a of the first motor 6 in the direction of an arrow Y3, it is transmitted from the rotatable shaft 6a of the first motor 6 to the power output shaft 12 via the sun gear 4s, pinion gear 4p, and carrier 4s of the first power distributor 4 and the rotation transmitting means 15 in this order. Thus, forward propulsion (including the start) of the vehicle is carried out. At this time, a torque acts on the ring gear 4r of the first power distributor 4 to rotate the ring gear 4r in the direction opposite to that in which the sun gear 4s rotates (=rotating direction in which the rotatable shaft 6a of the first motor 6 rotates). Accordingly, the one-way clutch 20 of the first rotation regulating means 10 is automatically brought in the braking state to inhibit the rotation of the ring gear 4r. In other words, the rotation of the ring gear 4r is thus inhibited to allow a torque to be transmitted from the first motor 6 to the power output shaft 12 as described above. At this time, the carrier 4c of the first power distributor 4 rotates in the same direction as that in which the sun gear 4s rotates.

The transmission of rotations from the first motor 6 to the power output shaft 12 in the forward EV propulsion mode, including the engine start/idling EV propulsion mode and series type EV propulsion mode, described later in detail, is the same as that in the basic EV propulsion mode. The speed reduction ratio for the transmission of rotations from the rotatable shaft 6a of the first motor 6 to the power output shaft 12 is constant. Accordingly, the rotation speed of the rotatable shaft 6a of the first motor 6 depends on the vehicle speed V (is in proportion to the vehicle speed V). In the forward EV propulsion mode, the controller 31 controllably sets the drive torque of the first motor 6 to a value (the torque of the first motor 6 required to generate the desired propulsive torque on the drive wheels 2, 2 of the vehicle) corresponding to the desired propulsive torque of the vehicle.

In the engine start/idling EV propulsion mode, when the engine 1 is started in the basic EV propulsion mode, the controller 31 controllably brings the second motor 7 into the drive state (motoring state) in which it generates a drive torque on its rotatable shaft 7a in the direction of an arrow Y4, while keeping both clutches 8 and 9 in the same operational state (disconnected state) as that in the basic EV propulsion mode, as shown in FIG. 3B. The operational state of the first rotation regulating means 10, the first motor 6, and the forced braking means 27 of the second rotation regulating means 11 is the same as that in the basic EV propulsion mode.

When a drive torque is applied to the rotatable shaft 7a of the second motor 7 in the direction of an arrow Y4, it is transmitted from the rotatable shaft 7a of the second motor 7 to the output shaft 1a of the engine 1 via the sun gear 5s, pinion gear 5p, and ring gear 5r of the second power distributor 5 and the rotation transmitting means 16 in this order, as shown by the broken-line arrow R2. That is, the engine 1 is cranked. In this state, the controller 31 performs a predetermined start control on the engine 1 (fuel injection and ignition control on the engine 1 and rotation speed control on the second motor 7) to start the engine 1. At this time, a torque acts on the carrier 5c of the second power distributor 5 to rotate the carrier 5c in the same direction as that in which the sun gear 5s rotates (=rotating direction in which the rotatable shaft 7a of the second motor 7 rotates). Accordingly, the one-way clutch 24 of the second rotation regulating means 11 is automatically brought in the braking state to inhibit the rotation of the carrier 5c. In other words, the rotation of the carrier 5c is thus inhibited to allow a torque to be transmitted from the second motor 7 to the output shaft 1a of the engine 1.

When the engine 1 is started, the controller 31 stops the conduction through the second motor 7 to zero the torque generated by the motor 7. The engine 1 is thus idly operated. During the idling operation, the one-way clutch 24 of the second rotation regulating means 11 is in the open state. When the engine 1 is stopped during the idling state thereof, the mode shifts to the basic EV propulsion.

In the series type EV propulsion mode, while the engine 1 is idling in the engine start/idling EV propulsion mode (see FIG. 3B), the controller 31 operates, via the actuator 25, the forced braking means 27 of the second rotation regulating means 11 in the braking state, as shown in FIG. 4. The controller 31 further controls the current (regenerative torque) conducting through the second torque 7, while allowing the engine 1 to generate an output required allow the second motor 7 to regenerate power. The operational state of both clutches 8 and 9, the first rotation regulating means 10, and the first motor 6 is the same as that in the basic EV propulsion mode.

Thus, regeneration for the second motor 7 is executed using the output from the engine 1 as an energy source. Then, the battery 28 is charged with the generated power. On this occasion, the ring gear 5r and sun gear 5s of the second power distributor 5 rotate in the same direction as in the case of the start of the engine 1 in the engine start/idling EV propulsion mode. However, the engine 1 applies a torque to the ring gear 5r via the rotation transmitting means 16. Thus, a torque is applied to the carrier 5c of the second power distributor 5 in the same direction as that in which the ring gear 5r rotates (this is the rotating direction permitted by the one-way clutch 24). However, the forced braking means 27 of the second rotation regulating means 11 inhibits the rotation of the ring gear 5r. Thus, as shown by a broken-line arrow R3 in the figure, a torque is transmitted from the output shaft 1a of the engine 1 to the rotatable shaft 7a of the second motor 7 via the rotation transmitting means 16 and the ring gear 5r, pinion gear 5p, and sun gear 5s of the second power distributor 5 in this order. Thus, the second motor 7 regenerates power.

When regeneration for the second motor 7 is executed in the series type EV propulsion mode, the controller 31 controls the engine 1 and the second motor 7 as described below. The controller 31 sets a target output of the engine 1 (= target generation output of the second motor 7) in accordance with the output of the first motor 6 (or desired propulsive torque and vehicle speed V), the remaining capacity of the battery 28, and the like. In this case, the controller 31 basically determines a larger value for the target output of the engine 1 as the output (power consumption) of the first motor 6 increases. Also the controller 31 determines a larger value as the remaining capacity of the battery 28 decreases. The controller 31 then determines an operational point (set of the target output torque and target rotation speed of the engine 1) at which the fuel consumption is lowest in generating the target output of the engine 1, that is, an operational point at which the energy efficiency is highest. The controller 31 then controls the throttle opening TH of the engine 1 in accordance with the target output torque at the operational point. The controller 31 further controls the regenerative torque (current conducting through) of the second motor 7 so as to match the actual rotation speed NE (detected value) of the engine 1 with the target rotation speed at the determined operational point. This makes it possible allow the second motor 7 to regenerate power to efficiently charge the battery 28, while operating the engine 1 at the operational point with the highest energy efficiency.

Moreover, if the target output of the engine 1 is relatively low (when the target output is below a predetermined value), the controller 31 halts some (for example, two) of all the cylinders (in the present embodiment, four cylinders) of the engine 1 in order to reduce the pumping loss of the engine 1. Some cylinders can be halted by stopping the injection of a fuel into these cylinders and keeping the intake and exhaust valves of each of the cylinders open or closed. This reduces the pumping loss of the engine 1. It is thus possible to allow the second motor 7 to regenerate power while operating the engine 1 with a high energy efficiency.

To shift from the series type EV propulsion mode to the basic EV propulsion mode, the current conducting through the second motor 7 is reduced to almost zero, the throttle opening of the engine 1 is set to the minimum value, and the engine 1 is let to idle. Thus, the engine start/idling EV propulsion mode is established. Then, stopping the engine 1 causes a shift to the basic EV propulsion mode.

As described above, in the forward EV propulsion mode, the first and second clutches 8 and 9 are brought into the disconnected state to enable the vehicle to be propelled using only the drive torque of the first motor 6, while allowing rotations (torques) to be transmitted between the engine 1 and the second motor 7 without affecting the propulsive state. As a result, it is possible to transmit the drive torque of the second motor 7 to the engine 1 to start the engine 1 (engine start/idling EV propulsion mode) or to propel the vehicle in the series type EV propulsion mode in which the output torque of the engine 1 is transmitted to the second motor 7 allow the second motor 7 to regenerate power (charge the battery 28) without influence on the propulsive state of the vehicle. In the series type EV propulsion mode, the second motor 7 can regenerate power using the output from the engine 1 regardless of the propulsive state of the vehicle. This ensures that the engine 1 can be operated at an operational point with a high efficiency. Therefore, the energy efficiency of the vehicle can be increased. Further, since the first rotation regulating means 10 comprises the one-way clutch 20, even when the engine 1 is stopped (energy of the output from the engine 1 cannot be supplied), it is possible to inhibit the rotation of the ring gear 4r of the first power distributor 4 and transmit the drive torque of the first motor 6 to the power output shaft 12 without using the actuator (without the need for energy). Similarly, since the second rotation regulating means 11 also comprises the one-way clutch 24, when the engine 1 is to be started, it is possible to inhibit the rotation of the carrier 5c of the second power distributor 5 and transmit the drive torque of the second motor 7 to the output shaft 1a of the engine 1 without using the actuator (without the need for energy).

Now, the backward EV propulsion mode will be described with reference to FIGS. 5A and 5B. In the backward EV propulsion mode, in which the vehicle is propelled backward, before the vehicle starts traveling in this propulsion mode, the engine 1 is started while the vehicle remains stopped. This is because the actuators 21 and 25 of the rotation regulating means 10 and 11 are used in the backward EV propulsion mode as described later. FIG. 5A shows the operational state in which the engine 1 is started. FIG. 5B shows the subsequent operational state in the backward EV propulsion mode.

As can be seen in FIG. 5A, the operational state of the power transmitting apparatus 3 observed when engine 1 is started is the same as that observed if the conduction through the first motor 6 is stopped (drive torque of the first motor 6 is set to zero) when the engine 1 is to be started in the engine start/idling EV propulsion mode, shown in FIG. 3B. Accordingly, the first and second clutches 8 and 9 are in the disconnected state. In this case, since the vehicle is stopped, the ring gear 4r of the first power distributor 4 does not rotate, whereas the one-way clutch 20 of the first rotation regulating means 10 is in the open state. Then, the engine 1 is started and subsequently starts idling in exactly the same manner as in the engine start/idling EV propulsion mode. On this occasion, the one-way clutch 24 of the second rotation regulating means 11 is brought into the braking state when the engine 1 is started (when a torque is transmitted from the second motor 7 to the engine 1). The one-way clutch 24 is brought into the open state when the engine 1 subsequently starts idling. The broken-line arrow R2 in FIG. 5A shows a path through which a torque is transmitted from the second motor 7 to the engine 1 when the engine 1 is started. This transmission path is the same as that shown in FIG. 3B.

When the engine 1 starts traveling in the backward EV propulsion mode after being started, the controller 31 operates the forced braking means 23 and 27 of the rotation regulating means 10 and 11 in the braking state via the actuators 21 and 25 as shown in FIG. 5B. Then, with the first and second clutches 8 and 9 remaining in the disconnected state, the controller 31 controllably brings the first motor 6 into the drive state (motoring state) in which it generates a drive torque on its rotatable shaft 6a in the direction of an arrow Y5. In this case, the direction of the drive torque of the first motor 6 is opposite to that in the basic EV propulsion mode. At this time, a toque acts on the ring gear 4r of the first power distributor 4 to rotate the ring gear 4r in the direction (rotating direction permitted by the one-way clutch 20 of the first rotation regulating means 10) opposite to that Y5 of the drive torque of the first motor 6. However, the rotation of the ring gear 4r is inhibited by the forced braking means 23. Thus, as shown by a broken-like arrow R4 in the figure, the torque (acting in the backward direction of the vehicle) is transmitted from the rotatable shaft 6a of the first motor 6 to the power output shaft 12 via the sun gear 4s, pinion gear 4p, and carrier 4c of the first power distributor 4 and the rotation transmitting means 15 in this order. The drive torque of the first motor 6 is controlled depending on the desired propulsive torque of the vehicle as in the case of the basic EV propulsion mode.

Moreover, in the backward EV propulsion mode, the controller 31 controls the current (regenerative torque) conducting through the second motor allow the second motor 7 to regenerate power (charge the battery 28), while causing the engine 1 to generate an output required allow the second motor 7 to regenerate power, as in the case of the series type EV propulsion mode. On this occasion, the forced braking means 27 inhibits the rotation of the carrier 5c of the second power distributor 5 (in the same direction as that in which the ring gear 5r rotates). The output torque from the engine 1 is thus transmitted to the second motor 7. In this case, during the regeneration by the second motor 7, the engine I and the second motor 7 are controlled as in the case of the series type EV propulsion mode. The engine 1 is operated at an operational point with a high efficiency. In this manner, the propulsion in the backward EV propulsion mode is similar to that in the series type EV propulsion mode.

In the backward EV propulsion mode according to the present embodiment, the second motor 7 regenerates power. However, the engine 1 may be idly operated without allowing the second motor 7 to regenerate power. In this case, the forced braking means 27 of the second rotation regulating means 11 need not be operated in the braking state.

In the above description, in the forward EV propulsion mode, the engine 1 is started in the engine start/idling EV propulsion mode while the vehicle is being propelled in the basic EV propulsion mode. However, the engine 1 may be started while the vehicle remains stopped before being started in the basic EV propulsion mode as in the case in which the engine 1 is started before the vehicle starts traveling in the backward EV propulsion mode. In this case, as in the case of the backward EV propulsion mode, the vehicle may start traveling forward while allowing the second motor 7 to regenerate power using the output from the engine 1. In other words, the vehicle can be started in the series type EV propulsion mode. Further, while the vehicle is being propelled in the EV propulsion mode other than the series type EV propulsion mode, the idling operation may be continued without stopping the engine 1.

Figure 6:
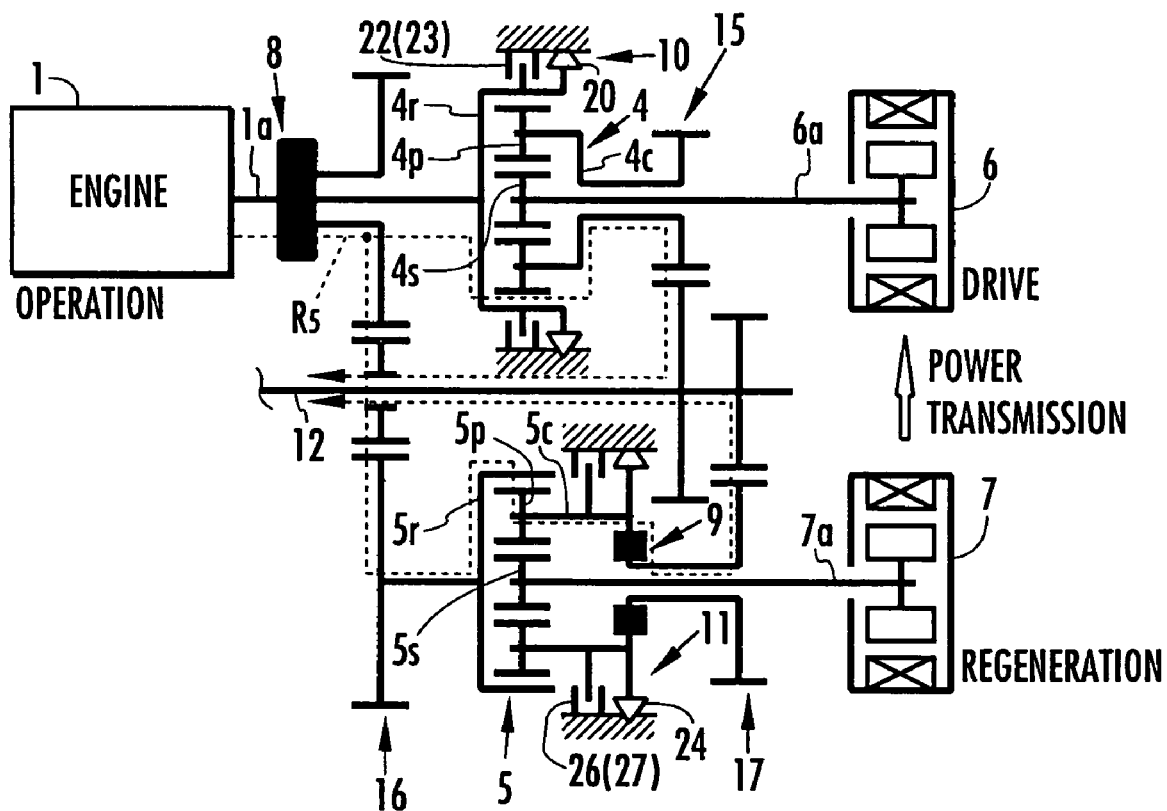
FIG. 6 is a diagram showing the operational state of the power transmitting apparatus in a CVT propulsion mode (speed change propulsion mode)
Figure 7:
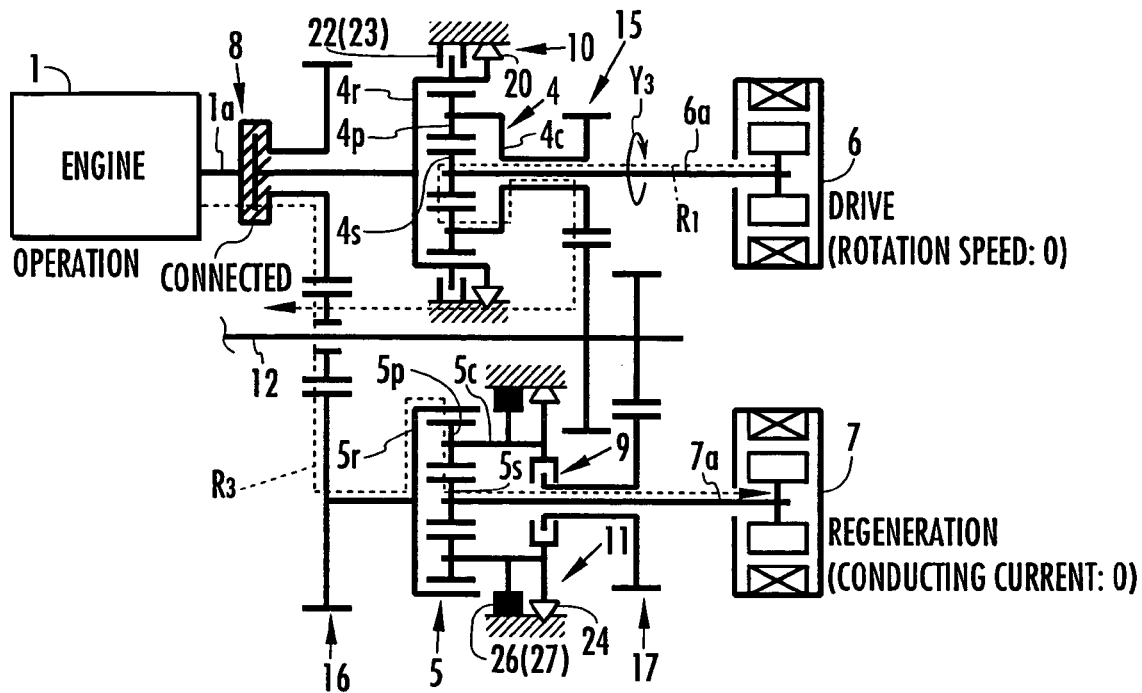
FIGS. 7A and 7B are diagrams showing the operational state of the power transmitting apparatus observed when a shift occurs between the series type EV propulsion mode and the CVT propulsion mode.
Figure 7:
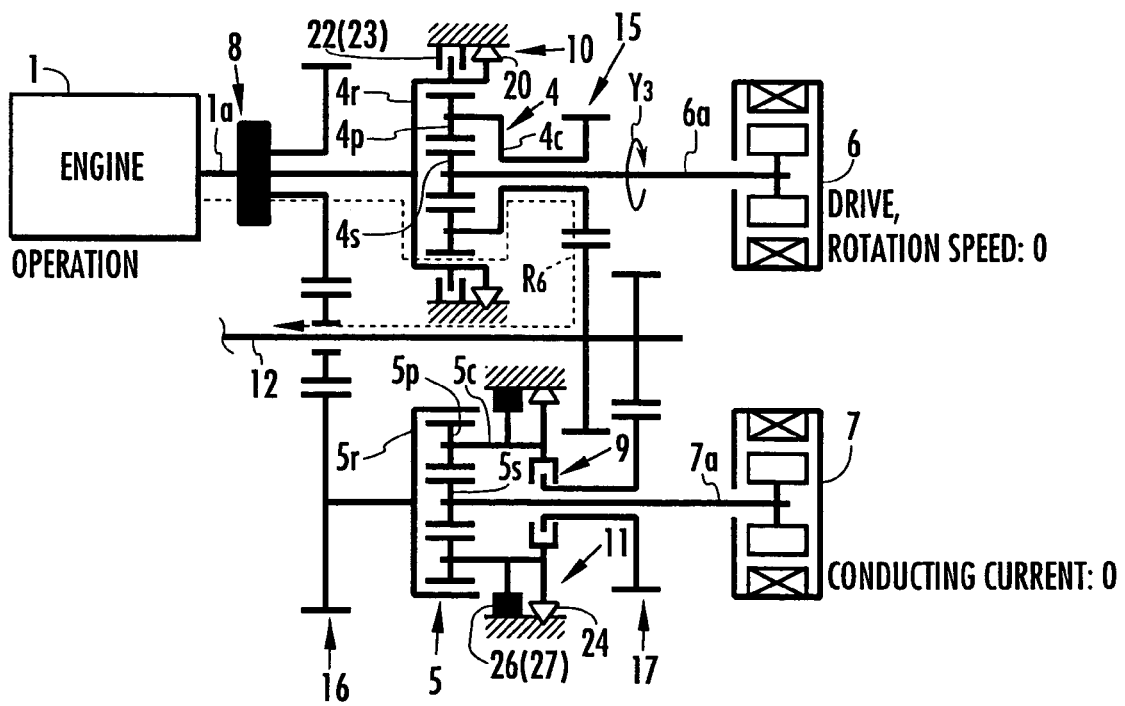

Now, the CVT propulsion mode (speed change propulsion mode) will be described with reference to FIG. 6. FIG. 6 shows the operational state of the power transmitting apparatus 3 in the CVT propulsion mode. In the CVT propulsion mode, while the engine 1 is being operated, the controller 31 operates the first and second clutches 8 and 9 in the connected state via the actuators 18 and 19. The forced braking means 23 and 27 of the rotation regulating means 10 and 11 are in the open state. Since the first clutch 8 is in the connected state, the ring gear 4r of the first power distributor 4 rotates with the output shaft 1a of the engine 1. Consequently, the one-way clutch 20 of the first rotation regulating means 10 is in the open state. Further, since the second clutch 9 is in the connected state, the carrier 5c of the second power distributor 5 rotates in unison with the power output shaft 12. Consequently, the one-way clutch 24 of the second rotation regulating means 11 is in the open state.

In this state, the controller 31 controls the operations of the engine 1 and motors 6 and 7 as described below. On the basis of the desired propulsive torque and vehicle speed V of the vehicle, the controller 31 determines a target output from the engine 1 which enables the corresponding energy to be supplied to the drive wheels 2, 2 of the vehicle. Moreover, the controller 31 determines a set of the target output torque and target rotation speed of the engine 1 corresponding to an operational point of the engine 1 at which the engine has the highest energy efficiency (lowest fuel consumption) in generating the target output. The target output, the target output torque, and the target-rotation speed are determined using a map or the like. The controller 31 controls the throttle opening TH of the engine 1 in accordance with the target output torque. The controller 31 further determines the target load torque of the engine iso that the actual rotation speed NE (detected value) of the engine 1 converges to the target rotation number. The target load torque is determined by, for example, correcting the target output torque on the basis of a manipulated variable determined from the deviation between the actual rotation speed NE of the engine 1 and the target rotation speed in accordance with a feedback control rule such as a PI control rule.

Moreover, the controller 31 determines the target drive torque (proportional to the desired propulsive torque) of the power output shaft 12 in accordance with the desired propulsive torque of the vehicle, the target drive torque allowing the desired propulsive torque to be provided to the drive wheels 2, 2. Then, on the basis of the target load torque of the engine 1 and the target drive torque of the power output shaft 12, both determined as described above, the controller 31 determines the target torques of the first and second motors 6 and 7 as described below.

Here, the load torque of the engine 1 is defined as Te, the drive torque of the power output shaft 12 is defined as Tv, and the torques generated by the motors 6 and 7 are defined as T1 and T2. In a steady state, the relational expressions (1) and (2) shown below are established.

$$Te=(1/k1)\cdot T1+(1/k2)\cdot T2 \quad (1)$$

$$Tv=k3\cdot T1+k4\cdot T2 \quad (2)$$

In Expressions (1) and (2), k1 denotes the speed reduction ratio for the transmission of rotations from the output shaft 1*a* of the engine 1 to the first motor 6, and k2 denotes the speed reduction ratio for the transmission of rotations from the output shaft 1*a* of the engine 1 to the second motor 7. k3 denotes the speed reduction ratio for the transmission of rotations from the rotatable shaft 6*a* of the first motor 6 to the power output shaft 12, and k4 denotes the speed reduction ratio for the transmission of rotations from the rotatable shaft 7*a* of the first motor 7 to the power output shaft 12. The power transmitting apparatus 3, configured according to the present embodiment, have the speed reduction ratios k1, k2, k3, and k4. Of these, the speed reduction ratios k1 and k2 are constants each determined by the gear ratio of the ring gear 4*r* or 5*r* to the sun gear 4*s* or 5*s* of the power distributor 4 or 5. The speed reduction ratios k3 and k4 are constants each determined by the gear ratio of the ring gear 4*r* or 5*r* to the sun gear 4*s* or 5*s* of the power distributor 4 or 5 and the speed reduction ratio for the rotation transmitting means 15 or 17. More specifically, the gear ratio (ratio between the numbers of teeth) of the sun gear 4*s* or 5*s* to the ring gear 4*r* or 5*r* of the power distributor 4 or 5 is defined as a (in the present embodiment, this value is the same for both power distributors 4 and 5), the gear ratio of the gear 15*b* to the gear 15*a* of the rotation transmitting means 15 (speed reduction ratio for the transmission of rotations from the gear 15*a* to the gear 15*b*) is defined as α, and the gear ratio of the gear 17*b* to the gear 17*a* of the rotation transmitting means 17 (speed reduction ratio for the transmission of rotations from the gear 17*a* to the gear 17*b*) is defined as β(<α). Then, k1=k2=a, k3=((1+a)/a)·α, k4=((1+a)/a)·β. Using a, α, and β, described above, the lower vehicle speed reduction ratio and the higher vehicle speed reduction ratio are expressed as (1+a)·α and (1+a)·β.

In determining the target torques T1 and T2 of the motors 6 and 7 in the CVT propulsion mode, the controller 31 determines them from the target load torque (corresponding to Te in Equation (1)) of the engine 1 and the target drive load torque (corresponding to Tv in Equation (2)) of the power output shaft 12, both determined as previously described, on the basis of Equations (1) and (2). The controller 31 controls the current conducting through the motor 6 and 7 according to the target torques T1, T2.

When the engine 1 and the motors 6 and 7 are controlled as described above, basically, the first motor 6 is controllably brought into the drive state in which it generates a drive torque (motoring torque) equal to the target torque T1. The second motor 7 is controllably brought into the regenerative state (generation state) in which it generates a regenerative torque equal to the target torque T2. Then, in the steady state, the power consumption of the first motor 6 in the drive state is balanced-with the power generation of the second motor 7 in the regenerative state (power consumption substantially equals power generation). Specifically, the output energy from the engine 1 is partly transmitted to the power output shaft 12 through the second motor 7 in the regenerative state and the first motor 6 in the drive state. On this occasion, between the engine 1 and the power output shaft 12, a speed change operation is performed with a speed reduction ratio between the lower vehicle speed reduction ratio and the higher vehicle speed reduction ratio. The output from the engine 1 is transmitted to the power output shaft 12 to propel the vehicle in the CVT propulsion mode. In this case, as shown by a broken-line arrow R5 in FIG. 6, the output torque from the engine 1 is distributed to the power distributors 4 and 5 using the first clutch 8. The torque distributed to the first power distributor 4 is transmitted to the power output shaft 12 via the ring gear 4*r*, pinion gear 4*p*, and carrier 4*c* of the first power distributor 4 and the rotation transmitting means 15 in this order. The torque distributed to the second power distributor 5 is transmitted to the power output shaft 12 via the ring gear 5*r*, pinion gear 5*p*, and carrier 5*c* of the second power distributor 5 and the rotation transmitting means 17 in this order. The transmitted torques are combined together at the power output shaft 12 and the combined torque is outputted from the power output shaft 12 to the drive wheels 2, 2.

For a supplementary description, the rotation speed of the output shaft 1*a* of the engine 1 is defined as ωe (=NE), the rotation speed of the power output shaft 12 is defined as ωv, and the rotation speeds of rotatable shafts 6*a* and 7*a* of the motors 6 and 7 are defined as ω1 and ω2. Then, Relational Expressions (3) and (4) are established.

$$\omega e=(1+a)\cdot\alpha\cdot\omega v-a\cdot\omega 1 \quad (3)$$

$$\omega e=(1+a)\cdot\beta\cdot\omega v-a\cdot\omega 2 \quad (4)$$

In the CVT propulsion, (1+a)·α>ωe/ωv>(1+a)·β. (1+a)·α is the lower vehicle speed reduction ratio (speed reduction ratio for the first distributor rotation transmission system). (1+a)·β is the higher vehicle speed reduction ratio (speed reduction ratio for the second distributor rotation transmission system).

With reference to FIGS. 4 and 6, previously described, and FIGS. 7A and 7B, description will be given of operations performed for a shift between the CVT propulsion mode and the series type EV propulsion mode. FIGS. 7A and 7B show a transitional operational state for the shift. When the series type EV propulsion mode shown in FIG. 4 shifts to the CVT propulsion in FIG. 6, it proceeds through the operational state shown in FIG. 7A to the operational state shown in FIG. 7B (corresponding to a transition mode according to the preset invention) before shifting to the CVT propulsion mode, shown in FIG. 6. In the operational state in FIG. 7B (hereinafter referred to as the "transitional mode state"), the first and second clutches 8 and 9 are in the connected state and the disconnected state, respectively. The forced braking means 23 of the first rotation regulating means 10 and the forced braking means 27 of the second rotation regulating means 11 are in the open state and the braking state, respectively. The first motor 6 generates a drive torque (acting in the direction of the arrow Y3) comparable to that in the series type EV propulsion mode and has a rotation speed of zero. Almost no current conducts through the second motor 6, which thus does not generate any torque. The one-way clutches 20 and 24 of the rotation regulating means 10 and 11 are in the open state. In the transitional mode state, as shown by a broken-line arrow R6 in the figure, an output torque from the engine 1 is transmitted from the output shaft 1a to the power output shaft 12 via the first clutch 8, the ring gear 4r, pinion gear 4p, and carrier 4c of the first power distributor 4, and the rotation transmitting means 15 in this order. This state corresponds to the case in which the speed reduction ratio is set equal to the lower vehicle speed reduction ratio (=(1+a)·α) in the CVT propulsion mode.

With reference to FIG. 7A, description will be given of operations performed for a shift from the series type EV propulsion mode, to the transitional mode. The controller 31 gradually connects the first clutch 8 via the actuator 18 while keeping the second clutch 9 and the forced braking means 27 of the second rotation regulating means 11 in the connected state and the braking state (the same as that in the series type EV propulsion mode), respectively. Accordingly, in the state shown in FIG. 7A, the first clutch 8 is in the intermediate state between the connected state and the disconnected state. Thus, in FIG. 7A, the first clutch 8 is shaded. In this case, the controller 31 keeps the drive torque of the first motor 5 equal to the torque (drive torque dependent on the desired propulsion torque of the vehicle) generated during the propulsion in the series type EV propulsion mode. Further, the target output torque of the engine 1 is set at a value slightly larger than a value (equal to the torque transmitted from the first motor 5 to the ring gear 4r of the first power distributor 4) balanced with the drive torque of the first motor 5. Then, the throttle opening TH of the engine 1 is controlled in accordance with the target output torque. At the same time, the controller 31 sets the target rotation speed of the engine 1 at a value (of the rotation speed of the engine 1 obtained if the vehicle is propelled at the current vehicle speed V with the speed reduction ratio between the engine 1 and the power output shaft 12 fixed to the lower vehicle speed reduction ratio) corresponding to the current vehicle speed V in the transitional mode. The controller 31 controls the regenerative torque of the second motor 7 so as to keep the actual rotation speed NE (detected value) of the engine 1 at the target value. When the engine 1 and the motors 6 and 7 are thus controlled while connecting the first clutch 8, a rotational torque is gradually transmitted from the engine 1 to the ring gear 4r of the first power distributor 4. The ring gear 4r then starts to rotate in the rotating direction (the same as that of the output shaft 1a of the engine 1) permitted by the one-way clutch 20 (the one-way clutch 20 is automatically brought into the open operational state). Correspondingly, the rotation speed of the rotatable shaft 6a of the first motor 6 decreases. Since the output torque of the engine 1 is gradually transmitted to the first power distributor 4, the regenerative torque of the second motor 7 is gradually reduced in order to keep the actual rotation speed NE of the engine 1 at the target value. When the rotation speed of the first motor 6 is close to zero, the controller 31 adjusts the throttle opening TH of the engine 1 so as to keep the rotation speed of the first motor 6 at zero. On this occasion, the torque generated by the second motor 6 becomes almost zero, and the conduction through the second motor 7 is stopped. Thus, the mode finally shifts to the transitional state in FIG. 7B.

In the transitional mode established as a result of the shift as described above, the output torque from the engine 1 is not transmitted to the second power distributor 5 but to the power output shaft 12 only via the first power distributor 4 to propel the vehicle. Thus, in the transitional mode, even if the operational state of the second clutch 9 or the forced braking means 27 of the second rotation regulating means 11 is switched, no torque acts on the second power distributor 5. Accordingly, the propulsive state of the vehicle is not affected. Thus, in the transitional mode, the controller 31 then switches the operational state of the second clutch 9 from the disconnected state to the connected state via the actuator 19. The controller 31 also switches the operational state of the forced braking means 27 of the second rotation regulating means 11 from the braking state to the open state via the actuator 25. Then, the operational state of each of the clutches 8 and 9 and the rotation regulating means 10 and 11 is the same as that in the CVT propulsion mode shown in FIG. 6. The controller 31 then starts controlling the engine 1 and the motors 6 and 7 in the previously described CVT propulsion mode. The vehicle is thus propelled in the CVT propulsion mode.

When shifting from the CVT propulsion mode to the series type EV propulsion mode, in the CVT propulsion mode shown in FIG. 6, the controller 31 sets the target output torque of the engine 1 at a value that enables the generation of the desired propulsive torque of the vehicle in the previously described transitional mode (the speed reduction ratio between the engine 1 and the power output shaft 12 is fixed to the lower vehicle speed reduction ratio), while maintaining the operational state of the clutches 8 and 9 and rotation regulating means 10 and 11. The controller 31 also sets the target rotation speed of the engine 1 at a value (rotation speed of the engine 1 obtained if the vehicle is propelled at the current vehicle speed V with the speed reduction ratio between the engine 1 and the power output shaft 12 fixed to the lower vehicle speed reduction ratio) corresponding to the current vehicle speed V in the transitional mode. Then, the controller 31 controls the throttle opening TH of the engine 1 and the torques of the motors 6 and 7 in accordance with the set target output torque and rotation speed of the engine 1 as described for the previously described CTV propulsion mode. Thus, the rotation speed of the first motor 6 becomes almost zero, and the torque (drive torque) generated by the first motor 6 is controllably set at a value balanced with the output toque from the engine 1. Moreover, almost no current conducts through the second motor 7, which thus does not generate any torque. In this state, the controller 31 switches the operational state of the second clutch 9 from the connected state to the disconnected state. The controller 31 also switches the operational state of the forced braking means 27 of the second rotation regulating means 11 from the open state to the braking state. Thus, the CVT propulsion mode in FIG. 6 shifts to the transitional mode in FIG. 7B.

Then, the controller 31 causes the components to perform the operation shown in FIG. 7A. Specifically, the controller 31 gradually switches the operational state of the first clutch 9 from the connected state to the disconnected state while maintaining the drive torque of the first motor 6 at the value (of the torque corresponding to the desired propulsive torque of the vehicle) for the transitional mode. At this time, the controller 31 increases the regenerative torque of the second motor 7 so as to keep the rotation speed NE of the engine 1 at the value for the transitional mode. The rotation speed of the first motor 6 increases as the disconnection of the first clutch 8 is established. When the operational state of the first clutch 9 is close to the disconnected state, a torque from the first motor 6 acts on the ring gear 4r of the first power distributor 4 to rotate the ring gear 4r in the direction opposite to the rotating direction permitted by the one-way clutch 20. As a result, the one-way clutch 20 is automatically brought into the braking state. Then, once the first clutch 9 reaches the fully disconnected state, the series type EV propulsion mode in FIG. 4 is established. Subsequently, the controller 31 controls the engine 1 and the motors 6 and 7 as previously described for the series type EV propulsion mode.

As described above, by using the transitional state mode in which no torque acts on the second power distributor 5 when carrying out a shift between the series type EV propulsion mode and the CVT propulsion mode, it is possible to smoothly shift the propulsive mode while maintaining the propulsive state of the vehicle. In particular, for a shift between the series type EV propulsion mode and the transitional mode (FIG. 7A), the one-way clutch 20 can automatically brake the rotation of the ring gear 4r of the first power distributor 4 and release the braking without the need for special control.

Figure 8:
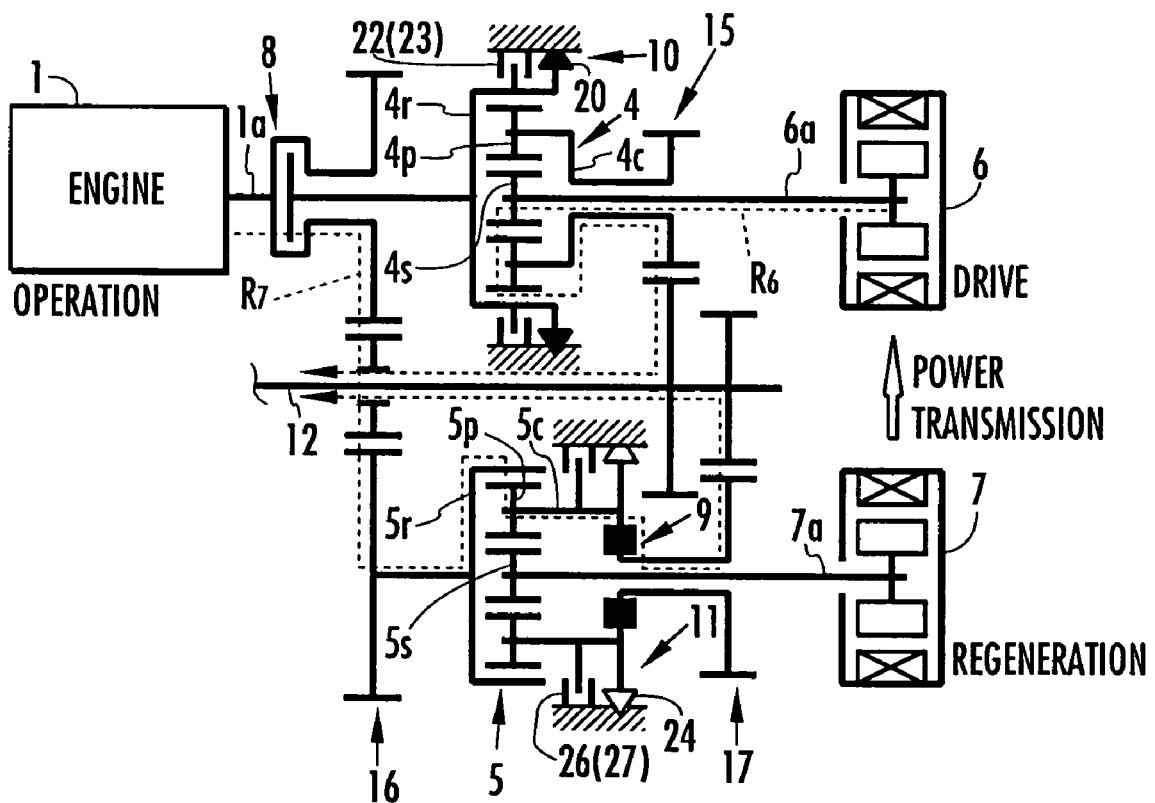
FIG. 8 is a diagram showing the operational state of the power transmitting apparatus in a parallel type propulsion mode.

Now, the parallel type propulsion mode will be described with reference to FIG. 8. In the parallel type propulsion mode, as shown in FIG. 8, the controller 31 controllably brings the first and second clutches 8 and 9 into the connected or disconnected state. The forced braking means 23 and 24 of the rotation regulating means 10 and 11 are in the open state. The first motor 6 is controllably brought into the drive state in which it generates a drive torque required to propel the vehicle. The second motor 7 is controllably brought into the drive state in which it generates a regenerative torque. The one-way clutch 20 of the first rotation regulating means 10 is in the braking state as in the case of the basic EV propulsion mode. Since the second clutch 9 is in the connected state, the one-way clutch 24 of the second rotation regulating means 11 is in the open state. In the operational state of the parallel type propulsion mode, as shown by the broken-line arrow R6 in the figure, the drive torque of the first motor 5 is transmitted to the power output shaft 12 via the sun gear 4s, pinion gear 4p, and carrier 4c of the first power distributor 4, and the rotation transmitting means 15 in this order. At the same time, as shown by a broken-line arrow R7 in the figure, the output torque from the engine 1 is transmitted to the power output shaft 12 via the power transmitting means 16, and the ring gear 5r, pinion gear 5p, and carrier 5c of the second power distributor 5, the second clutch 9, and the rotation transmitting means 17 in this order. Then, the torque from the first motor 6 and the torque from the engine 1 are combined together at the power output shaft 12. The combined torque is then outputted to the drive wheels 2, 2.

In this case, more specifically, in the parallel type propulsion mode, the engine 1 and the motors 6 and 7 are controlled as described below. The target output from the engine 1 is determined depending on the desired propulsive torque and vehicle speed V of the vehicle, using a map or the like. The target output is included in the total energy of the vehicle to be generated in association with the desired propulsion torque and vehicle speed V of the vehicle, and is to be provided by the engine 1. Then, the target output torque and target rotation speed of the engine 1 are determined which correspond to an operational point at which the engine 1 has the highest fuel efficiency in generating the target output. Moreover, the target torque T2 of the second motor 7 is determined from the target output torque Te of the engine 1 and the speed reduction ratio (=a) for the transmission of rotations from the engine 1 to the second motor 7, using Expression (5). Expression (5) is equivalent to Equation (1) in which T1=0.

$$T2 = a \cdot Te \qquad (5)$$

Moreover, the target torque T1 of the first motor 6 is determined, on the basis of Expression (2), from the target drive torque Tv of the power output shaft 12, depending on the desired propulsive torque, and the target torque T2 of the second motor 7, determined using Equation (5).

Then, the throttle opening of the engine 1 is controlled in accordance with the target output torque Te of the engine 1. Further, the motors 6 and 7 are controllably energized in accordance with the target torques T1 and T2.

The above described operations in the parallel type propulsion mode allow the vehicle to be propelled while transmitting the output torque from the engine 1 and the drive torque of the first motor 6 to the power output shaft 12 in parallel. The energy efficiency in the parallel type propulsion mode is generally lower than that in the EV propulsion mode or CVT propulsion mode. However, in the parallel type propulsion mode, a propulsive torque can be generated which is higher than that generated in the EV propulsion mode or CVT propulsion mode. Accordingly, as shown in FIG. 2, previously described, the parallel type propulsion mode is basically used in regions that require a high propulsive torque at relatively low vehicle speed.

A shift between the parallel type propulsion mode and the EV propulsion mode (forward EV propulsion mode) is carried out using the engine start/idling EV propulsion mode (more specifically, the mode in which the engine 1 is let to idle), shown in FIG. 3B, previously described. When the EV propulsion mode shifts to the parallel type propulsion mode, it proceeds from the basic EV propulsion mode or series type EV propulsion mode to the engine start/idling EV propulsion mode, shown in FIG. 3B to make the engine in the idling state. Then, the controller 31 operates the second clutch 9 in the connected state. At this time, the conduction through the second motor 7 remains stopped and the second motor 7 does not generate any torque. Consequently, connection of the second clutch 9 does not change the propulsive state of the vehicle. Then, the carrier 5c of the second power distributor 5 rotates in the rotating direction permitted by the one-way clutch 24, in union with the rotation of the power output shaft 12. Then, in the state in which the second clutch 9 is in the connected state, the controller 31 starts the previously described control of the parallel type propulsion mode.

When the parallel type propulsion mode is shifted to the EV propulsion mode, since the desired propulsive torque is lower in the parallel type propulsion mode, the controller 31 reduces the target output included in the total energy of the vehicle to be generated in association with the desired propulsion torque and vehicle speed V of the vehicle, the target output being to-be provided by the engine 1. Then, the controller 31 finally reduces the target output of the engine 1 down to zero. The controller 31 further controllably sets the throttle opening TH of the engine 1 at the minimum value so as to let the engine 1 idle. At this time, the previously described control in the parallel type propulsion mode zeroes the torque of the second motor 7. Further, the torque of the first motor 6 is controllably set to a value corresponding to the desired propulsive torque of the vehicle. In this state, the second clutch 9 is operated in the disconnected state to shift the operational state to the one (idling state of the engine 1) in the previously described engine start/idling EV propulsion mode without changing the propulsive state of the vehicle. Subsequently, the vehicle is propelled in the previously described basic EV propulsion mode or series type EV propulsion mode.

The parallel type propulsion mode is also shifted to the CVT propulsion mode using the previously described engine start/idling EV propulsion mode. Specifically, as in the case of the shift from the parallel type propulsion mode to the EV propulsion mode, the parallel type propulsion mode first shifts to the engine start/idling EV propulsion mode. Then, in the engine start/idling EV propulsion mode, the controller 31 switches the operational state of the second clutch 9 from the connected state to the disconnected state. The controller 31 also switches the forced braking means 27 of the second rotation regulating means 11 from the open state to the braking state. The state after the switching is comparable to that in the series type EV propulsion mode. Thus, subsequently, the controller 31 causes a shift to the CVT propulsion mode via the operational state shown in FIGS. 7A and 7B as in the case of the previously described shift from the series type EV propulsive mode to the CVT propulsive mode.

When the CVT propulsion mode shifts to the parallel type propulsion mode, it first shifts to the series type EV propulsion mode from the CVT propulsion mode. Then, in the series type EV propulsive mode, the throttle valve of the engine 1 is closed, the conduction through the second motor 7 is blocked, the torque generated by the second motor 7 is zeroed. Then, the forced braking means 27 of the second rotation regulating means 11 is operated in the open state to cause a shift to the engine state/idling EV propulsion mode. Subsequently, as in the case of the shift from the EV propulsion mode to the parallel type propulsion mode, the engine start/idling EV propulsion mode shifts to the parallel type propulsion mode.

As described above, the power transmitting apparatus 3 according to the present embodiment comprises the first and second clutches 8 and 9 and the first and second rotation regulating means 10 and 11. The vehicle can be selectively propelled in the EV propulsion mode including the series type EV propulsion mode, the CVT propulsion mode, and the parallel type propulsion mode. Consequently, the energy efficiency can be increased while meeting the propulsion performance of the vehicle. Furthermore, the shifts between the propulsion modes can be smoothly accomplished.

The above described embodiment shows the example in which the apparatus comprises the pinion gear devices as the power distributors. However, for example, differential bevel gear devices may be used as the power distributors.

Figure 9:
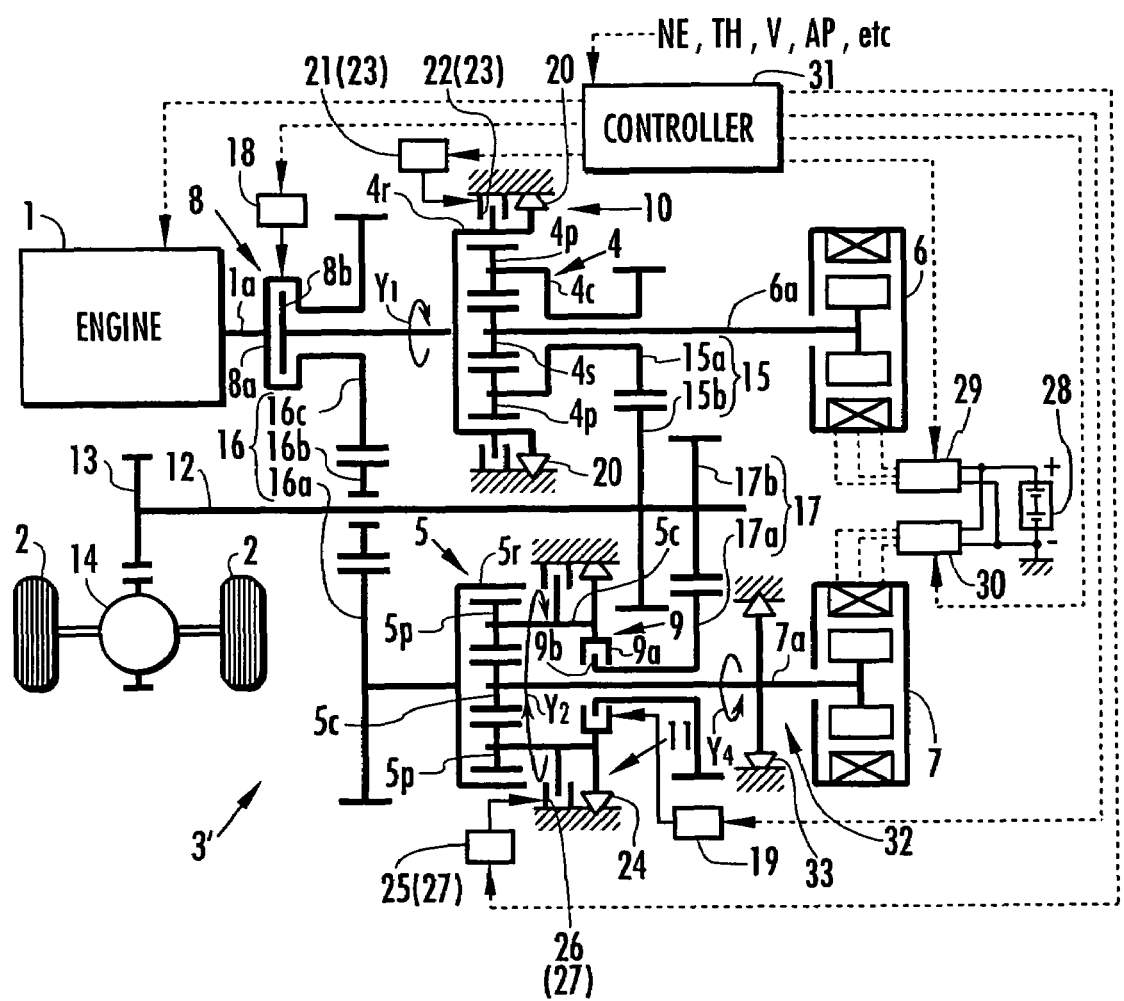
FIG. 9 is a diagram schematically showing the general system configuration of a hybrid vehicle comprising a second embodiment of a power transmitting apparatus according to the present invention.

Now, with reference to FIG. 9, description will be given of a second embodiment of a power transmitting apparatus according to the present invention. FIG. 2 is a diagram schematically showing the general system configuration of a hybrid vehicle including the power transmitting apparatus according to the present embodiment. The present embodiment is the same as the first embodiment except for a part of the configuration. The same components of the second embodiment as those of the first embodiment are denoted by the same reference numerals as those in the first embodiment. Their description is thus omitted.

With the power transmitting apparatus 3, when the engine 1 becomes inoperative (the engine stops generating an output) for any reason while the vehicle is being propelled in the CVT propulsion mode, the rotation speed of the engine 1 decreases down to zero. In particular, if the engine 1 becomes inoperative in a high vehicle speed region in which the vehicle speed V is high, the rotation speed of one of the first and second motors 6 and 7 which is associated with the first distributor rotation transmitting system with the lower vehicle speed reduction ratio, that is, the first motor 6, increases above a service rotation speed region in the CVT propulsion mode. According to the second embodiment, even if the engine 1 becomes inoperative during the propulsion in the CVT propulsion mode as described above, it is possible to prevent an excessive increase in the rotation speed of the first motor 6 associated with the first distributor rotation transmitting system with the lower vehicle speed reduction ratio.

Description will be given below of the configuration of a power transmitting apparatus 3' according to the second embodiment. As shown in FIG. 9, in the present embodiment, the power transmitting apparatus 3' comprises third rotation regulating means 32 for inhibiting the rotation of the rotatable shaft 7a of the second motor 7 (which is also the rotatable shaft of the sun gear 5s operating as the second output shaft of the second power distributor 5). The other arrangements are the same as those of the power transmitting apparatus 3 of the first embodiment.

The third rotation regulating means 32 is composed of a one-way clutch 33 that inhibits the rotation of the rotatable shaft 7a of the second motor 7 in a predetermined direction. Like the one-way clutches 20 and 24, the one-way clutch 33 inhibits the rotation of the rotatable shaft 7a of the second motor 7 by a latch mechanism or the like. In this case, the one-way clutch 33 permits the rotation of the rotatable shaft 7a in the direction of an arrow Y4 in the figure. The rotating direction Y4 is opposite to that of the carrier 5c of the second power distributor 5 in the CVT propulsion mode (this is the rotating direction Y2 in FIG. 9). For a supplementary description, the rotating direction Y4 is the same as that of the rotatable shaft 7a of the second motor 7 in the series type EV propulsion mode, the engine start/idling EV propulsion mode, and parallel type propulsion mode.

Now, description will be given of operations of the power transmitting apparatus 3' according to the present embodiment. The present embodiment is the same as the first embodiment except for operations performed if the engine 1 becomes inoperative for any reason (the engine 1 cannot generate any output owing to the stop of fuel injection or the like) while the vehicle is being propelled in the CVT propulsion mode. Accordingly, the description of the operations other than the differing operations is omitted. Only the differing operations will be described below.

If the engine 1 becomes inoperative while the vehicle is being propelled in the CVT propulsion mode, the rotation speed $\omega e$ of the output shaft 1a of the engine 1 decreases. In this case, without the one-way clutch 33 of the rotation regulating means 32, the rotation speed $\omega e$ of the engine 1 finally decreases down to zero. Thus, as is apparent from Expressions (3) and (4), the rotation speed ω1 of the rotatable shaft 6a of the first motor 6 increases, the first motor 6 applying a torque to the first power distributor 5 of the first distributor rotation transmitting systems, having a higher speed reduction ratio than the second distributor rotation transmitting system ω1=((1+a)·α/a)·ωv). At the same time, the direction of the rotation speed ω2 of the rotatable shaft 7a of the second motor 7 is reversed compared to the propulsion in the CVT propulsion mode. However, in the power transmitting apparatus 3' according to the present embodiment, the one-way clutch 33 functions (the one-way clutch 33 is brought into the breaking operational state in which it inhibits the rotation of the rotatable shaft 7a of the second motor 7) to inhibit the rotatable shaft 7a of the second motor 7 from rotating in the direction opposite to that during the propulsion in the CVT propulsion mode. As a result, the rotation speed of the output shaft 1a of the engine 1 decreases only to the value (1+a)·β·ωv. Correspondingly, the rotation speed of the rotatable shaft 6a of the first motor 6 is prevented from increasing. Specifically, when the rotation speed ωe of the output shaft 1a of the engine 1 decreases down to the value (1+a)·β·ωv, ω1= (1+a)·((α−β)/a)·ωv on the basis of Expression (3), shown above. Accordingly, the rotation speed ω1 of the rotatable shaft 6a of the first motor 6 is ((1+a)·β/a)·ωv lower than that obtained if the rotation speed ωe of the output shaft 1a of the engine 1 decreases to zero.

Thus, even if the engine 1 becomes inoperative during the propulsion in the CVT propulsion mode, the power transmitting apparatus 3' according to the present embodiment can prevent the first motor 6 in the first distributor rotation transmitting system with the higher speed reduction ratio from operating at excessively high speed. This reduces the capabilities required for the first motor 6 and the motor drive circuit 29 (see FIG. 1). It is thus possible to reduce the required capacities of the first motor 6 and motor drive circuit 29. Further, the size of the power transmitting apparatus 3' can be reduced and the costs can be saved.

Figure 10:
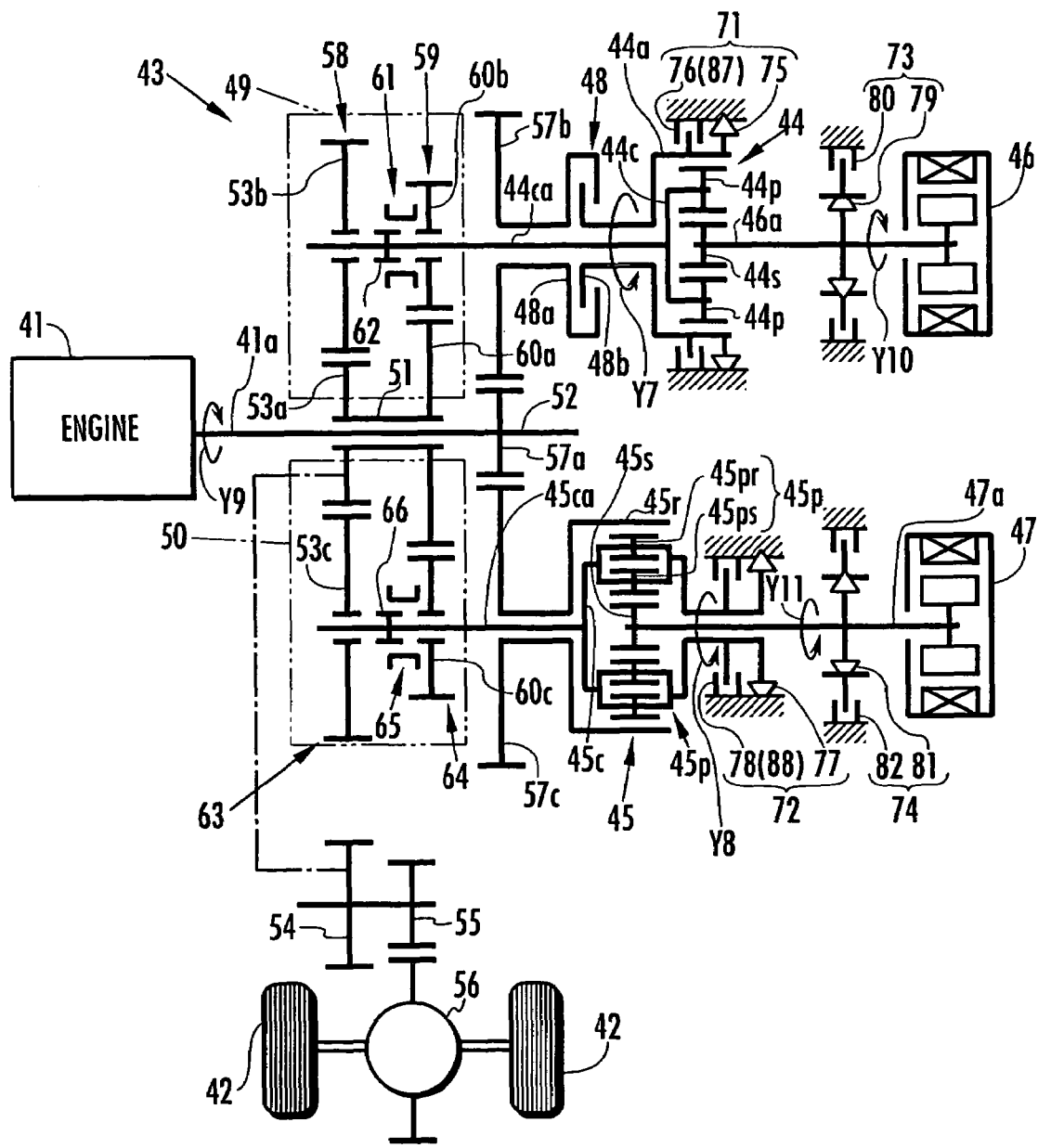
FIG. 10 is a diagram schematically showing the general system configuration of a hybrid vehicle comprising a third embodiment of a power transmitting apparatus according to the present invention.

Now, with reference to FIGS. 10 to 17, description will be given of a third embodiment of a power transmitting apparatus for a hybrid vehicle according to the present invention. FIG. 10 is a diagram schematically showing the general system configuration of the hybrid vehicle including the power transmitting apparatus according to the present embodiment. Reference numeral 41 denotes an engine, reference numerals 42, 42 denote drive wheels of the vehicle, and reference numeral 43 denotes a power transmitting apparatus.

The power transmitting apparatus 43 according to the present embodiment comprises, as main mechanical elements, a first power distributor 44, a second power distributor 45, a first motor 46, a second motor 47, a first clutch 48 (first clutch means), two speed change units 49 and 50, a power output shaft 51, and a first to fourth rotation regulating means 71 to 74. The power output shaft 51 is externally inserted around a power input shaft 52 coaxially connected to an output shaft 41a of the engine 41 so as to be rotatable integrally with the output shaft 41a. The power output shaft 51 can be freely rotatable relative to the power input shaft 52. The power output shaft 51 is connected to the drive wheels 42, 42 via a gear 53a provided so as to be rotatable integrally with the power input shaft 51, an idle gear 54 meshing with the gear 53a, an idle gear 55 provided so as to be rotatable integrally with the idle gear 54, and a differential gear device 56 (differential bevel gear device) meshing with the idle gear 55. The power input shaft 51 can be rotated in unison with the drive wheels 42, 42. The alternate long and short dash line in the figure indicates that the gear 53a is meshed with the idle gear 54. The gear 53a is a component of the speed change units 49 and 50, described later in detail.

The first power distributor 44 is composed of a single pinion type pinion gear device similar to that of the power distributor 4 or 5 according to the first embodiment. The first power distributor 44 comprises a ring gear 44r operating as an input shaft, a sun gear 44s operating as a second output shaft, a plurality of pinion gears 44p arranged around the sun gear 44s at certain intervals and each meshed with the sun gear 44s and ring gear 44r, and a carrier 44c supporting these pinion gears 44r and operating as a first output shaft. The sun gear 44s is coaxially connected to a rotatable shaft 46a of the first motor 46 so as to be rotatable integrally with the rotatable shaft 46a.

The second power distributor 45 is composed of what is called a double pinion type pinion gear device. The second power distributor 45 comprises a ring gear 45r operating as an input shaft, a sun gear 45s operating as a second output shaft, a plurality of pinion gears 45p (pair of meshed pinion gears 45pr and 45ps) arranged around the sun gear 45s at certain intervals, and a carrier 45c supporting the pinion gears 45pr and 45ps of the pinion gear pair 45p and operating as a first output shaft. The sun gear 45s is coaxially connected to a rotatable shaft 47a of the second motor 47 so as to be rotatable integrally with the rotatable shaft 47a. The pinion gears 45pr and 45ps of the pinion gear pair 45p are meshed with the ring gear 45r and the sun gear 45s, respectively.

The power input shaft 52 is connected to an input port 48a of the first clutch 48 via a gear 57a provided so as to be rotatable integrally with the power input shaft 52 and a gear 57b meshing with the gear 57. The gear 57b is connected to the input port 48a of the first clutch 48 so as to be rotatable integrally with the input port 48a. The gear 57 band the clutch 48 are arranged opposite the first motor 46 and coaxially with the sun gear 44s of the first power distributor 44. The output port 48b of the first clutch 48 is integrally rotatably connected to the ring gear 44r of the first power distributor 44. Thus, when the first clutch 48 is in the connected state, the rotation of the output shaft 41a of the engine 41 is transmitted to the ring gear 44r of the first power distributor 44 via the power input shaft 52, the gear 57a, the gear 57b, and the first clutch 48 in this order. The first clutch 48 has the same structure as that of the first clutch 8 according to the first embodiment and is of a friction disc type.

In addition to the gear 57b, a gear 57c is meshed with the gear 57a on the power input shaft 52; the gear 57c is connected to the ring gear 45r so as to be rotatable integrally with the ring gear 45r of the second power distributor 45. Thus, the rotation of the output shaft 41a of the engine 41 is transmitted to the ring gear 45r of the second power distributor 45 via the power input shaft 52, the gear 57a, and the gear 57c in this order.

An axel 45ca of the carrier 45c of the second distributor 45 is extended toward the gear 57c (which lies opposite the second motor 47 and on the same side as that of an axel 44ca of the carrier 44c of the first power distributor 44) to penetrate the axis of the gear 57c. The axel 45ca is thus rotatable relative to the gear 57c. In the present embodiment, the gears 57b and 57c have the same diameter (the same number of teeth). Thus, a rotation transmitting system from the output shaft 41a of the engine 41 to the ring gear 44r, the input shaft of the first power distributor 44, has the same speed reduction ratio as that of a rotation transmitting system from the output shaft 41*a* of the engine 41 to the ring gear 45*r*, the input shaft of the second power distributor 45*r*.

The axel 44*ca* of the carrier 44*c* of the first power distributor 44, provided so as to penetrate the axis of the first clutch 48 and the gear 57*b*, is connected to the power output shaft 51 via the speed change unit 49. The speed change unit 49 can change the speed reduction ratio for rotation transmissions from the carrier 44*c* to the power output shaft 51 between a plurality of (in the present embodiment, two) levels. The speed change unit 49 comprises rotation transmitting mechanisms 58 and 59 each of which transmits rotations in the speed reduction ratio of the corresponding level. The rotation transmitting mechanism 58 has a lower speed reduction ratio than the rotation transmitting mechanism 59. In the description below, the rotation transmitting mechanisms 58 and 59 are referred to as the lower-speed-reduction-ratio rotation transmitting mechanism 58 and the higher-speed-reduction-ratio rotation transmitting mechanism 59.

The rotation transmitting mechanisms 58 and 59 will be described. First, the lower-speed-reduction-ratio rotation transmitting mechanism 58 is composed of a gear 53*a* on the power output shaft 51 and a gear 53*b* provided coaxially with the carrier 44*c* so as to mesh with the gear 53*a*. The gear 53*b* is borne by the axel 44*ca* of the carrier 44*c* so as to be rotatable relative to the axel 44*ca*. The higher-speed-reduction-ratio rotation transmitting mechanism 59 is composed of a gear 60*a* provided so as to be rotatable integrally with the power output shaft 51 and a gear 60*b* provided coaxially with the carrier 44*c* so as to mesh with the gear 60*a*. A clutch 61 is provided between the rotation transmitting mechanisms 58 and 59 to disconnect/connect the rotation transmission between the gear 53*b* and the axel 44*ca* of the carrier 44*c* and to disconnect/connect the rotation transmission between the gear 60*b* and the axel 44*ca* of the carrier 44*c*. The clutch 61 is movable in the axial direction of the axel 44*ca* of the carrier 44*c* between the gears 53*b* and 60*b*. This movement makes the clutch 61 operable in the state in which a member 62 fixed to the axel 44*ca* of the carrier 44*c* between the gears 53*b* and 60*b* is integrally rotatably connected to the gear 53*b* by spline coupling so that the gear 53*b* and the carrier 44*c* are integrally rotatable, in the state in which the member 62 and the gear 60*b* are integrally rotatably connected together by spline coupling so that the gear 60*b* and the carrier 44*c* are integrally rotatable, and in the state in which the member 62 is disconnected from the gears 53*b* and 60*b* to block the rotation transmission between the carrier 44*c* and both gears 53*b* and 60*b* (the rotation transmission between the carrier 44*c* and the power output shaft 51 is blocked; this will hereinafter sometimes be referred to as the neutral state of the clutch 61).

Accordingly, with the speed change unit 49, when the clutch 61 connects the gear 60*b* and the member 62 together, the rotation transmission from the carrier 44*c* to the power output shaft 51 is executed via the higher-speed-reduction-ratio rotation transmitting mechanism 59. The speed reduction ratio for the rotation transmission is the same as that of the higher-speed-reduction-ratio rotation transmitting mechanism 59. When the clutch 61 connects the gear 53*b* and the member 62 together, the rotation transmission from the carrier 44*c* to the power output shaft 51 is executed via the lower-speed-reduction-ratio rotation transmitting mechanism 58. The speed reduction ratio for the rotation transmission is the same as that of the lower-speed-reduction-ratio rotation transmitting mechanism 58.

On the other hand, the axel 45*ca* of the carrier 45*c* of the second power distributor 45, provided so as to penetrate the axis of the gear 57*c*, is connected to the power output shaft 51 via the speed change unit 50. The speed change unit 50 can change the speed reduction ratio for rotation transmissions from the carrier 45*c* to the power output shaft 51 between a plurality of (in the present embodiment, two) levels. The speed change unit 50 comprises rotation transmitting mechanisms 63 and 64 each of which transmits rotations with the speed reduction ratio of the corresponding level. The rotation transmitting mechanism 63 has a lower speed reduction ratio than the rotation transmitting mechanism 64. In the description below, the rotation transmitting mechanisms 63 and 64 are referred to as the lower-speed-reduction-ratio rotation transmitting mechanism 63 and the higher-speed-reduction-ratio rotation transmitting mechanism 64.

The rotation transmitting mechanisms 63 and 64 will be described. First, the lower-speed-reduction-ratio rotation transmitting mechanism 63 is composed of the gear 53*a* on the power output shaft 51 and a gear 53*c* provided coaxially with the carrier 45*c* so as to mesh with the gear 53*a*. The gear 53*c* is borne by the axel 45*ca* of the carrier 45*c* so as to be rotatable relative to the axel 45*ca*. The higher-speed-reduction-ratio rotation transmitting mechanism 64 is composed of the gear 60*a* on the power output shaft 51 and a gear 60*c* provided coaxially with the carrier 45*c* so as to mesh with the gear 60*a*. A clutch 65 is provided between the rotation transmitting mechanisms 63 and 64 to disconnect/connect the rotation transmission between the gear 53*c* and the axel 45*ca* of the carrier 45*c* and to disconnect/connect the rotation transmission between the gear 60*c* and the axel 45*ca* of the carrier 45*c*. Like the clutch 61 of the speed change unit 49, the clutch 65 is operable in the state in which a member 66 fixed to the axel 45*ca* of the carrier 45*c* between the gears 53*c* and 60*c* is integrally rotatably connected to the gear 53*c* by spline coupling so that the gear 53*c* and the carrier 45*c* are integrally rotatable, in the state in which the member 66 and the gear 60*c* are integrally rotatably connected together by spline coupling so that the gear 60*c* and the carrier 45*c* are integrally rotatable, and in the state in which the member 66 is disconnected from the gears 53*c* and 60*c* to block the rotation transmission between the carrier 45*c* and both gears 53*c* and 60*c* (the rotation transmission between the carrier 45*c* and the power output shaft 51 is blocked; this will hereinafter sometimes be referred to as the neutral state of the clutch 65).

Accordingly, with the speed change unit 50, when the clutch 65 connects the gear 60*c* and the member 66 together, the rotation transmission from the carrier 45*c* to the power output shaft 51 is executed via the higher-speed-reduction-ratio rotation transmitting mechanism 64. The speed reduction ratio for the rotation transmission is the same as that of the higher-speed-reduction-ratio rotation transmitting mechanism 64. When the clutch 65 connects the gear 53*c* and the member 66 together, the rotation transmission from the carrier 45*c* to the power output shaft 51 is executed via the lower-speed-reduction-ratio rotation transmitting mechanism 63. The speed reduction ratio for the rotation transmission is the same as that of the lower-speed-reduction-ratio rotation transmitting mechanism 63.

Instead of using the spline coupling, the clutches 61 and 65 may be of a dog type or a frictional type. Moreover, the rotation transmitting mechanisms of the speed change units 49 and 50 may transmit rotations using, for example, a sprocket and a chain. Further, the clutch 65 functions as second clutch means according to the present invention.

In the present embodiment, the gear 53*b* of the lower-speed-reduction-ratio rotation transmitting mechanism 58 of the speed change unit 49 has the same diameter (the same number of gear tooth) as that of the gear 53c of the lower-speed-reduction-ratio rotation transmitting mechanism 63 of the speed change unit 50. Thus, the lower-speed-reduction-ratio rotation transmitting mechanisms 58 and 63 of the speed change units 49 and 50 have the same speed reduction ratio. Likewise, the higher-speed-reduction-ratio rotation transmitting mechanisms 59 and 64 of the speed change units 49 and 50 have the same speed reduction ratio.

Now, with reference to Table 1, description will be given of the speed reduction ratio for the rotation transmitting system of the rotation transmitting apparatus 43 according to the present invention.

TABLE 1

| Rotation transmitting system | Speed reduction ratio |
|---|---|
| Engine ⇒ ring gear of first power distributor | $k5$ |
| Engine ⇒ ring gear of second power distributor | $k6$ |
| Ring gear of first power distributor ⇒ sun gear | $k7$ |
| Ring gear of second power distributor ⇒ sun gear | $k8$ |
| Lower-speed-reduction-ratio rotation transmitting mechanism of speed change unit | $k9$ |
| Higher-speed-reduction-ratio rotation transmitting mechanism of speed change unit | $k10 \ (= A^2 \cdot k9)$ |
| Engine ⇒ carrier of first power distributor | $k5 \cdot (1 + k7)$ $(= A \cdot k6 \cdot (1 - k8))$ |
| Engine ⇒ carrier of second power distributor | $k6 \cdot (1 - k8)$ |
| Engine ⇒ first power distributor ⇒ power output shaft | $k5 \cdot (1 + k7) \cdot k9 \ (= R3)$ or $k5 \cdot (1 + k7) \cdot k10 \ (= R1)$ $(= A^2 \cdot k5 \cdot (1 + k7) \cdot k9)$ |
| Engine ⇒ second power distributor ⇒ power output shaft | $k6 \cdot (1 - k8) \cdot k9 \ (= R4)$ $(= k5 \cdot (1 + k7) \cdot k9/A)$ or $k6 \cdot (1 - k8) \cdot k10 \ (= R2)$ $(= A \cdot k5 \cdot (1 + k7) \cdot k9)$ |

As shown in Table 1, the speed reduction ratio for the rotation transmitting system from the output shaft 41a of the engine 41 to the ring gear 44r, the input shaft of the first power distributor 44, is defined as k5. The speed reduction ratio for the rotation transmitting system from the output shaft 41a of the engine 41 to the ring gear 45r, the input shaft of the second power distributor 45, is defined as k6 (in the present embodiment, k6=k5). The speed reduction ratio for rotation transmissions from the ring gear 44r to sun gear 44s of the first power distributor 44 is defined as k7. The speed reduction ratio for rotation transmissions from the ring gear 45r to sun gear 45s of the second power distributor 45 is defined as k8. Further, the speed reduction ratio (gear ratio (ratio between the numbers of teeth) of the gear 53a to the gear 53b or 53c) of the lower-speed-reduction-ratio rotation transmitting mechanisms 58 and 63 of both speed change units 49 and 50 is defined as k9. The speed reduction ratio (gear ratio (ratio between the numbers of teeth) of the gear 60a to the gear 60b or 60c) of the lower-speed-reduction-ratio rotation transmitting mechanisms 59 and 64 of both speed change units 49 and 50 is defined as k10 (>k9). In this case, since the speed change unit 49 switches the speed reduction ratio, the speed reduction ratio for the rotation transmitting system (first distributor rotation transmitting system) from the output shaft 41a of the engine 41 to the power output shaft 51 via the first power distributor 44 changes between $k5 \cdot (1+k7) \cdot k9$ or $k5 \cdot (1+k7) \cdot k10$ as shown in Table 1. Likewise, since the speed change unit 50 switches the speed reduction ratio, the speed reduction ratio for the rotation transmitting system (second distributor rotation transmitting system) from the output shaft 41a of the engine 41 to the power output shaft 51 via the second power distributor 45 changes between $k6 \cdot (1-k8) \cdot k9$ or $k6 \cdot (1-k8) \cdot k10$ as shown in Table 1. In this case, $k10 = A^2 \cdot k9$ so that four types of speed reduction ratios for both first and second distributor rotation transmitting systems have values in a geometric progression form. Here, A denotes the ratio of the speed reduction ratio for the rotation transmitting system from the output shaft 41a of the engine 41 to the carrier 44c of the first power distributor 44 to the speed reduction ratio for the rotation transmitting system from the output shaft 41a of the engine 41 to the carrier 45c of the second power distributor 45. In the present embodiment, since k5=k6, $A = (1+k7)/(1-k8)$. If the speed reduction ratios k9 and k10 of the speed change units 49 and 50 are set so that $k10 = A^2 \cdot k9$ as described above, when the four types of speed reduction ratios $k5 \cdot (1+k7) \cdot k9$, $k5 \cdot (1+k7) \cdot k10$, $k6 \cdot (1-k8) \cdot k9$, and $k6 \cdot (1-k8) \cdot k10$ are arranged in order of increasing magnitude, the values are in a geometric progression form in which each value is A times as large as the preceding value. In the description below, the speed reduction ratios $k5 \cdot (1+k7) \cdot k9$, $k5 \cdot (1+k7) \cdot k10$, $k6 \cdot (1-k8) \cdot k9$, and $k6 \cdot (1-k8) \cdot k10$ will be referred to as follows in order of decreasing magnitude: the first reduction ratio R1 $(= k5 \cdot (1+k7) \cdot k10)$; the second reduction ratio R2 $(= k6 \cdot (1-k8) \cdot k10)$, the third reduction ratio R3 $(= k5 \cdot (1+k7) \cdot k9)$, and the fourth reduction ratio R4 $(= k6 \cdot (1-k8) \cdot k9)$.

In the present embodiment, the values of the speed reduction ratios k9 and k10 of the speed change units 49 and 50 are set so that $k10 = A^2 \cdot k9$ as described above. However, this is not always required. Fundamentally, the values k5 to k10 may be set so that the speed reduction ratios R1 and R3, which can be set for the first distributor rotation transmitting system by the speed change unit 49 by switching the speed reduction ratio and the speed reduction ratios R2 and R4, which can be set for the second distributor rotation transmitting system by the speed change unit 50 by switching the speed reduction ratio have the relationship R1>R2>R3>R4. Both power distributors 44 and 45 may be composed of single or double pinion type pinion gear devices.

Like the rotation regulating means 10 according to the first embodiment, the first rotation regulating means 71 properly inhibits the rotation of the ring gear 44r of the first power distributor 44. The first rotation regulating means 71 is composed of a one-way clutch 75 that inhibits the rotation of the ring gear 44r in a predetermined direction, and forced braking means 87 (shown in FIG. 11) for inhibiting the rotation of the ring gear 44r via a locking mechanism 76 engaged with and disengaged from the ring gear 44r by the drive force of an actuator 92 (shown in FIG. 11). The mechanical structures of the one-way clutch 75 and locking mechanism 76 are similar to those of the one-way clutch 20 and locking mechanism 22, respectively, of the first rotation regulating means 10 according to the first embodiment. In this case, when the ring gear 44r is to rotate in the direction of an arrow Y7 in FIG. 10, the one-way clutch 75 is brought into an open operational state in which it permits the rotation. When the ring gear 44r is to rotate in the direction opposite to that of the arrow Y7, the one-way clutch 75 is brought into a braking operational state in which it inhibits the rotation. The one-way clutch 75 permits the same rotating direction (arrow Y7) (direction of a torque transmitted from the output shaft 41a of the engine 41 to the ring gear 44r) in which the ring gear 44r should be rotated by rotation transmissions from the engine 41 when the first clutch 48 is operated in the connected state during the operation of the engine 41. This rotating direction is the opposite as that of the output shaft 41a of the engine 41.

Like the forced braking means 23 according to the first embodiment, the forced braking means 87 is selectively switched by the control of the actuator 92 between the open operational state in which it permits the rotation of the ring gear 44r and the braking operational state in which it inhibits the rotation of the ring gear 44r.

Like the rotation regulating means 11 according to the first embodiment, the second rotation regulating means 72 properly inhibits the rotation of the carrier 45c of the second power distributor 45. The second rotation regulating means 72 is composed of a one-way clutch 77 that inhibits only the rotation of the carrier 45c in a predetermined direction and forced braking means 88 (shown in FIG. 11) that inhibits the rotation of the carrier 45c via a locking mechanism 78 that is engaged with and disengaged from the carrier 45c using the drive power of an actuator 93 (shown in FIG. 11). The mechanical structures of the one-way clutch 77 and locking mechanism 78 are similar to those of the one-way clutch 24 and locking mechanism 26 of the second rotation regulating means 11 according to the first embodiment. In this case, when the carrier 45c is to rotate in the direction of an arrow Y8 in FIG. 10, the one-way clutch 77 is brought into the open operational state in which it permits the rotation. When the carrier 45c is to rotate in the direction opposite to that of the arrow Y8, the one-way clutch 77 is brought into the braking operational state in which it inhibits the rotation. The one-way clutch 77 permits the same rotating direction (arrow Y8) in which the carrier 45c should be rotated by the rotation transmission between the power output shaft 51, rotating in unison with the drive wheels 42, 42, and the carrier 45c when the vehicle is propelled forward. The one-way clutch 77 inhibits the rotation of the carrier 45c in the opposite direction.

Like the forced braking means 27 according to the first embodiment, the forced braking means 88 is selectively switched by the control of the actuator 93 between the open operational state in which it permits the rotation of the carrier 45c and the braking operational state in which it inhibits the rotation of the carrier 45c.

The third rotation regulating means 73 comprises a one-way clutch 79 that inhibits the rotation of the rotatable shaft 46a (rotatable shaft of sun gear 44s) of the first power distributor 44) of the first motor 46 in a predetermined direction, and a locking mechanism 80 that turns on and off the function (to inhibit the rotation of the rotatable shaft 46a in the predetermined direction) of the one-way clutch 79. The locking mechanism 80 engages with and disengages from the one-way clutch 79 via an actuator 94 (shown in FIG. 11) using a frictional force, fitting, or the like. When engaged with the one-way clutch 79, the locking mechanism 80 locks a fixed part of the one-way clutch 79 so that the clutch 79 is not rotatable, to turn on the function of the clutch 79. When disengaged from the one-way clutch 79, the locking mechanism 80 allows the clutch 79 to rotate integrally with the rotatable shaft 46a of the first motor 46, turn off the function of the clutch 79. The one-way clutch 79 uses a latch mechanism or the like to inhibit the rotation of the rotatable shaft 46a of the first motor 46 in a predetermined direction. In this case, if the output shaft 41a of the engine 41 rotates in a direction shown by an arrow Y9 in FIG. 10 and when the function of the one-way clutch 79 is turned on, the clutch 79 permits the rotatable shaft 46a to rotate in the direction of an arrow Y10. The rotating direction Y10 of the rotatable shaft 46a is the same as the direction (opposite to the direction in which the ring gear 44r and the carrier 44c rotate) in which the rotatable shaft 46a of the first motor 46 should be rotated if the first distributor rotation transmitting system has a lower speed reduction ratio than the second distributor rotation transmitting system during the propulsion in the CVT propulsion mode.

The fourth rotation regulating means 74 comprises a one-way clutch 81 that inhibits the rotation of the rotatable shaft 47a (rotatable shaft of sun gear 45s) of the second power distributor 45) of the second motor 47 in a predetermined direction, and a locking mechanism 82 that turns on and off the function (to inhibit the rotation of the rotatable shaft 47a in the predetermined direction) of the one-way clutch 81. The locking mechanism 82 engages with and disengages from the one-way clutch 81 via an actuator 95 (shown in FIG. 11) using a frictional force, fitting, or the like. Like the locking mechanism 80 of the third rotation regulating means 73, the locking mechanism 82 turns on the function of the clutch 81 when engaged with the one-way clutch 81, and turns off the function of the clutch 81 when disengaged from the one-way clutch 81. The one-way clutch 81 uses a latch mechanism or the like to inhibit the rotation of the rotatable shaft 47a of the second motor 47 in a predetermined direction. In this case, when the function of the one-way clutch 81 is turned on, the clutch 81 permits the rotatable shaft 47a to rotate in the direction of an arrow Y11 in FIG. 10. The rotating direction Y11 of the rotatable shaft 47a is the same as the direction (the same as that in which the ring gear 45r rotates) in which the rotatable shaft 47a should be rotated if the second distributor rotation transmitting system has a lower speed reduction ratio than the first distributor rotation transmitting system during the propulsion in the CVT propulsion mode.

Figure 11:
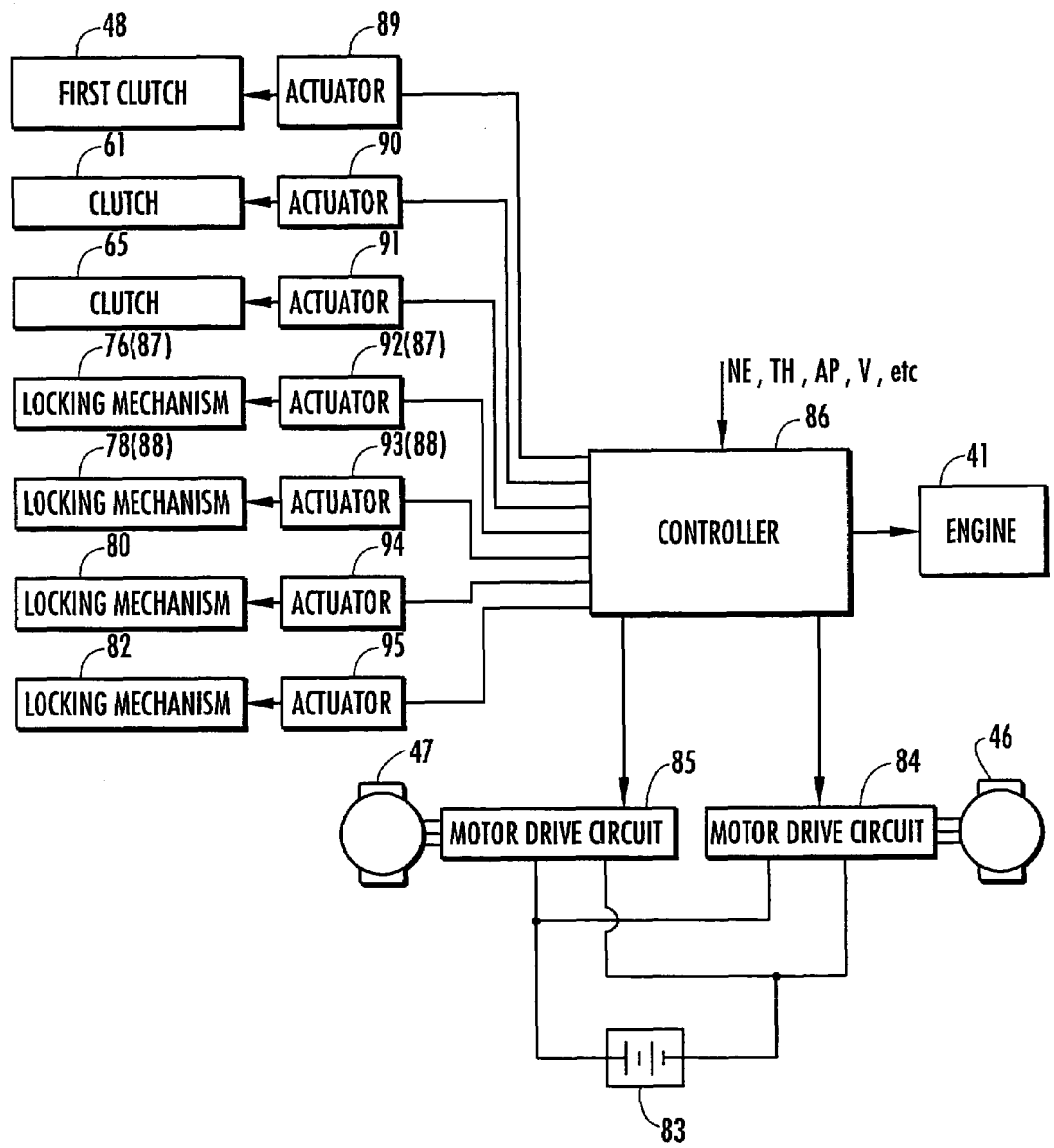
FIG. 11 is a block diagram showing a control system in the power transmitting apparatus according to the third embodiment.
Figure 12:
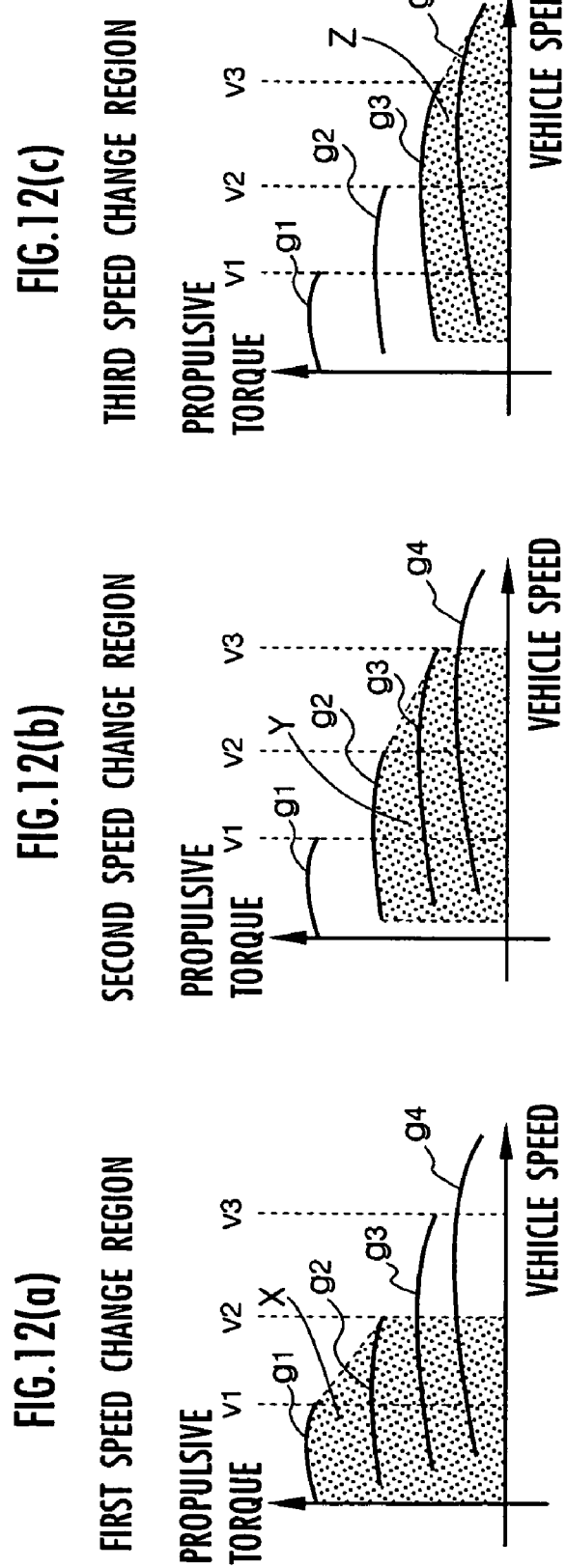
FIGS. 12A to 12C are graphs illustrating speed variable ranges of the power transmitting apparatus according to the second embodiment.

FIG. 11 is a block diagram showing an arrangement for controlling the power transmitting apparatus 43 according to the present embodiment. This arrangement is similar to the control arrangement described in the first embodiment. The arrangement comprises a battery 83 operating as a power source for the first and second motors 46 and 47, motor drive circuits 84 and 85 (power drive unit) that transmit power between each of the first and second motors 46 and 47 and the battery 83, and a controller 86 composed of an electronic circuit including a microcomputer or the like. The controller 86 controls the first clutch 48, the clutch 61 of the speed change unit 49, the clutch 65 of the speed change units 50, the locking mechanisms 76 and 78 of the forced braking means 87 and 88, respectively, and the locking mechanisms 80 and 82 of the third and fourth rotation regulating means 73 and 74, respectively, via the actuators 89, 90, 91, 92, 93, 94, and 95. The controller 86 also controls the conduction through the first and second motors 46 and 47 via the motor drive circuits 84 and 85. Moreover, the controller 86 controls the operation of the engine 41 via the drive devices for a fuel injection device, a throttle valve, an ignition device, and an intake and exhaust valves in each cylinder (none of them are shown), all of which are provided in the engine 41. For these control operations, detected data from sensors (not shown) are inputted to the controller 41 and include the rotation speed NE of the engine 41, the throttle opening TH of the throttle valve in the engine 41, the vehicle speed V, and the amount AP of operations performed on an accelerator pedal in the vehicle and the like.

In the present embodiment, the actuators 89 to 95 are of a hydraulic type that utilizes pressure oil from a hydraulic pump (not shown) driven by the engine 41 as in the case of the first embodiment.

Now, description will be given of operations of the power transmitting apparatus 43 according to the present embodiment. In the present embodiment, as in the case of the first embodiment, the desired propulsive torque of the vehicle is determined on the basis of the amount AP (detected value) of operations on the vehicle accelerator and the vehicle speed V (detected value) using a map or the like. Moreover, the propulsive mode of the vehicle is determined on the desired propulsive torque, the vehicle speed V, and the like using a map or the like. The propulsive modes of the vehicle include the EV propulsion (including the series type EV propulsion), the CVT propulsion, and the parallel type propulsion, as in the case of the first embodiment.

In this case, in the present embodiment, to start the vehicle (forward or backward), the engine 41 is started to operate the actuators 90 and 91, which drive the clutches 61 and 65 of the speed change units 49 and 50. The engine 41 is started in the same manner as that in which the engine is started according to the first embodiment (FIG. 5A, previously described). Specifically, the controller 86 performs predetermined starting control on the engine 41 (control of fuel injections and ignitions in the engine 41 as well as the control of rotation speed of the second motor 47), while causing the second motor 47 to generate a drive torque in the direction of the arrow Y11 in FIG. 10. Thus, the engine 41 is started. At this time, a torque acts on the carrier 45*c* of the second power distributor 45 to rotate the carrier 45*c* in the direction opposite to that of the arrow Y8 in FIG. 10. Accordingly, the one-way clutch 77 of the second rotation regulating means 72 is automatically brought into the braking state in which it inhibits the rotation of the carrier 45*c*. Consequently, the second motor 47 transmits a torque to the output shaft 41*a* of the engine 41 via the sun gear 45*s*, pinion gear pair 45*p*, and ring gear 45*r* of the second power distributor 45, and gear 57*c* and 57*a* in this order. When the engine 41 is started, the first clutch 48 is in the disconnected state, the clutches 61 and 65 of the speed change units 49 and 50 are in the neutral state, and the forced braking means 87 and 88 of the first and second rotation regulating means 71 and 72 are in the open state. Further, on this occasion, the locking mechanisms 80 and 82 of the third and fourth rotation regulating means 73 and 74 turn off the functions of the one-way clutches 79 and 81 (the locking means 80 and 82 do not engage with the one-way clutches 79 and 81). Furthermore, after the engine 41 has been started, it idles and the conduction through the second motor 47 is stopped.

For a supplementary description, in the present embodiment, the locking mechanisms 80 and 82 of the third and fourth rotation regulating means 73 and 74 turn off the functions of the one-way clutches 79 and 81 in the propulsive modes other than the CVT propulsion mode, descried later. Accordingly, in the description below, it is assumed that the locking mechanisms 80 and 82 keep the functions of the one-way clutches 79 and 81 off unless otherwise specified.

If the vehicle is to be propelled forward in the EV propulsion mode different from the series type EV propulsion mode, the controller 86 operates the clutch 61 of the speed change unit 49 to connect the gear 60*b* of the higher-speed-reduction-ratio rotation transmitting mechanism 59 and the member 62 together. In this case, the first clutch 48 is in the disconnected state, and the clutch 65 of the speed change unit 50 is in the neutral state. The forced braking means 87 of the first rotation regulating means 71 and the forced braking means 88 of the second rotation regulating means 72 are in the open state, and the engine 41 is idling state. In this state, the controller 86 causes the first motor 46 to generate a drive torque acting in a direction that allows the vehicle to be propelled forward (that is, the direction opposite to that of the arrow Y10 in FIG. 10). At this time, a torque acts on the ring gear 44*r* of the first power distributor 44 to rotate the gear 44*r* in the direction opposite to that of the arrow Y7 in FIG. 10. Accordingly, the one-way clutch 75 of the first rotation regulating means 71 is automatically brought into the braking state to inhibit the rotation of the ring gear 44*r*. Consequently, the first motor 46 transmits a torque to the power output shaft 51 via the sun gear 44*s* and carrier 44*c* of the first power distributor 44 and the higher-speed-reduction-ratio rotation transmitting mechanism 59 of the speed change unit 49. The vehicle is thus propelled forward. On this occasion, the drive torque of the first motor 46 is controllably adjusted to a value (of the torque of the first motor 46 required to generate the desired propulsive torque on the drive wheels 42, 42 of the vehicle) corresponding to the desired propulsive torque of the vehicle, as in the case of the first embodiment.

If the vehicle is to be propelled backward in the EV propulsion mode different from the series type EV propulsion mode, the controller 86 operates the clutch 61 of the speed change unit 49 to connect the gear 60*b* of the higher-speed-reduction-ratio rotation transmitting mechanism 59 and the member 62 together. The controller 86 also operates the forced braking means 87 of the first rotation regulating means 71 in the braking state. The operational state of each of the first clutch 48, the clutch 65 of the speed change unit 50, and the forced braking means 88 of the second rotation regulating means 72 is the same as that during the forward propulsion in the EV propulsion mode. Further, the engine 41 is in the idling operational state. In this state, the controller 86 causes the first motor 46 to generate a drive torque acting in a direction that allows the vehicle to be propelled backward (that is, the direction of the arrow Y10 in FIG. 10). At this time, as in the case of the forward propulsion, the first motor 46 transmits the torque allowing the vehicle to be propelled backward, to the power output shaft 51 to propel the vehicle backward. On this occasion, the drive torque of the first motor 46 is controllably adjusted to the value corresponding to the desired propulsive torque of the vehicle, as in the case of the forward propulsion in the EV propulsion mode.

In the series type EV propulsion mode, the controller 86 operates the forced braking means 88 to inhibit the rotation of the carrier 45*c* of the second power distributor 45. Thus, a torque can be transmitted to the rotatable shaft 47*a* of the second motor 47 from the output shaft 41*a* of the engine 41 via the gears 57*a* and 57*c*, and the ring gear 45*r*, pinion gear pair 45*p*, and sun gear 45*s* of the second power distributor 45 in this order. The operational state of each of the first clutch 48, the clutch 65 of the speed change unit 50, and the forced braking means 87 of the first rotation regulating means 71 is the same as that during the forward or backward propulsion in the EV propulsion mode. Further, the drive torque of the first motor 46 is controllably adjusted to the value corresponding to the desired propulsive torque of the vehicle, as in the case of the EV propulsion mode different from the series EV propulsion mode.

Then, in this state, the controller 86 controls the engine 41 and the second motor 47 in exactly the same manner as that used in the series type EV propulsion mode according to the first embodiment. Consequently, the output from the engine 41 allows power generation for the second motor 47 and the charging of the battery 83. The other operations of the power transmitting apparatus 43 are the same as those during the forward or backward propulsion in the EV propulsion mode.

According to the present embodiment, in the EV propulsion mode (including the series type EV propulsion mode), the first clutch 48 is in the disconnected state, and the rotation transmission between the output shaft 41a of the engine 41 and the ring gear 44r of the first power distributor 44 is blocked, as described above. Further, the clutch 65 of the speed change unit 50 is in the neutral state, and the rotation transmission between the carrier 45c of the second power distributor 45 and the power output shaft 51 is blocked, as described above. It is thus possible to independently carry out the propulsion of the vehicle using the drive torque of the first motor 46 and the operation of the engine 1 and second motor 47 so that these two operations will not affect each other. Therefore, in the series type EV propulsion mode, as in the case of the first embodiment, the output from the engine 41 can be transmitted to the second motor 47 to generate power for the second motor 47 (charge the battery 83) without affecting the propulsion of the vehicle using the first motor 46.

For either the forward or backward propulsion in the EV propulsion mode (including the series type EV propulsion mode), after the vehicle has been started, the clutch 61 maybe operated to switch the rotation transmitting mechanism of the speed change unit 49 from the higher-speed-reduction-ratio rotation transmitting mechanism 59 to the lower-speed-reduction-ratio rotation transmitting mechanism 58. If the actuators 92 and 93 of the forced braking means 87 and 88 of the first and second rotation regulating means 71 and 72 are of an electric type using power from the battery 83 or another auxiliary battery, the vehicle may be started using the drive torque of the first motor 46 with the engine 1 remaining stopped. Subsequently, the second motor 47 may be used as a starting motor to start the engine 1.

For a supplementary description, when the series type EV propulsion mode shifts to a normal EV propulsion mode, the current conducting through the second motor 47 is reduced down to zero (the torque generated by the second motor 47 is zeroed). Further, the throttle opening of the engine 41 is set at the minimum value to let the engine 1 idle. In this case, according to the present embodiment, since the engine 1 idles in the normal EV propulsion mode, the forced braking means 88 of the second rotation regulating means 72 may be operated in the braking state in the normal EV propulsion mode.

Now, the parallel type propulsion mode will be described. In the parallel type propulsion mode, the controller 86 operates the clutch 61 of the speed change unit 49 to connect the gear 60b of the higher-speed-reduction-ratio rotation transmitting mechanism 59 and the member 62 together (to turn on the functions of the higher-speed-reduction-ratio rotation transmitting mechanism 59). The controller 86 also operates the clutch 65 of the speed change unit 50 to connect the gear 60c of the higher-speed-reduction-ratio rotation transmitting mechanism 64 and the member 66 together (to turn on the functions of the higher-speed-reduction-ratio rotation transmitting mechanism 64). The first clutch 48 is in the disconnected operational state, and both the forced braking means 87 of the first rotation regulating means 71 and the second rotation regulating means 72 are in the open operational state. This state corresponds to that of the first embodiment, shown in FIG. 8. Then, as in the case of the parallel type propulsion mode according to the first embodiment, the controller 86 controllably brings the first motor 46 into the drive state and the second motor 47 into the regenerative state while controlling the operation of the engine 41. On this occasion, the drive torque generated by the first motor 46 acts in the direction opposite to that of the arrow Y10 in FIG. 10. Accordingly, the one-way clutch 75 of the first rotation regulating means 71 is automatically brought into the braking state as in the case of the forward EV propulsion mode. Further, the carrier 45c of the second power distributor 45 and the power output shaft 51 are connected together so as to transmit rotations via the lower-speed-reduction-ratio rotation transmitting mechanism 63 of the speed change unit 50. As a result, the one-way clutch 77 of the second rotation transmitting means 72 is brought into the open state.

Thus, the drive torque of the first motor 45 is transmitted to the power output shaft 51 via the sun gear 44s, pinion gear 44p, and carrier 44c of the first power distributor 45, and the higher-speed-reduction-ratio rotation transmitting mechanism 59 of the speed change unit 49 in this order. At the same time, the output torque from the engine 41 is transmitted to the power output shaft 51 via the gears 57a and 57c, the ring gear 45r and carrier 45c of the second power distributor 44, and the lower-speed-reduction-ratio rotation transmitting mechanism 63 of the speed change unit 50 in this order. Then, the torque from the first motor 46 and the torque from the engine 41 are combined together at the power output shaft 51. The combined torque is then outputted from the power output shaft 51 to the drive wheels 42, 42.

In this case, according to the present embodiment, when the reference numerals in Table 1, described above, are used, the speed reduction ratio for rotation transmissions from the output shaft 41a of the engine 41 to the second motor 47 is expressed as k6·k8. Accordingly, when the target torque (regenerative torque) of the second motor 47 is determined using Expression (5), previously described, as in the case of the first embodiment, the value of k6·k8 may be used for "a" in the right side of the expression. Further, in Expression (2), previously described as in the case of the first embodiment and used to determine the target torque T1 of the first motor 46 from the target torque T2 of the second motor 47 and Expression (2), k3 and k4 denote the speed reduction ratio for the rotation transmission from the first motor 46 to the power output shaft 51 and the speed reduction ratio for the rotation transmission from the second motor 47 to the power output shaft 52. In this case, the value of the speed reduction ratio k3 is a constant determined from the gear ratio of the sun gear 44s and ring gear 44r of the first power distributor 44 and the speed reduction ratio of the speed change unit 49 (in the present embodiment, the speed reduction ratio of the higher-speed-reduction-ratio rotation transmitting mechanism 59). The value of the speed reduction ratio k4 is a constant determined from the gear ratio of the sun gear 45s and ring gear 45r of the second power distributor 45 and the speed reduction ratio of the speed change unit 50 (in the present embodiment, the speed reduction ratio of the higher-speed-reduction-ratio rotation transmitting mechanism 64).

A shift between the parallel type propulsion mode and the EV propulsion mode is carried out by letting the engine 41 to idle in the EV propulsion mode as in the case of the first embodiment. Specifically, in the parallel type propulsion mode, the engine 41 is let to idle, and the torque generated by the second motor 47 is zeroed. Subsequently, the clutch 65 of the speed change unit 50 is operated in the neutral state to cause a shift to the EV propulsion mode. On the other hand, in the EV propulsion mode, the clutch 65 of the speed change unit 50 is used to turn on the functions of the higher-speed-reduction-ratio rotation transmitting mechanism 64 of the speed change unit 50 while letting the engine 41 to idle. Subsequently, the engine 41 and the motors 46 and 47 are controlled in accordance with the parallel type propulsion mode to cause a shift to the parallel type propulsion mode.

Now, description will be given of operations in the CVT propulsion mode according to the present embodiment. In the CVT propulsion mode, the first clutch 48 is controllably operated in the connected state. The forced braking means 87 of the first rotation regulating means 71 and the forced braking means 88 of the second rotation regulating means 72 are in the open state in which they do not inhibit the rotation of the ring gear 44r of the first power distributor 44 and the carrier 45c of the second power distributor 45, respectively.

In this state, by using the controller 86, the desired propulsive torque of the vehicle is determined on the basis of the amount AP of operations on the vehicle accelerator and the vehicle speed V using a map or the like. Moreover, by using the controller 86, a speed variable range of the power transmitting apparatus 43 is determined depending on the desired propulsive torque and the vehicle speed V using a map or the like. Here, the speed variable range includes a speed variable range (first speed variable range) between the first speed change ratio R1 and the second speed change ratio R2, a speed variable range (second speed variable range) between the second speed change ratio R2 and the third speed change ratio R3, and a speed variable range (third speed variable range) between the third speed change ratio R3 and the fourth speed change ratio R4. The first, second, and third speed variable ranges are basically used in a low, middle, and high vehicle speed regions, respectively. The first, second, and third speed variable ranges enable speed change operations in a dotted area X in FIG. 12A, a dotted area Y in FIG. 12B, and a dotted area Z in FIG. 12C. In FIGS. 12A to 12C, curves g1 to g4 are graphs indicating the relationship between the propulsive torque and the vehicle speed V observed if the engine 1 is operated at its maximum output with the speed reduction ratio from the engine 41 to the power output shaft 51 fixed to the first to fourth speed change ratios R1 to R4, respectively. V1 to V3 denote vehicle speeds corresponding to the maximum rotation speed of the engine 1 on the curves g1, g2, and g3, respectively.

Figure 13:
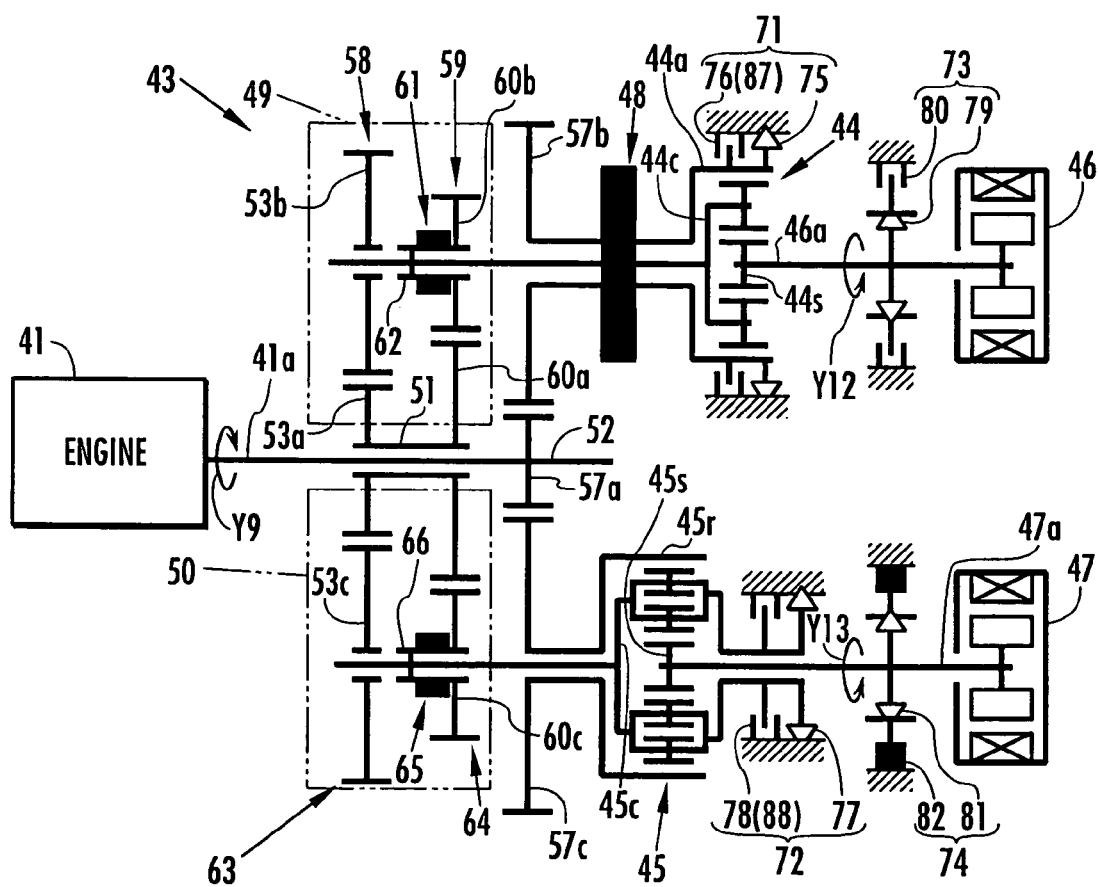
FIG. 13 is a diagram illustrating operations of the power transmitting apparatus according to the third embodiment.
Figure 14:
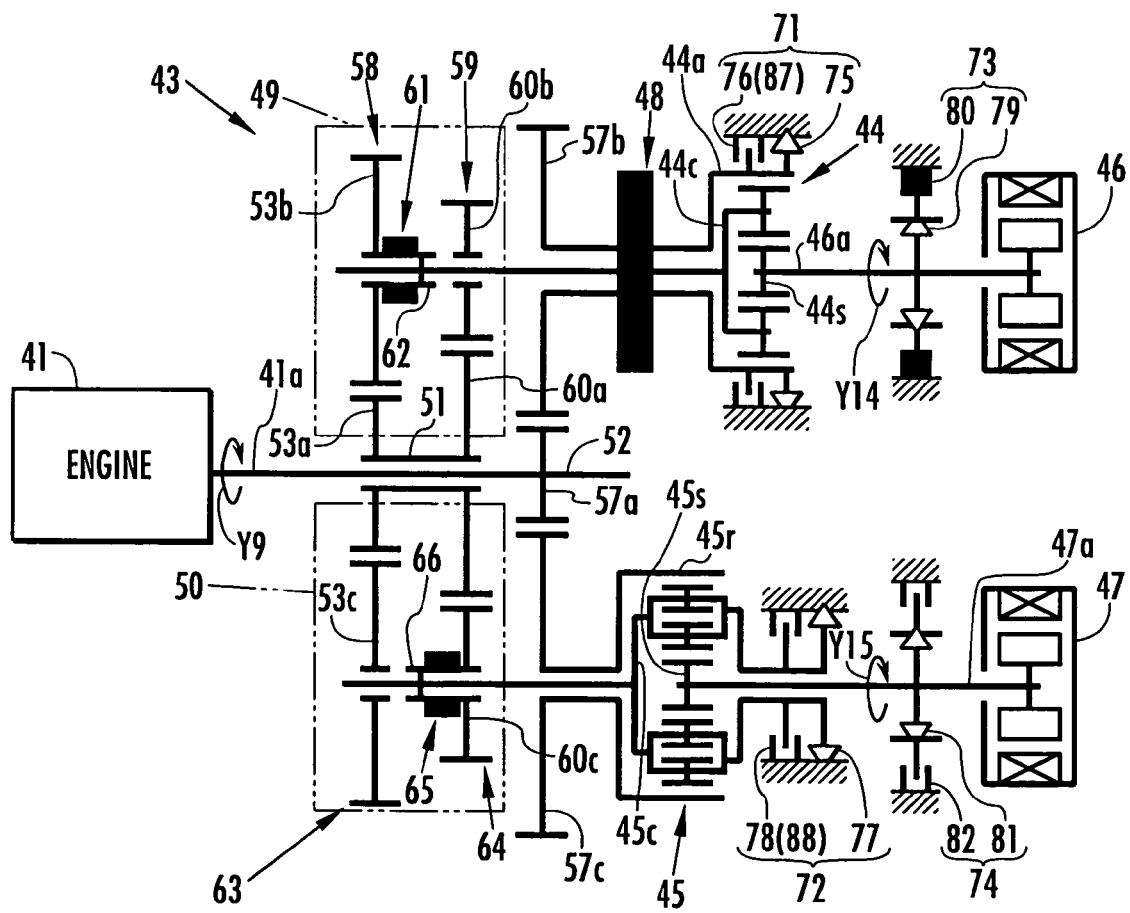
FIG. 14 is a diagram illustrating operations of the power transmitting apparatus according to the third embodiment.
Figure 15:
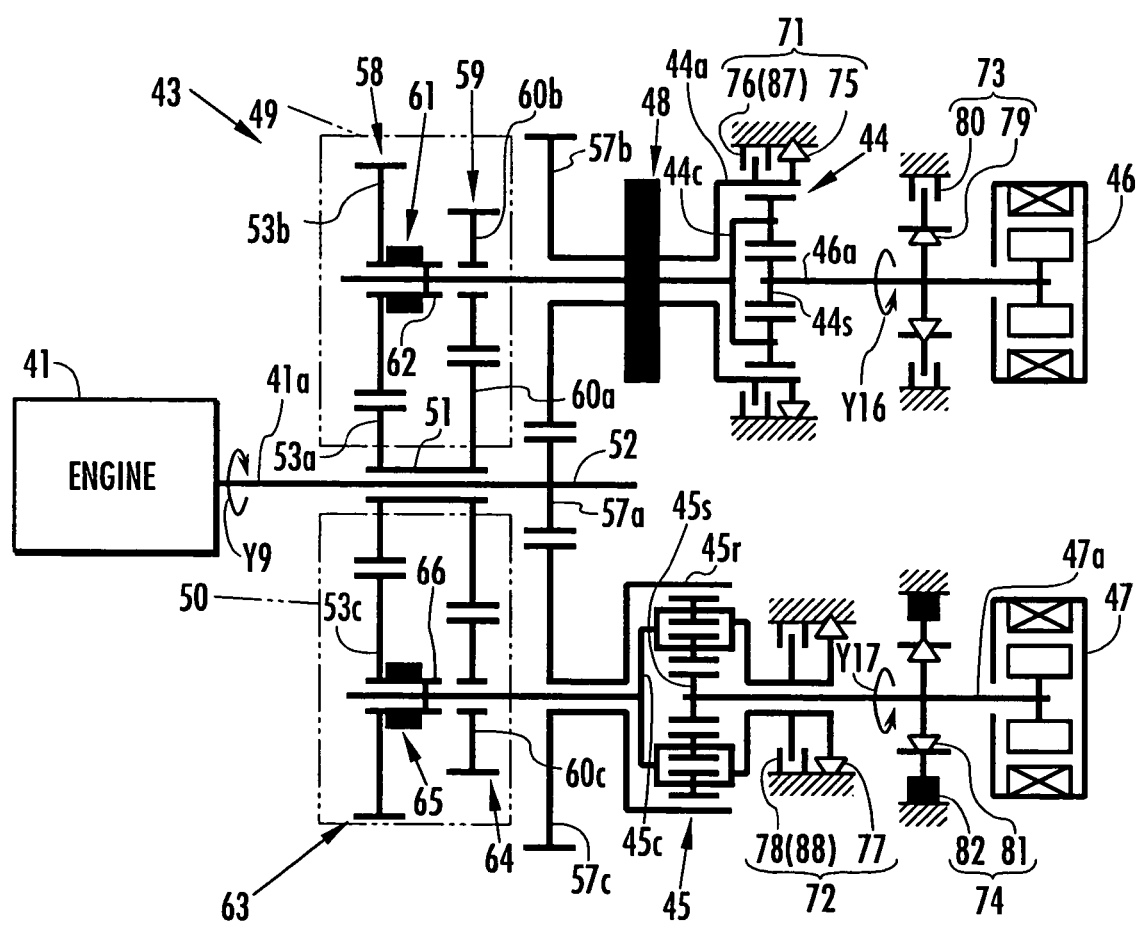
FIG. 15 is a diagram illustrating operations of the power transmitting apparatus according to the third embodiment.

The controller 86 operates the clutches 61 and 65 of the speed change units 49 and 50 in accordance with the speed variable range determined as described above, as shown in FIGS. 13 to 15. FIGS. 13 to 15 correspond to the first, second, and third speed variable ranges. For the first clutch 48, the clutch 61 of the speed change unit 49, and the clutch 65 of the speed change unit 50, a blackened representation indicates that the clutch is in the connected operational state. A whitened representation indicates that the clutch is in the disconnected state (neutral state for the clutches 61 and 65). The meanings of the blackened and whitened representations also apply to the locking mechanism 76 of the forced braking means 87, the locking mechanism 78 of the forced braking means 88, and the one-way clutches 75 and 77. The first clutch 48 is in the connected state during the CVT propulsion. Accordingly, it is blackened in all of FIGS. 13 to 15. Likewise, during the CVT propulsion, all of the locking mechanisms 76 and 78 and one-way clutches 75 and 77 are in the open state in which they do not inhibit rotations. Accordingly, they are whitened in all of FIGS. 13 to 15. The meanings of the blackened and whitened representations also apply to the locking mechanisms 80 and 82. The operational state of the locking mechanisms 80 and 82 will be described below in detail.

In the first speed variable range, as shown in FIG. 13, the clutch 61 of the speed change unit 49 is controlled to connect the gear 60b of the higher-speed-reduction-ratio rotation transmitting mechanism 59 to the member 62. Further, the clutch 65 of the speed change unit 50 is controlled to connect the gear 60c of the higher-speed-reduction-ratio rotation transmitting mechanism 64 to the member 66. On this occasion, the torque outputted from the engine 41 distributed to the first power distributor 44 is transmitted from the carrier 44c of the first power distributor 44 to the power output shaft 51 via the higher-speed-reduction-ratio rotation transmitting mechanism 59 of the speed change unit 49. The torque distributed to the second power distributor 45 is transmitted from the carrier 45c of the second power distributor 45 to the power output shaft 51 via the higher-speed-reduction-ratio rotation transmitting mechanism 64 of the speed change unit 50. Additionally, when the output shaft 41a of the engine 41 is assumed to rotate in the direction of the arrow Y9, the rotatable shaft 46a of the first motor 46 and the rotatable shaft 47a of the second motor 47 rotate in the directions of arrows Y12 and Y13, respectively, in FIG. 5.

In the second speed variable range, as shown in FIG. 14, the clutch 61 of the speed change unit 49 is controlled to connect the gear 53b of the lower-speed-reduction-ratio rotation transmitting mechanism 58 to the member 62. Further, the clutch 65 of the speed change unit 50 is controlled to connect the gear 60c of the higher-speed-reduction-ratio rotation transmitting mechanism 64 to the member 66. On this occasion, the output torque from the engine 41 is distributed to the power distributors 44 and 45. The torque distributed to the first power distributor 44 is transmitted from the carrier 44c of the first power distributor 44 to the power output shaft 51 via the lower-speed-reduction-ratio rotation transmitting mechanism 58 of the speed change unit 49. The torque distributed to the second power distributor 45 is transmitted to the power output shaft 51 through the same path as that in the first speed variable range. Additionally, when the output shaft 41a of the engine 41 is assumed to rotate in the direction of the arrow Y9, the rotatable shaft 46a of the first motor 46 and the rotatable shaft 47a of the second motor 47 rotate in the directions of arrows Y14 and Y15, respectively, in FIG. 6. In this case, the rotatable shafts 46a and 47a rotate in the directions opposite to those in the first speed variable range.

In the third speed variable range, as shown in FIG. 15, the clutch 61 of the speed change unit 49 is controlled to connect the gear 53b of the lower-speed-reduction-ratio rotation transmitting mechanism 58 to the member 62. Further, the clutch 65 of the speed change unit 50 is controlled to connect the gear 53c of the lower-speed-reduction-ratio rotation transmitting mechanism 63 to the member 66. On this occasion, the output torque from the engine 41 is distributed to the power distributors 44 and 45. The torque distributed to the first power distributor 44 is transmitted to the power output shaft 51 through the same path as that in the second speed variable range. The torque distributed to the second power distributor 45 is transmitted from the carrier 45c of the second power distributor 45 to the power output shaft 51 via the lower-speed-reduction-ratio rotation transmitting mechanism 63 of the speed change unit 50. Additionally, when the output shaft 41a of the engine 41 is assumed to rotate in the direction of the arrow Y9, the rotatable shaft 46a of the first motor 46 and the rotatable shaft 47a of the second motor 47 rotate in the same directions as those in the first speed variable range (the directions of the arrows Y14 and Y15, respectively).

As in the case of the first embodiment, the controller 86 determines the target output of the engine 41 depending on the desired propulsive torque of the vehicle and the vehicle speed V. The controller 86 further determines a set of the target output torque and rotation speed of the engine 41 with which the target output can be most efficiently generated in the determined speed variable range (that is, so as to minimize the power consumption). Then, as in the case of the first embodiment, the controller 86 controls the opening of the throttle valve (not shown) of the engine 41 in accordance with the target output torque. The controller 86 further corrects the target output torque in accordance with the deviation between the target rotation speed and the actual rotation speed NE (detected value). The controller 86 thus determines the target load torque of the engine 41. Moreover, on the basis of the determined target load torque and a target drive torque to be provided to the power output shaft 51 in association with the desired propulsive torque, the controller 86 determines the target torques of the motors 46 and 47 using Expressions (6) and (7), similarly to Expressions (1) and (2), previously described.

$$Te=(1/\gamma1)\cdot T1+(1/\gamma2)\cdot T2 \qquad (6)$$

$$Tv=\gamma4\cdot T1+\gamma4\cdot T2 \qquad (7)$$

In these expressions, γ1 denotes the speed reduction ratio from the output shaft 41a of the engine 41 to the first motor 46, and γ2 denotes the speed reduction ratio from the output shaft 41a of the engine 41 to the second motor 47. When the speed reduction ratios γ1 and γ2 are expressed using the reference numerals in Table 1, γ1=k5·k7 and γ2=k6·k8. Furthermore, γ3 denotes the speed reduction ratio from the rotatable shaft 46a of the first motor 46 to the power output shaft 51, and γ4 denotes the speed reduction ratio from the rotatable shaft 47a of the second motor 47 to the power output shaft 51. The speed reduction ratios γ3 and γ4 vary among the speed variable ranges 1 to 3. Specifically, in the first speed variable range in FIG. 13, the speed reduction ratio from the carrier 44c of the first power distributor 44 to the power output shaft 51 and the speed reduction ratio from the carrier 45c of the second power distributor 45 to the power output shaft 51 are both k10 (=speed reduction ratio of the higher-speed-reduction-ratio rotation transmitting mechanisms 59 and 64). Accordingly, when the speed reduction ratio from the rotatable shaft 46a of the first motor 46 to the carrier 44c of the first power distributor 44 is defined as k11 and the speed reduction ratio from the rotatable shaft 47a of the second motor 47 to the carrier 45c of the second power distributor 45 is defined as k12, γ3=k11·k10 and γ4=k12·k10. k11=(1+k7)/k7 and k12=(1−k8)/k8. In the second speed variable range in FIG. 14, the speed reduction ratio from the carrier 44c of the first power distributor 44 to the power output shaft 51 and the speed reduction ratio from the carrier 45c of the second power distributor 45 to the power output shaft 51 are k9 and k10, respectively. Therefore, γ3=k11·k9 and γ4=k12·k10. In the third speed variable range in FIG. 15, the speed reduction ratio from the carrier 44c of the first power distributor 44 to the power output shaft 51 and the speed reduction ratio from the carrier 45c of the second power distributor 45 to the power output shaft 51 are both k9 (=speed reduction ratio of the lower-speed-reduction-ratio rotation transmitting mechanisms 58 and 63). Therefore, γ3=k11·k9 and γ4=k12·k9.

For the power transmitting apparatus 43 according to the present embodiment, Relational Expressions (8) and (9) similar to Expressions (3) and (4), previously described, are established between the rotation speed ωe of the output shaft 43a of the engine 43 and the rotation speed ωv of the power output shaft 51 and the rotation speeds ω1 and ω2 of the rotatable shafts 46a and 47a of the motors 46 and 47, respectively.

$$\omega e = Ra\cdot\omega v - k7\cdot\omega1 \qquad (8)$$

$$\omega e = Rb\cdot\omega v + k8\cdot\omega2 \qquad (9)$$

Here, a set of Ra and Rb (Ra, Rb) is (R1, R2) in the first speed variable range, (R3, R2) in the second speed variable range, and (R3, R4) in the third speed variable range. In addition, k7 and k8 are the speed reduction ratios shown in Table 1, previously described. In each speed variable range, max(Ra,Rb)>ωe/ωv>min(Ra,Rb).

On the basis of Expressions (6) and (7), previously described, the controller 86 determines the target torques T1 and T2 of the motors 46 and 47, respectively, from the target load torque Te of the engine 41 and the target drive torque Tv of the power output shaft 51, both determined as previously described. Then, the controller 86 controls the currents conducting through the motors 46 and 47 in accordance with the target torques T1 and T2, respectively, to allow the motors 46 and 47 to generate the target torques T1 and T2, respectively.

When the engine 41 and the motors 46 and 47 are controlled as described above, the operations described below are basically performed in each of the first to third speed variable ranges. One of the motors 46 and 47 which corresponds to the larger of the speed reduction ratios at the opposite ends of the speed variable range is controllably brought into the drive state in which it generates a drive (motoring) torque. The other motor 47 or 46, which corresponds to the smaller speed reduction ratio is controllably brought into the regenerative state (generation state) in which it generates a regenerative torque. Specifically, in the first speed variable range, the first motor 46 is controllably brought into the drive state, whereas the second motor 47 is controllably brought into the regenerative state. In the second speed variable range, the first motor 46 is controllably brought into the regenerative state, whereas the second motor 47 is controllably brought into the drive state. In the third speed variable range, the first motor 46 is controllably brought into the drive state, whereas the second motor 47 is controllably brought into the regenerative state. In each speed variable range, in the steady state, the power consumption of the motor 46 or 47 in the drive state is balanced with the power generation of the motor 47 or 46 in the regenerative state (power consumption nearly equals power generation). In this case, while a speed change operation is performed between the output shaft 41a of the engine 41 and the power output shaft 51 using a speed reduction ratio between the values at the opposite ends of the speed variable range, the output torque from the engine 41 is transmitted to the power output shaft 51 to subject the vehicle to speed change propulsions, as previously described.

On the other hand, in each speed variable range, the controller 86 basically controls the locking mechanisms 80 and 82 of the third and fourth rotation regulating means 73 and 74 as shown in FIGS. 13 to 15. In the first speed variable range, as shown in FIG. 13, the controller 86 avoids engaging the locking mechanism 80 with the one-way clutch 79 to turn off the function of the one-way clutch 79. In contrast, the controller 86 engages the locking mechanism 82 with the one-way clutch 81 to turn on the function of the one-way clutch 81. At this time, the rotating direction Y12 of the rotatable shaft 46a of the first motor 46 is opposite to the rotating direction permitted by the one-way clutch 79. However, since the function of the one-way clutch 79 is off, the rotational shaft 46a of the first motor 46 can be smoothly rotated in the direction of the arrow Y12. Further, the rotating direction Y13 of the rotatable shaft 47a of the second motor 47 is the same as the rotating direction permitted by the one-way clutch 81. Accordingly, the rotational shaft 47a can be smoothly rotated in the direction of the arrow Y13.

Then, as in the case of the second embodiment, when the engine 41 becomes inoperative, the one-way clutch 81, the function of which is on, inhibits the rotatable shaft 47a of the second motor 47 in the direction opposite to that of the arrow Y13. This prevents the rotation speed of the engine 41 from decreasing down to zero (the decrease in the rotation speed of the engine 41 is limited to the value R2·ωv). As a result, as in the case of the second embodiment, the rotation speed of the first motor 46 is prevented from increasing excessively. In the first speed variable range, the speed reduction ratio (=first speed reduction ratio R1) for the first distributor rotation transmitting system with the first motor 46 is higher than the speed reduction ratio (=second speed reduction ratio R2) for the second distributor rotation transmitting system with the second motor 47.

In the second speed variable range, as shown in FIG. 14, the controller 86 engages the locking mechanism 80 with the one-way clutch 79 to turn on the function of the one-way clutch 79. In contrast, the controller 86 avoids engaging the locking mechanism 82 with the one-way clutch 81 to turn off the function of the one-way clutch 81. At this time, the rotating direction Y14 of the rotatable shaft 46a of the first motor 46 is the same as the rotating direction permitted by the one-way clutch 79. Accordingly, the rotational shaft 46a can be smoothly rotated in the direction of the arrow Y14. Further, the rotating direction Y15 of the rotatable shaft 47a of the second motor 47 is opposite to the rotating direction permitted by the one-way clutch 81. However, since the function of the one-way clutch 81 is off, the rotational shaft 47a of the second motor 47 can be smoothly rotated in the direction of the arrow Y15.

Then, as in the case of the second embodiment, when the engine 41 becomes inoperative, the one-way clutch 79, the function of which is on, inhibits the rotatable shaft 46a of the first motor 46 in the direction opposite to that of the arrow Y14. This prevents the rotation speed of the engine 41 from decreasing down to zero (the decrease in the rotation speed of the engine 41 is limited to the value R3·ωv). As a result, as in the case of the second embodiment, the rotation speed of the second motor 47 is prevented from increasing excessively. In the second speed variable range, the speed reduction ratio (=third speed reduction ratio R3) for the first distributor rotation transmitting system with the first motor 46 is lower than the speed reduction ratio (=second speed reduction ratio R2) for the second distributor rotation transmitting system with the second motor 47. Thus, in contrast to the first speed variable range, the rotatable shaft 46a of the first motor 46 is inhibited from rotating in the opposite direction. Further, the rotation speed of the second motor 47 is prevented from increasing excessively.

In the third speed variable range, as shown in FIG. 15, the controller 86 avoids engaging the locking mechanism 80 with the one-way clutch 79 to turn off the function of the one-way clutch 79. In contrast, the controller 86 engages the locking mechanism 82 with the one-way clutch 81 to turn on the function of the one-way clutch 81. At this time, the rotating direction Y12 of the rotatable shaft 46a of the first motor 46 and the rotating direction Y13 of the rotatable shaft 47a of the second motor 47 are the same as those in the first speed variable range. Furthermore, the operational state of the one-way clutches 79 and 81 is the same as that in the second speed variable range. Accordingly, as in the case of the first speed variable range, the rotational shafts 46a and 47a can be smoothly rotated in the directions of the arrows Y12 and Y13, respectively.

Then, as in the case of the first speed variable range, when the engine 41 becomes inoperative, the one-way clutch 81, the function of which is on, inhibits the rotatable shaft 47a of the second motor 47 for rotating in the direction opposite to that of the arrow Y13. This prevents the rotation speed of the engine 41 from decreasing down to zero (the decrease in the rotation speed of the engine 41 is limited to the value R4·ωv). As a result, as in the case of the first speed variable range, the rotation speed of the first motor 46 is prevented from increasing excessively. The controller 86 avoids engaging the locking mechanism 80 with the one-way clutch 79 to turn off the function of the one-way clutch 79. In contrast, the controller 86 engages the locking mechanism 82 with the one-way clutch 81 to turn on the function of the one-way clutch 81. At this time, the rotating direction Y12 of the rotatable shaft 46a of the first motor 46 is opposite to the rotating direction permitted by the one-way clutch 79. However, since the function of the one-way clutch 79 is off, the rotational shaft 46a of the first motor 46 can be smoothly rotated in the direction of the arrow Y12. Further, the rotating direction Y13 of the rotatable shaft 47a of the second motor 47 is the same as the rotating direction permitted by the one-way clutch 81. Accordingly, the rotational shaft 47a can be smoothly rotated in the direction of the arrow Y13.

Then, as in the case of the second embodiment, when the engine 41 becomes inoperative, the one-way clutch 81, the function of which is on, inhibits the rotatable shaft 47a of the second motor 47 from rotating in the direction opposite to that of the arrow Y13. This prevents the rotation speed of the engine 41 from decreasing down to zero (the decrease in the rotation speed of the engine 41 is limited to the value R4·ωv). As a result, as in the case of the second embodiment, the rotation speed of the second motor 46 is prevented from increasing excessively. In the third speed variable range, the speed reduction ratio (=third speed reduction ratio R3) for the first distributor rotation transmitting system with the first motor 46 is higher than the speed reduction ratio (=fourth speed reduction ratio R4) for the second distributor rotation transmitting system with the second motor 47.

In switching the speed variable range, control is performed as follows. To switch from first speed variable range to second speed variable range and from second speed variable range to first speed variable range, the controller 86 executes the control processes shown the flow charts in FIGS. 16A and 16B, respectively. To switch from first speed variable range to second speed variable range, the controller 86 first controls the torques of the motors 46 and 47 in STEP1a so that the speed reduction ratio from the engine 41 to the power output shaft 51 is closer to the second speed reduction ratio R2, the lower limit value of the first speed variable range. Specifically, if the speed reduction ratio between the engine 41 and the power output shaft 51 is set at the second speed reduction ratio R2, the controller 86 determines, on the basis of the desired propulsive torque and the vehicle speed V (detected value), the set of the target output torque and rotation speed of the engine 41 with which the desired propulsive torque of the vehicle can be generated. Then, as in the case of the steady CVT propulsion in each speed variable range, the controller 86 controls the opening of the throttle valve (not shown) of the engine 1 in accordance with the target output torque. The controller 86 also corrects the target output torque in accordance with the deviation between the target rotation speed and the actual rotation speed NE (detected value) to determine the target load torque of the engine 41. Moreover, on the basis of the determined target load torque and the target drive torque to be provided to the power output shaft 51 in association with the desired propulsive torque, the target torques of the motors 46 and 47 are determined using Expressions (6) and (7), previously described. Then, the currents conducting through the motors 46 and 47 are controlled in accordance with the determined target torque. This control finally substantially zeroes the torque generated by the first motor 46. The torque generated by the second motor 47 is substantially balanced with the output torque from the engine 41 ($\leq$ Te·γ1). Further, the rotation speed of the second motor 47 becomes almost zero. Then, the output torque from the engine 41 is transmitted to the power output shaft 51 via only one 45 of the power distributors 44 and 45, that is, via the second power distributor 45.

Then, in STEP2*a*, the controller 86 disconnects the clutch 61 of the speed change unit 49, to which the output torque from the engine 1 is not transmitted, from the gear 60*b* of the higher-speed-reduction-ratio rotation transmitting mechanism 59. Accordingly, the functions of the higher-speed-reduction-ratio rotation transmitting mechanism 59 are turned off (rotations cannot be transmitted via the higher-speed-reduction-ratio rotation transmitting mechanism 59). Then, in STEP3*a*, the controller 86 disconnects the locking mechanism 82, belonging to the second motor 47, from the one-way clutch 81 to turn off the function of the one-way clutch 81. In STEP4*a*, the speed reduction ratio from the engine 41 to the power output shaft 51 is maintained at the second speed reduction ratio. At this time, the torque generated by the second motor 47 is adjusted so as to maintain the rotation speed of the engine 41 at the target value. Then, in STEP5*a*, the clutch 61 of the speed change unit 49 is connected to the gear 53*b* of the lower-speed-reduction-ratio rotation transmitting mechanism 58 to turn on the functions of the lower-speed-reduction-ratio rotation transmitting mechanism 58 (rotations can be transmitted via the lower-speed-reduction-ratio rotation transmitting mechanism 58). The processing in STEP2*a* to STEP5*a* changes the speed reduction ratio of the first distributor rotation transmitting system from first speed reduction ratio R1 to third speed reduction ratio R3.

Then, in STEP6*a*, the controller 86 engages the locking mechanism 80, belonging to the first motor 46, with the one-way clutch 79 to turn on the function of the one-way clutch 79. This brings the one-way clutches 79 and 81 into the operational state for the second speed variable range shown in FIG. 5, previously described. Subsequently, in STEP7*a*, the controller 86 causes the power transmitting apparatus 43 to perform the previously described speed change operation for the second speed variable range.

Conversely, to switch from second speed variable range to first speed variable range, the controller 86 executes the process shown in FIG. 16B. First, in STEP1*b*, the controller 86 first controls the torques of the motors 46 and 47 so that the speed reduction ratio from the engine 41 to the power output shaft 51 is closer to the second speed reduction ratio R2, the upper limit value of the second speed variable range, as in the case of STEP1*a*. Then, in STEP2*b*, the controller 86 disconnects the clutch 61 of the speed change unit 49 from the gear 53*b* of the lower-speed-reduction-ratio rotation transmitting mechanism 58. Accordingly, the functions of the lower-speed-reduction-ratio rotation transmitting mechanism 58 are turned off. Then, in STEP3*b*, the controller 86 disconnects the locking mechanism 80, belonging to the first motor 44, from the one-way clutch 79 to turn off the function of the one-way clutch 79. In STEP4*b*, the speed reduction ratio from the engine 41 to the power output shaft 51 is maintained at the second speed reduction ratio, as in the case of STEP 4*a*. Then, in STEP5*b*, the clutch 61 of the speed change unit 49 is connected to the gear 60*b* of the higher-speed-reduction-ratio rotation transmitting mechanism 59 to turn on the functions of the higher-speed-reduction-ratio rotation transmitting mechanism 59. Then, in STEP6*b*, the controller 86 engages the locking mechanism 82, belonging to the second motor 47, with the one-way clutch 81 to turn on the function of the one-way clutch 81. Subsequently, in STEP7*b*, the controller 86 causes the power transmitting apparatus 43 to perform the previously described speed change operation for the first speed variable range.

As shown in FIGS. 17A and 17B, switching between the second speed variable range and the third speed variable range is carried out using a procedure similar to that used to execute the switching between the first speed variable range and the second speed variable range. This procedure will be described below in brief. The second speed variable range is switched to the third speed variable range as follows. As shown in FIG. 17A, first, in STEP11*a*, a control process similar to that in STEP1*a*, previously described, is executed to make the speed reduction ratio between the engine 41 and the power output shaft 51 closer to the third speed reduction ratio. Then, in STEP12*a*, the clutch 65 of the speed change unit 50 is disconnected from the gear 60*c* to turn off the functions of the higher-speed-reduction-ratio rotation transmitting mechanism 64. Moreover, in STEP13*a*, the function of the one-way clutch 79, belonging to the first motor 46, is turned off. Then, in STEP14*a*, the speed reduction ratio from the engine 41 to the power output shaft 51 is maintained at the third speed reduction ratio. On this occasion, the torque generated by the first motor 46 is adjusted so as to maintain the rotation speed of the engine 41 at the target value. Then, in STEP15*a*, the clutch 65 of the speed change unit 50 is connected to the gear 63*c* to turn on the functions of the lower-speed-reduction-ratio rotation transmitting mechanism 63. Then, in STEP16*a*, the function of the one-way clutch 81, belonging to the second motor 47, is turned on. Subsequently, in STEP17*a*, the power transmitting apparatus 43 is caused to perform the previously described speed change operation for the third speed variable range.

Conversely, the third speed variable range is switched to the second speed variable range as follows. As shown in FIG. 17B, first, in STEP11*b*, the speed reduction ratio from the engine 41 and the power output shaft 51 is made closer to the third speed reduction ratio. Then, in STEP12*b*, the clutch 65 of the speed change unit 50 is disconnected from the gear 53*c* to turn off the functions of the lower-speed-reduction-ratio rotation transmitting mechanism 63. Moreover, in STEP13*b*, the function of the one-way clutch 81, belonging to the second motor 46, is turned off. Then, in STEP14*b*, the speed reduction ratio from the engine 41 to the power output shaft 51 is maintained at the third speed reduction ratio. Then, in STEP15*b*, the clutch 65 of the speed change unit 50 is connected to the gear 60*c* to turn on the functions of the higher-speed-reduction-ratio rotation transmitting mechanism 64. Then, in STEP16b, the function of the one-way clutch 79, belonging to the first motor 46, is turned on. Subsequently, in STEP17b, the power transmitting apparatus 43 is caused to perform the previously described speed change operation for the second speed variable range.

According to the present embodiment, in the first speed variable range and in a vehicle speed region lower than a vehicle speed V1, shown in FIG. 12A, if the desired propulsive torque is large, the speed reduction ratio between the engine 41 and the power output shaft 51 is set at the first speed reduction ratio R1, the upper limit value of the first speed variable range. If, for example, the second speed variable range is switched to the first speed variable range, then in a vehicle speed region lower than a vehicle speed V2, shown in FIG. 12B, the speed reduction ratio between the engine 41 and the power output shaft 51 is set at the second speed reduction ratio R2, the upper limit value of the second speed variable range. If, for example, the third speed variable range is switched to the second speed variable range, then in a vehicle speed region lower than a vehicle speed V3, shown in FIG. 12C, the speed reduction ratio between the engine 41 and the power output shaft 51 is set at the third speed reduction ratio R3, the upper limit value of the third speed variable range. In each of these states, the one-way clutch 79 or 81 cannot inhibit the motor with the lower speed reduction ratio (second motor 47 in the first and third speed variable ranges, and the first motor 46 in the second speed variable range) from rotating in the opposite direction. Thus, in the present embodiment, the permissible maximum rotation speed of the first motor 46 is the larger of the maximum value of the rotation speed of the first motor 46 obtained if the engine 41 becomes inoperative when the vehicle is propelled in a vehicle speed region lower than the vehicle speed V1 in the first speed variable range using the speed reduction ratio R1 and the maximum value of the rotation speed of the first motor 46 obtained if the engine 41 becomes inoperative when the vehicle is propelled in a vehicle speed region lower than the vehicle speed V3 in the first speed variable range using the speed reduction ratio R3. The permissible maximum rotation speed of the second motor 47 is the maximum value of the rotation speed of the first motor 46 obtained if the engine 41 becomes inoperative when the vehicle is propelled in a vehicle speed region lower than the vehicle speed V2 in the second speed variable range using the speed reduction ratio R2. Accordingly, the function of the one-way clutch 81 need not be turned on in the vehicle speed region lower than the vehicle speed V1 in the first speed variable range or in the vehicle speed region lower than the vehicle speed V3 in the third speed variable range. Similarly, the function of the one-way clutch 79 need not be turned on in the vehicle speed region lower than the vehicle speed V2 in the second speed variable range.

Now, description will be given of a shift between the CVT propulsion mode and another mode. In the present embodiment, a shift between the CVT propulsion mode and the series type EV propulsion mode is carried out in the first speed variable range. An operation for this shift is performed via the transition mode state as in the case of the first embodiment. Specifically, if the series type EV propulsion mode shifts to the CVT propulsion mode, then as is the case with the first embodiment, the first clutch 48 is gradually connected while the drive torque of the first motor 46 is being controllably adjusted to a value corresponding to the desired propulsive torque of the vehicle. Further, the output torque and rotation speed of the engine 41 as well as the regenerative torque of the second motor 27 are controlled. The functions of the higher-speed-reduction-ratio rotation transmitting mechanism 59 of the speed change unit 49 are on. The operational state of each of the speed change unit 50 and first to fourth rotation regulating means 71 to 74 is kept the same as that in the series type EV propulsion mode. Thus, the power transmitting apparatus 43 is shifted to the transitional mode operational state in which the rotation speed of the first motor 46 and the regenerative torque of the second motor 47 are each almost zero. In the transitional mode state, the clutch 65 of the speed change unit 50 is operated to turn on the functions of lower-speed-reduction-ratio rotation transmitting mechanism 63 (the lower-speed-reduction-ratio rotation transmitting mechanism 63 is used to transmit rotations between the carrier 45c of the second power distributor 45 and the power output shaft 51) of the speed change unit 50. Further, the forced braking means 88 of the second rotation regulating means 72 is switched from the braking state to the open state. Moreover, the locking mechanism 82 of the fourth rotation regulating means 74 is operated to turn on the function of the one-way clutch 81. Subsequently, an operation is started in the CVT propulsion mode in the first speed variable range.

When the CVT propulsion mode in the first speed variable range shifts to the series type EV propulsion mode, the engine 41 and the motors 46 and 47 are controlled as is the case with the first embodiment. In this case, the operational state of each of the first clutch 48, speed change unit 49 and 50, and first to fourth rotation regulating means 71 to 74 is kept the same as that in the CVT propulsion mode in the first speed variable range. Thus, the power transmitting apparatus 43 is shifted to the transitional mode operational state in which the rotation speed of the first motor 46 and the regenerative torque of the second motor 47 are each almost zero. In the transitional mode state, the clutch 65 of the speed change unit 50 is operated in the neutral state. Further, the forced braking means 88 of the second rotation regulating means 72 is switched from the open state to the braking state. Moreover, the locking mechanism 82 of the fourth rotation regulating means 74 is disengaged from the one-way clutch 81 to turn off the function of the one-way clutch 81. Subsequently, an operation is started in the series type EV propulsion mode.

When a shift between the series type EV propulsion mode and the CVT propulsion mode is carried out via the transitional mode state, the propulsive mode can be smoothly shifted while maintaining the propulsion state of the vehicle as is the case with the first embodiment.

For a shift between the parallel type propulsion mode and the CVT propulsion mode, the series type EV propulsion mode is used as in the case of the first embodiment. Specifically, to shift from the parallel type propulsion mode to the CVT propulsion mode, a shift to the series type EV propulsion mode is carried out as previously described, and then the series type EV propulsion mode is shifted to the CVT propulsion mode in the first speed variable range as previously described. Likewise, to shift from the CVT propulsion mode to the series type EV propulsion mode, the CVT propulsion mode in the first speed variable range is shifted to the series type EV propulsion mode as previously described, and then the series type EV propulsion mode is shifted to the parallel type propulsion mode as previously described.

What is claimed is:

1. A power transmitting apparatus for a hybrid vehicle comprising a first and second power distributors each having an input shaft to which a rotational drive power from an engine is transmitted, a power output shaft to which a first output shaft of two output shafts of said first power distributor and a first output shaft of two output shafts of said second power distributor transmit rotational drive powers and which output the transmitted rotational drive powers to drive wheels of the vehicle, a first motor that applies a drive torque or regenerative torque to a second output shaft of said first power distributor, and a second motor that applies a drive torque or regenerative torque to a second output shaft of said second power distributor, a speed reduction ratio for a rotation transmitting system from said engine to said power output shaft via said first power distributor having a value different from a value of a speed reduction ratio for a rotation transmitting system from said engine to said power output shaft via said second power distributor, wherein the apparatus comprises first clutch means for connecting and disconnecting said engine to and from the input shaft of said first power distributor for rotation transmission, second clutch means for connecting and disconnecting the first output shaft of said second power distributor to and from the power output shaft for rotation transmission, first rotation regulating means operating in an open state in which the input shaft of said first power distributor is rotatable and in a braking state in which the input shaft is inhibited from rotating, and second rotation regulating means operating in an open state in which the first output shaft of the second power distributor is rotatable and in a braking state in which the first output shaft s inhibited from rotating.

2. The power transmitting apparatus for a hybrid vehicle according to claim 1, wherein each of said first and second power distributors comprises a pinion gear device.

3. The power transmitting apparatus for a hybrid vehicle according to claim 2, wherein the input shaft, first output shaft, and second output shaft of each of said power distributors are a ring gear, a carrier, and a sun gear of the pinion gear device respectively constituting the power distributor.

4. The power transmitting apparatus for a hybrid vehicle according to any of claim 1 to 3, wherein said first rotation regulating means comprises a one-way clutch for inhibiting only rotation of the input shaft of said first power distributor in a predetermined one of two rotating directions.

5. The power transmitting apparatus for a hybrid vehicle according to claim 4, wherein said first rotation regulating means further comprises forced braking means for inhibiting rotation of the input shaft of said first power distributor via an actuator.

6. The power transmitting apparatus for a hybrid vehicle according to claim 1, wherein said second rotation regulating means comprises a one-way clutch for inhibiting only rotation of the first output shaft of said second power distributor in a predetermined one of two rotating directions.

7. The power transmitting apparatus for a hybrid vehicle according to claim 6, wherein said second rotation regulating means further comprises forced braking means for inhibiting rotation of the first output shaft of said second power distributor via an actuator.

8. The power transmitting apparatus for a hybrid vehicle according to claim 1, wherein said first and second clutch means are operated in a connected state and said first and second rotation regulating means are operated in an open state in a speed change propulsion mode, and the speed change propulsion mode is a mode in which the vehicle is propelled by transmitting the rotational drive power of said engine to said power output shaft via said first and second power distributors while generating a drive torque in one of said first and second motors and a regenerative torque in the other and in which the torques generated by said first and second motors are controlled to control a speed change ratio between the engine to the power output shaft.

9. The power transmitting apparatus for a hybrid vehicle according to claim 8, wherein said first and second clutch means are operated in a disconnected state and said first rotation regulating means operates in a braking state in an electric propulsion mode, and the electric propulsion mode is a mode in which the drive torque of said first motor is transmitted to said power output shaft to start and propel the vehicle.

10. The power transmitting apparatus for a hybrid vehicle according to claim 9, wherein a rotation transmitting system from said first motor to said power output shaft via said first power distributor has a higher speed reduction ratio than a rotation transmitting system from said second motor to said power output shaft via said second power distributor.

11. The power transmitting apparatus for a hybrid vehicle according to claim 9, wherein said first rotation regulating means comprises a one-way clutch for inhibiting only rotation of the input shaft of said first power distributor in a predetermined one of the two rotating directions and forced braking means for inhibiting rotation of the input shaft of said first power distributor via the actuator, and wherein when the vehicle is propelled forward in the electric propulsion mode, said first motor is caused to generate a drive torque that advances the vehicle, while said first rotation regulating means is operated in the braking state using its one-way clutch, and when the vehicle is propelled backward in the electric propulsion mode, said first motor is caused to generate a drive torque in a direction inverse to that of the drive torque generated when the vehicle is propelled forward, while said first rotation regulating means is operated in the braking state using its forced braking means.

12. The power transmitting apparatus for a hybrid vehicle according to claim 11, wherein the drive torque of said second motor is transmitted to said engine to start the engine in a state that said first and second clutch means are operated in the disconnected state and said second rotation regulating means is operated in the braking state, before the vehicle starts traveling backward in said electric propulsion mode.

13. The power transmitting apparatus for a hybrid vehicle according to claim 12, wherein said second rotation regulating means comprises a one-way clutch for inhibiting only rotation of the first output shaft of said second power distributor in a predetermined one of the two rotating directions, and when said engine is started before said vehicle starts traveling backward, the second rotation regulating means is operated in the braking state using its one-way clutch.

14. The power transmitting apparatus for a hybrid vehicle according to claim 9, wherein said electric propulsion mode includes a series type electric propulsion mode in which the rotational drive power of said engine is transmitted to said second motor to allow the second motor to generate a regenerative power, and in the series type electric propulsion mode, said second rotation regulating means is operated in the braking state.

15. The power transmitting apparatus for a hybrid vehicle according to claim 14, wherein the drive torque of said second motor is transmitted to said engine to start the engine in a state that said first and second clutch means are operated in the disconnected state and said second rotation regulating means is operated in the braking state, before said series type electric propulsion mode is started.

16. The power transmitting apparatus for a hybrid vehicle according to claim 15, wherein said second rotation regulating means comprises a one-way clutch for inhibiting only rotation of the first output shaft of said second power distributor in a predetermined one of the two rotating directions and forced braking means for inhibiting rotation of the first output shaft of said second power distributor via the actuator, and wherein when said engine is started before said series type electric propulsion mode is started, said second rotation regulating means is operated in the braking state using its one-way clutch, and in said series type electric propulsion mode, said second rotation regulating means is operated in the braking state using its forced braking means.

17. The power transmitting apparatus for a hybrid vehicle according to claim 14, wherein said series type electric propulsion mode and said speed change propulsion mode are shifted to each other via a transition mode, and the transition mode is a mode in which a rotation speed of said first motor and the torque generated by the second motor are set at almost zero, in which said first clutch means is operated in the connected state, with said first rotation regulating means operated in the open state, and in which an operational state of the second clutch means and second rotation regulating means is switched, and.

18. The power transmitting apparatus for a hybrid vehicle according to claim 14, wherein said engine has a plurality of cylinders, and said series type electric propulsion mode comprises a partial cylinder halt mode in which some of all the cylinders of the engine are halted.

19. The power transmitting apparatus for a hybrid vehicle according to claim 8, wherein said first clutch means is operated in the disconnected state, said second clutch means is operated in the connected state, said first rotation regulating means is operated in the braking state, said second rotation regulating means is operated in the open state, and the second motor is caused to generate the regenerative torque in a parallel type propulsion mode, and the parallel type propulsion mode is a mode in which the vehicle is propelled by transmitting the rotational drive power of said engine and the rotational drive power of said first motor to said power output shaft in parallel.

20. The power transmitting apparatus for a hybrid vehicle according to claim 8, comprising third rotation regulating means that can operate in a braking state in which rotation of a rotatable shaft of one of said first and second motors is inhibited which motor has the lower speed reduction ratio and which motor applies a torque to the second output shaft of the power distributor in the rotation transmitting system with the lower speed reduction ratio, and in an open state in which the rotatable shaft can be rotated, and wherein if said engine becomes inoperative while the vehicle is being propelled in said speed change propulsion mode, said third rotation regulating means is operated in the braking state.

21. The power transmitting apparatus for a hybrid vehicle according to claim 20, wherein said third rotation regulating means comprises a one-way clutch for hindering the rotatable shaft of said motor with the lower speed reduction ratio from rotating in an inverse direction while the vehicle is being propelled in said speed change propulsion mode.

22. The power transmitting apparatus for a hybrid vehicle according to claim 8, wherein at least one of said two rotation transmitting systems has a speed change unit that can change the speed reduction ratio for the rotation transmitting system at a plurality of levels, and the speed change unit changes the speed reduction ratio to establish a state in which the rotation transmitting system with said first power distributor has a higher speed reduction ratio than the rotation transmitting system with said second power distributor and a state in which the rotation transmitting system with said second power distributor has a higher speed reduction ratio than the rotation transmitting system with said first power distributor, and wherein the apparatus comprises third rotation regulating means that can operate in a braking state in which the rotatable shaft of said first motor is inhibited from rotating and in an open state in which the rotatable shaft is rotatable, and fourth rotation regulating means that can operate in a braking state in which the rotatable shaft of said second motor is inhibited from rotating and in an open state in which the rotatable shaft is rotatable, and wherein if said engine becomes inoperative while the vehicle is being propelled in said speed change propulsion mode in which the rotation transmitting system with said first power distributor has a higher speed reduction ratio than the rotation transmitting system with said second power distributor, said fourth rotation regulating means is operated in the braking state, and if said engine becomes inoperative while the vehicle is being propelled in said speed change propulsion mode in which the rotation transmitting system with said second power distributor has a higher speed reduction ratio than the rotation transmitting system with said first power distributor, said third rotation regulating means is operated in the braking state.

23. The power transmitting apparatus for a hybrid vehicle according to claim 22, wherein said third rotation regulating means comprises a first one-way clutch for hindering the first motor from rotating in an inverse direction while the vehicle is being propelled in said speed change propulsion mode and the rotation transmitting system with said first power distributor has a lower speed reduction ratio than the rotation transmitting system with said second power distributor, and first one-way clutch OFF means for stopping the rotation inhibiting function of the first one-way clutch while the vehicle is being propelled in said speed change propulsion mode in which the rotation transmitting system with said first power distributor has a higher speed reduction ratio than the rotation transmitting system with said second power distributor, and wherein said fourth rotation regulating means comprises a second one-way clutch for hindering the second motor from rotating in an opposite direction while the vehicle is being propelled in said speed change propulsion mode in which the rotation transmitting system with said second power distributor has a lower speed reduction ratio than the rotation transmitting system with said first power distributor, and second one-way clutch OFF means for stopping the rotation inhibiting function of the second one-way clutch while the vehicle is being propelled in said speed change propulsion mode in which the rotation transmitting system with said second power distributor has a higher speed reduction ratio than the rotation transmitting system with said first power distributor.

\* \* \* \* \*